US011030810B1

(12) United States Patent
Cordes et al.

(10) Patent No.: US 11,030,810 B1
(45) Date of Patent: Jun. 8, 2021

(54) SHARED MIXED-REALITY ENVIRONMENTS RESPONSIVE TO MOTION-CAPTURE DATA

(71) Applicant: Lucasfilm Entertainment Company Ltd., San Francisco, CA (US)

(72) Inventors: Roger Cordes, San Francisco, CA (US); David Brickhill, San Francisco, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 0 days.

(21) Appl. No.: 16/130,251

(22) Filed: Sep. 13, 2018

Related U.S. Application Data

(60) Provisional application No. 62/558,249, filed on Sep. 13, 2017.

(51) Int. Cl.

| | |
|---|---|
| ***G06T 19/00*** | (2011.01) |
| ***G06T 7/246*** | (2017.01) |
| ***G06T 7/73*** | (2017.01) |
| ***G06T 7/593*** | (2017.01) |
| ***G06T 19/20*** | (2011.01) |

(Continued)

(52) U.S. Cl.
CPC ............ *G06T 19/006* (2013.01); *G06F 3/011* (2013.01); *G06K 9/00342* (2013.01); *G06T 7/246* (2017.01); *G06T 7/596* (2017.01); *G06T 7/73* (2017.01); *G06T 13/40* (2013.01);
(Continued)

(58) Field of Classification Search
CPC ....... G06T 19/006; G06T 7/246; G06T 19/20; G06T 7/596; G06T 15/08; G06T 7/73; G06T 13/40; G06K 9/00342; G06K 9/00375; G06F 3/011
See application file for complete search history.

(56) References Cited

U.S. PATENT DOCUMENTS

| | | | |
|---|---|---|---|
| 6,072,494 | A | 6/2000 | Nguyen |
| 6,335,765 | B1 | 1/2002 | Daly et al. |

(Continued)

OTHER PUBLICATIONS

Minecraft ("Minecraft Hololens demo at E3 2015 (amazing!)", published at https://www.youtube.com/watch?v=xgakdcEzVwg as of Jun. 15, 2015, Total Video Time 6:00 minutes). (Year: 2015).*

(Continued)

*Primary Examiner* — William A Beutel
(74) *Attorney, Agent, or Firm* — Kilpatrick Townsend & Stockton LLP

(57) ABSTRACT

An immersive content presentation system can capture the motion or position of a performer in a real-world environment. A game engine can be modified to receive the position or motion of the performer and identify predetermined gestures or positions that can be used to trigger actions in a 3-D virtual environment, such as generating a digital effect, transitioning virtual assets through an animation graph, adding new objects, and so forth. The use of the 3-D environment can be rendered and composited views can be generated. Information for constructing the composited views can be streamed to numerous display devices in many different physical locations using a customized communication protocol. Multiple real-world performers can interact with virtual objects through the game engine in a shared mixed-reality experience.

20 Claims, 38 Drawing Sheets

(51) Int. Cl.

| | |
|---|---|
| ***G06T 13/40*** | (2011.01) |
| ***G06T 15/08*** | (2011.01) |
| ***G06K 9/00*** | (2006.01) |
| ***G06F 3/01*** | (2006.01) |

(52) U.S. Cl.

CPC .............. *G06T 15/08* (2013.01); *G06T 19/20* (2013.01); *G06K 9/00375* (2013.01)

(56) References Cited

U.S. PATENT DOCUMENTS

| | | | | |
|---|---|---|---|---|
| 9,384,594 | B2 | 7/2016 | Maciocci et al. | |
| 9,704,027 | B1 | 7/2017 | Chang et al. | |
| 10,078,917 | B1 | 9/2018 | Gaeta et al. | |
| 10,281,987 | B1 * | 5/2019 | Yang | G06F 3/04847 |
| 2003/0177286 | A1 | 9/2003 | Gould | |
| 2011/0001813 | A1 | 1/2011 | Kim et al. | |
| 2012/0142415 | A1 * | 6/2012 | Lindsay | G06T 19/006 463/33 |
| 2012/0256915 | A1 | 10/2012 | Jenkins | |
| 2012/0309535 | A1 | 12/2012 | Langridge et al. | |
| 2013/0249947 | A1 | 9/2013 | Reitan | |
| 2013/0303285 | A1 | 11/2013 | Kochi et al. | |
| 2013/0335405 | A1 * | 12/2013 | Scavezze | A63F 13/10 345/419 |
| 2014/0002496 | A1 | 1/2014 | Lamb et al. | |
| 2015/0168728 | A1 | 6/2015 | Kobayashi | |
| 2015/0169076 | A1 | 6/2015 | Cohen et al. | |
| 2015/0215581 | A1 * | 7/2015 | Barzuza | G06F 3/04842 348/14.1 |
| 2015/0348326 | A1 * | 12/2015 | Sanders | G06T 19/006 345/633 |
| 2015/0350628 | A1 * | 12/2015 | Sanders | G06T 15/08 345/419 |
| 2015/0371447 | A1 | 12/2015 | Yasutake | |
| 2016/0234475 | A1 | 8/2016 | Courchesne et al. | |
| 2017/0076488 | A1 | 3/2017 | Stanton et al. | |
| 2017/0274281 | A1 | 9/2017 | Vandonkelaar | |
| 2018/0356956 | A1 * | 12/2018 | MacGillivray | G06T 15/20 |

OTHER PUBLICATIONS

U.S. Appl. No. 16/130,240, “Final Office Action”, dated Mar. 13, 2020, 24 pages.

U.S. Appl. No. 16/130,258, “Final Office Action”, dated Mar. 11, 2020, 35 pages.

U.S. Appl. No. 16/130,269, “Non-Final Office Action”, dated Feb. 26, 2020, 10 pages.

U.S. Appl. No. 16/130,240, “Non-Final Office Action”, dated Nov. 27, 2019, 20 pages.

U.S. Appl. No. 16/130,258, “Non-Final Office Action”, dated Oct. 25, 2019, 27 pages.

U.S. Appl. No. 16/130,269, “Non-Final Office Action”, dated Jul. 31, 2020, 11 pages.

* cited by examiner

SHARED MIXED-REALITY ENVIRONMENTS RESPONSIVE TO MOTION-CAPTURE DATA

CROSS-REFERENCES TO RELATED APPLICATIONS

This application claims the benefit of the following U.S. Provisional Application:

U.S. Provisional Application No. 62/558,249, filed on Sep. 13, 2017, entitled "REAL-TIME IMMERSIVE CONTENT PRESENTATION SYSTEM," by Brickhill et al, which is incorporated herein by reference.

The following related U.S. Nonprovisional Applications are being filed on the same day as the present application:

U.S. Nonprovisional application Ser. No. 16/130,240, filed on Sep. 13, 2018, entitled "REAL-TIME VIEWS OF MIXED-REALITY ENVIRONMENTS RESPONSIVE TO MOTION-CAPTURE DATA" by Cordes et al, which is incorporated herein by reference.

U.S. Nonprovisional application Ser. No. 16/130,258, filed on Sep. 13, 2018, entitled "GAME ENGINE RESPONSIVE TO MOTION-CAPTURE DATA FOR MIXED-REALITY ENVIRONMENTS" by Cordes et al, which is incorporated herein by reference.

U.S. Nonprovisional application Ser. No. 16/130,269, filed on Sep. 13, 2018, entitled "COMMUNICATION PROTOCOL FOR STREAMING MIXED-REALITY ENVIRONMENTS BETWEEN MULTIPLE DEVICES" by Cordes et al, which is incorporated herein by reference.

TECHNICAL FIELD

This application discloses technology related to the fields of computer animation, virtual reality environments, and digital content generation. Specifically, this application discloses technology for using a real-time gestures to drive computer-generated assets in a multi-device viewing environment.

BACKGROUND

Augmented reality includes a live view of a real-world environment that is augmented by computer generated sensory input(s), such as GPS graphics, video, sound, data statistics, and so forth. In contrast to virtual reality, which replaces the real-world environment with a simulated one, augmented reality elements are often displayed in real time in semantic context with elements of the real-world environment. For example, sports scores can be displayed on a television during a basketball game on a same screen. Headmounted displays can also be used to place the virtual images over a view of the physical world such that both are in the user's field of view.

Virtual reality is very similar to augmented reality in that it entails an interactive computer generated experience. However, virtual reality takes place within a simulated, immersive environment. Current virtual reality technology commonly uses virtual-reality headset or multi-projected environments to create realistic sensations, sales, and images that simulate the user having a physical presence in the virtual or imaginary environment. This effect is usually implemented using a virtual-reality headset having a head-mounted display comprising a small screen positioned in front of the eyes. A multi-projected environment, virtual-reality may be implemented using multiple large projection screens that surround the user.

Digital artists have long sought to integrate human performances together with animated CGI performances. This has been accomplished mainly in a production environment where scripted human sequences can be composited with pre-animated CGI performances. The combination of these elements can be displayed in the same video sequence to give the illusion that the CGI character and the human character coexist in the scene. However, making interactions between the CGI character and the human character appear seamless and realistic requires rehearsal and extensive planning and timing considerations. This is particularly true for physical interactions between a human actor and elements or characters in a virtual environment. For example, to realistically simulate a human actor lifting a digital character, the timing, placement, motion sequence, and speed of the human actions must be pre-scripted and built into the pre-animated sequence of the digital character. In other words, the human character has to follow the lead of the digital character. Any deviation from the pre-planned sequence will create visual and/or auditory discontinuities in the presentation that are immediately apparent to audiences. These discontinuities destroy the feeling that producers seek to create in a virtual/augmented reality environment.

BRIEF SUMMARY

In some embodiments, a method may include receiving a first motion or position of a first performer in a first real-world environment; identifying the first motion or position as a first predefined motion or position; altering a virtual asset in a 3-D virtual environment in response to identifying the first motion or position as the first predefined motion or position; receiving a second real-time motion or position of a second performer in a second real-world environment; identifying the second real-time motion or position as a second predefined motion or position; and altering the virtual asset in the 3-D virtual environment in response to identifying the second motion or position as the second predefined motion or position.

In some embodiments, an immersive content presentation system may include one or more processors and one or more memory devices including instructions that, when executed by the one or more processors, cause the one or more processors to perform operations including receiving a first motion or position of a first performer in a first real-world environment; identifying the first motion or position as a first predefined motion or position; altering a virtual asset in a 3-D virtual environment in response to identifying the first motion or position as the first predefined motion or position; receiving a second real-time motion or position of a second performer in a second real-world environment; identifying the second real-time motion or position as a second predefined motion or position; and altering the virtual asset in the 3-D virtual environment in response to identifying the second motion or position as the second predefined motion or position.

In some embodiments, a non-transitory, computer-readable medium may include instructions that, when executed by one or more processors, cause the one or more processors to perform operations including receiving a first motion or position of a first performer in a first real-world environment; identifying the first motion or position as a first predefined motion or position; altering a virtual asset in a 3-D virtual environment in response to identifying the first motion or position as the first predefined motion or position;

receiving a second real-time motion or position of a second performer in a second real-world environment; identifying the second real-time motion or position as a second predefined motion or position; and altering the virtual asset in the 3-D virtual environment in response to identifying the second motion or position as the second predefined motion or position.

In any embodiments, any or all of the following features may be included in any combination and without limitation. The method/operations may also include rendering a 2-D video stream of the virtual asset in the 3-D virtual environment, where the 2-D video stream of the virtual asset may include the altering of the virtual asset in response to identifying the first motion or position, and the 2-D video stream of the virtual asset may include the altering of the virtual asset in response to identifying the second motion or position. The method/operations may further include causing a real-time video stream to be displayed on a display device, where the real-time video stream may include the 2-D video stream of the virtual asset, and the 2-D video stream may be composited with a real-time view of a second real-world environment. The first real-world environment may be physically separated from the second real-world environment. The first performer need not be visible to the second performer in the first real-world environment. The first performer may be visible to the second performer through the 3-D virtual environment. The first performer may be equipped with a pair of AR glasses. Altering the virtual asset in the 3-D virtual environment in response to identifying the first motion or position as the first predefined motion or position may include causing the virtual asset to be held by virtual representation of the first performer in the 3-D virtual environment. Altering the virtual asset in the 3-D virtual environment in response to identifying the second motion or position as the second predefined motion or position may include causing the virtual asset to be passed from the virtual representation of the first performer in the 3-D virtual environment to a virtual representation of the second performer in the 3-D virtual environment. The first predefined motion or position may include the first performer closing their hand. The first predefined motion or position may include the first performer pointing their arm or hand at a virtual representation of an object. The first predefined motion or position may include the first performer executing a throwing motion. The first predefined motion or position may include the second performer executing a catching motion. The virtual asset may include a digital effect. The virtual asset may include a CGI character. The first performer in the first real-world environment may include a motion-capture suit that is recorded with a plurality of motion-capture cameras in a motion-capture system. Identifying the first motion or position as the first predefined motion or position may include receiving a motion-capture frame at a game engine, and comparing the first motion or position to a plurality of motions or positions in a predefined library of motions or positions. Identifying the first motion or position as the first predefined motion or position may include comparing calculated motion vectors of vertices on the motion-capture frame with the predefined library of motions or positions.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components.

In some instances, a sub-label is associated with a reference numeral to denote one of multiple similar components. When reference is made to a reference numeral without specification to an existing sub-label, it is intended to refer to all such multiple similar components.

FIG. 21 illustrates how two human performers can control elements of the 3-D environment through predetermined motions and/or positions, according to some embodiments.

DETAILED DESCRIPTION

Figure 1:
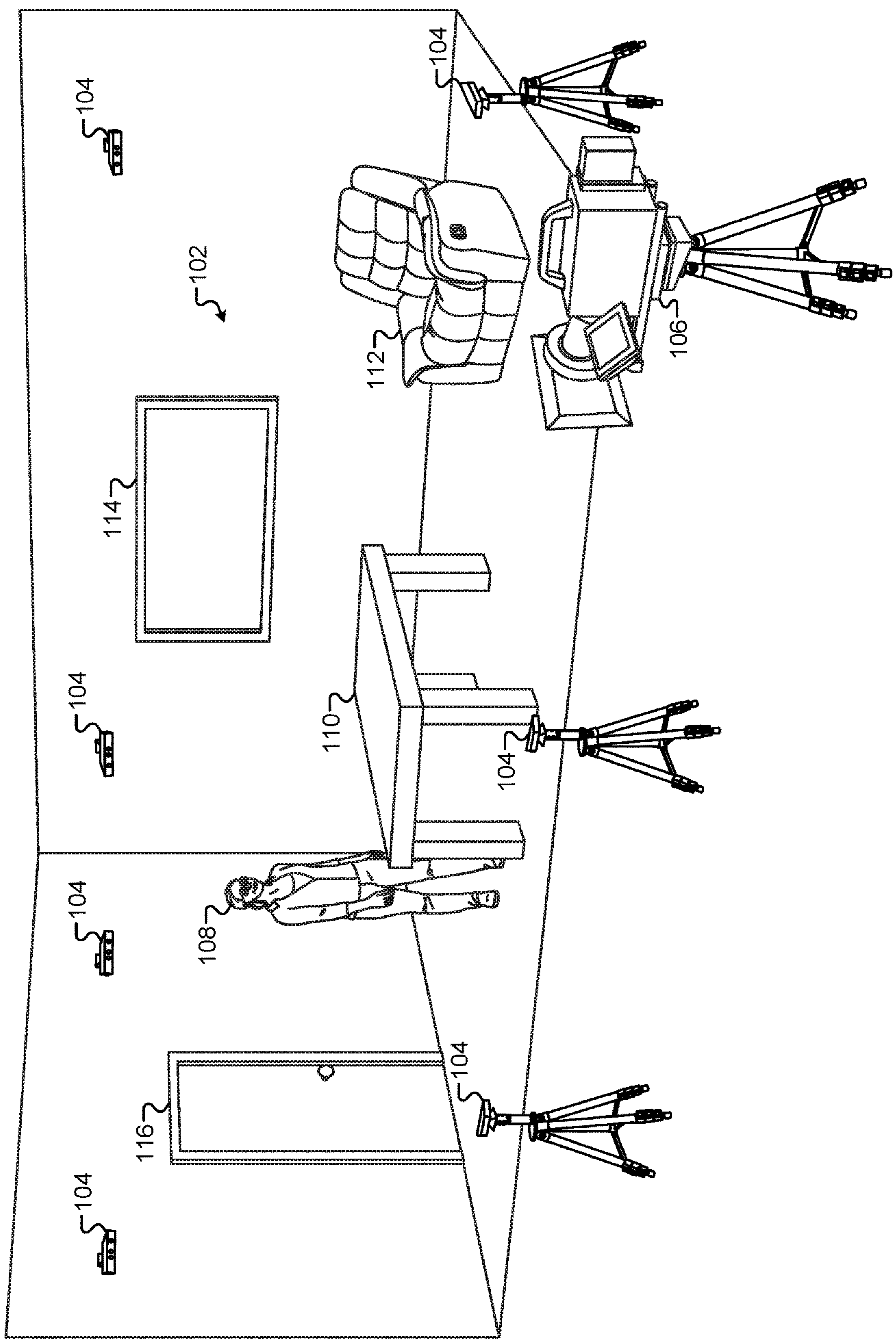
FIG. 1 illustrates a first performance area where images and positions of characters and props may be captured by the presentation system.

The embodiments described herein use real-time technology, such as real-time location determination, real-time motion capture, real-time performance capture, real-time simulation, and real-time rendering to place computer-generated visual effects into a live performance area. Instead of using precomputed visual effects that require rendered content off-line to be synced and choreographed to a live performance according to timing cues, the embodiments described herein use a live performance of a human subject to drive the computer-generated imagery (CGI) that is composited in real-time onto a display device. Rather than having the performer chase and/or react to CGI effects, these embodiments allow the performer to control and orchestrate a live performance and trigger various computer-generated visual effects.

Digital artists have long sought to integrate human performances together with animated CGI performances. This has been accomplished mainly in a production environment where scripted human sequences can be composited with pre-animated CGI performances. The combination of these elements can be displayed in the same video sequence to give the illusion that the CGI character and the human character coexist in the scene. However, making interactions between the CGI character and the human character appear seamless and realistic requires rehearsal and extensive planning and timing considerations. This is particularly true for interactions between a human actor and elements or characters in a virtual environment. For example, to realistically simulate a human actor lifting a digital character, the timing, placement, motion sequence, and speed of the human actions must be pre-scripted and built into the pre-animated sequence of the digital character. In other words, the human character has to meticulously follow the lead of the digital character. Any deviation from the pre-planned sequence will create visual and/or auditory discontinuities in the presentation that are immediately apparent to audiences. These discontinuities destroy the feeling that producers seek to create in a shared virtual/augmented reality environment.

The embodiments described herein overcome these technical challenges. Instead of forcing the human actor to follow the lead of the digital animation, these embodiments allow the human actor to drive the performance improvisationally and in real time. Instead of following the performance of a digital character, the human performer can instead drive the performance of the digital character based on their motion and position cues. In essence, the performer is able to control and orchestrate the live performance of the digital assets that are part of a corresponding virtual 3-D scene. These digital assets may include character animations, props, background environments, visual effects, and other elements available in virtual 3-D scenes.

The embodiments described herein are geared towards both the home environment and the public performance environment. These embodiments can be used to enhance a gaming or home theater experience that includes a television screen, an AR/VR headset, a mobile phone, and/or a computer. These embodiments can also be used to enhance a public performance that includes a plurality of AR/AVR headsets, one or more performance stages located in different physical areas, a computer server, a plurality of mobile computing devices, and/or a motion-capture system. This disclosure will first describe a performance scenario that can also be duplicated any home environment where a human performer triggers the generation and/or behavior of a digital asset provided to one or more viewers as a composited image. This disclosure will then describe game engine technology that has been enhanced by these embodiments to recognize motion and/or positions from a motion-capture system to transition/blend between animation states for animated characters and/or objects. This disclosure will then describe a new transmission protocol that enables both the large-audience performance scenarios and the home theatre/gaming experience. This disclosure finally describes how these technologies can be combined to create a real-time live performance that mixes human and CGI assets across a number of different physical performance areas.

Embodiments are directed at an immersive content presentation system. For example, immersive content (e.g., virtual reality content, mixed reality content, augmented reality content, etc.) may be presented to a user wearing or holding an immersive device (e.g., virtual reality [V/R] goggles, augmented reality [A/R] glasses, tablets, smartphones, etc.). As described herein, the real-time immersive content presentation system may also be referred to as simply the content presentation system or presentation system.

In some embodiments, the presentation system may manage the integration of content from one or more sources and presents the integrated content to one or more users who are using or wearing immersive devices. In one embodiment, an immersive device may be a pair of A/R glasses. In such an instance, content may be displayed over a display of the A/R glasses and integrated with the physical environment viewable through translucent portions of the A/R glasses display. In another aspect, an immersive device may be a set of virtual reality goggles, a mobile device, or a computing device (e.g., laptop computer, tablet device, smartphone, smart television, etc.). In some embodiments, a camera of the virtual reality goggles, mobile device, or computing device may capture images (e.g., video frames) of the surrounding physical environment. The images may be integrated with content obtained by the presentation system. The resulting integrated images may then be presented to a user via a display of the virtual reality goggles, computing device, or mobile device.

FIG. 1 illustrates a first performance area 102 where images and positions of characters and props may be captured by the presentation system. In some embodiments, the first performance area 102 may be set up in front of a live audience. Although not shown explicitly in FIG. 1, the live audience may surround a portion of the first performance area 102. The first performance area 102 may be characterized as a real-world performance area having an actual human character 108, such as an actor or audience member. The first performance area 102 may also include physical props, such as a table 110, a chair 112, a door 116, a window 114, and so forth. The first performance area 102 does not necessarily require any enhancements or additional material to make the first performance area 102 suitable for inclusion in the immersive content presentation system. For example, the first performance area 102 does not require any motion-capture fiducials, any motion-capture suits to be worn by the human character 108, or any "green screen" chroma-key backgrounds. Instead, the first performance area 102 may be configured using ordinary props, actors, scenery, lighting, and so forth.

In some embodiments, the human character 108 need not wear any special clothing or devices to interact with the immersive content presentation system. However, in some embodiments, the human character 108 may use one or more immersive devices to interact with immersive content. For example, the human character 108 may wear a pair of VR goggles or a pair of AR glasses. As described below, this may allow the human character 108 to see additional immersive content that is composited with their view of the first performance area 102. In some embodiments, the human character 108 may use a mobile computing device, such as a smart phone or tablet computer. The human character 108 can view portions of the first performance area 102 through a camera of the mobile computing device to see portions of the first performance area 102 on the screen of the mobile computing device. Thus, the human character 108 can view portions of the first performance area 102 through the "window" of the mobile computing device. When viewed in this manner, the immersive content presentation system can composite additional immersive content, such as virtual assets, virtual props, virtual characters, CGI effects, and other computer-generated images onto the view of the first performance area 102 as seen by the human character 108. In some embodiments, the human character 108 may also wear motion-capture items, such as visual fiducials, motion-capture suits, and other devices/clothing that facilitate a motion-capture system as described below.

Some embodiments of the first performance area 102 may include a visible-light camera 106. In the example of FIG. 1, the first performance environment 102 includes a single visible-light camera 106. The visible-light camera 106 may capture a view of the first performance area 102 from a single perspective. In some embodiments, the camera 106 can be stationary, while in other embodiments, the camera 106 can be mounted to a track and movable during the performance. As will be described below, the images in a video sequence captured by the camera 106 may serve as a background for a compositing operation. Specifically, any virtual assets that are rendered for display can be composited on top of a stream of images captured by the camera 106.

In some embodiments, the camera 106 may be supplemented or replaced by a plurality of visible-light cameras distributed around the first performance area 102. For example, the camera 106 may be supplemented and/or replaced by a plurality of mobile computing devices that are held by audience members surrounding the first performance area 102. As will be described below, each of these mobile computing devices may capture images of the first performance area 102 from a perspective of each audience member. Any virtual assets that are added to the corresponding virtual scene can then be rendered from the point of view of each individual mobile computing device and displayed such that each user has a unique view of the first performance area 102.

In some embodiments, the camera 106 may be replaced or supplemented by one or more augmented reality devices. For example, one or more audience members surrounding the first performance area 102 may wear pairs of augmented reality glasses. Instead of compositing rendered virtual assets on top of a two-dimensional image of the first performance area 102 captured by a visible-light camera, these embodiments can alternatively display the rendered virtual assets on the AR glasses on top of a natural view of the first performance area 102 by each audience member.

In some embodiments, the first performance area 102 may be equipped with one or more depth cameras 104. The depth cameras 104 may comprise a motion-sensing input device with a depth sensor. The depth sensor may include a monochrome CMOS sensor and infrared projector. The infrared projector can project infrared light throughout the first performance area 102, and the sensor can measure the distance of each point of reflected IR radiation in the first performance area 102 by measuring a time it takes for the emitted infrared light to return to the sensor. Software in the depth cameras 104 can process the IR information received from the depth sensor and use an artificial intelligence machine-learning algorithm to map the visual data and create 3-D depth models of solid objects in the first performance area 102. For example, the one or more depth cameras 104 can receive emitted IR radiation to generate 3-D depth models of the human character 108, the table 110, the chair 112, the door 116, the window 114, along with the floor, walls, and/or ceiling of the first performance area 102. In one test embodiment, the first performance area 102 was surrounded by six to eight Kinect® cameras to capture depth information of objects and performers in the first performance area 102.

Figure 2A:
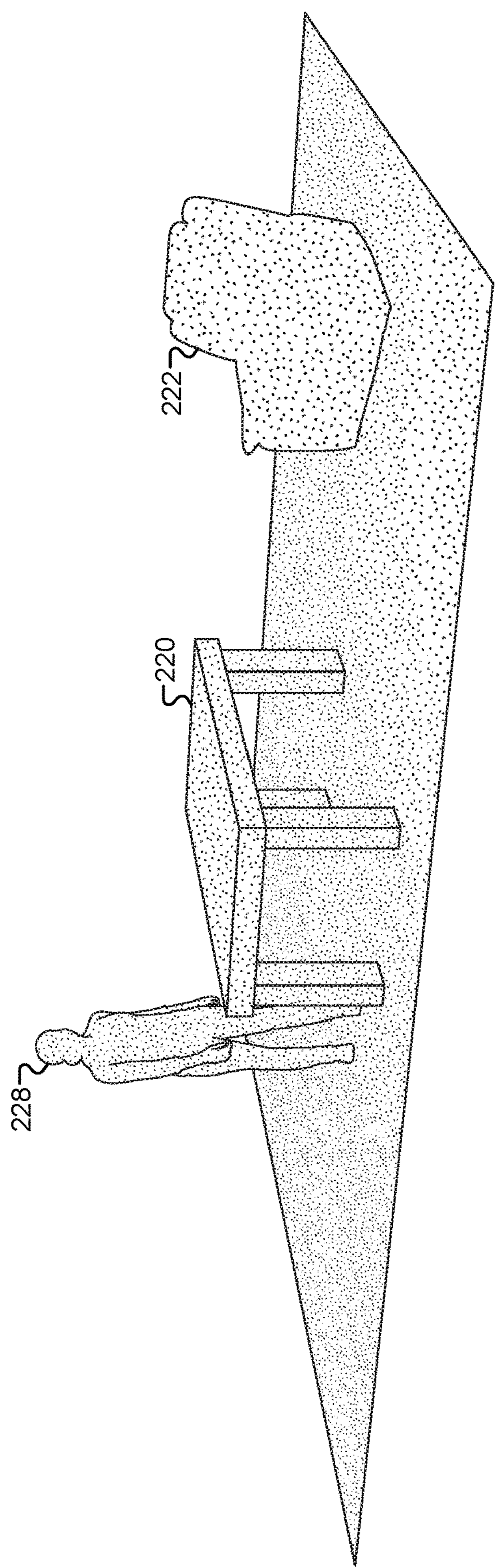
FIG. 2A illustrates a depth image that may be captured by the one or more depth cameras.

FIG. 2A illustrates a depth image that may be captured by the one or more depth cameras 104. Each individual depth camera 104 measures a depth of objects in relation to the camera 104 itself. However, using a ray-tracing algorithm, a plurality of simultaneous depth images can be combined to generate a 3-D depth model of the first performance area 102. This example illustrates how the 3-D depth model of the first performance area 102 may look. FIG. 2A illustrates a 3-D virtual scene that is constructed to approximate the first performance area 102. The 3-D virtual scene may be loaded or generated in a standard package of 3-D modeling software. Objects that are created by the 3-D depth model of the first performance area 102 can be used to generate 3-D virtual objects in the 3-D virtual scene. For example, an object 220 can be created as a volumetric model in the 3-D virtual scene representing the table 110 from the first performance area 102. Similarly, an object 222 can be created as a volumetric model in the 3-D virtual scene representing the chair 112 from the first performance area 102.

In addition to creating volumetric models representing real-world objects in the first performance area 102, the immersive content presentation system may also generate real-time volumetric models of characters and other movable objects in the first performance area 102. For example, an object 228 can be generated to represent the human character 108 from the first performance area 102. As the human character 108 moves around the first performance area 102, the depth cameras 104 can capture depth images of her movement at interactive frame rates, such as 30 frames-per-second (fps), 50 fps, 25 fps, 20 fps, 15 fps, 10 fps, and/or the like. Each set of images captured simultaneously by the depth cameras 104 can be combined to generate a real-time 3-D volumetric model that can be used to generate the object 228 representing the human character 108. This system provides the advantage that any performance area can be modeled and re-created in real-time in a virtual 3-D environment without pre-existing knowledge of objects, characters, and/or arrangement of each performance area. Instead, the depth cameras 104 can create a real-time model of moving and stationary objects in the performance area that can be used in a 3-D virtual scene before adding additional virtual assets as described below.

Figure 2B:
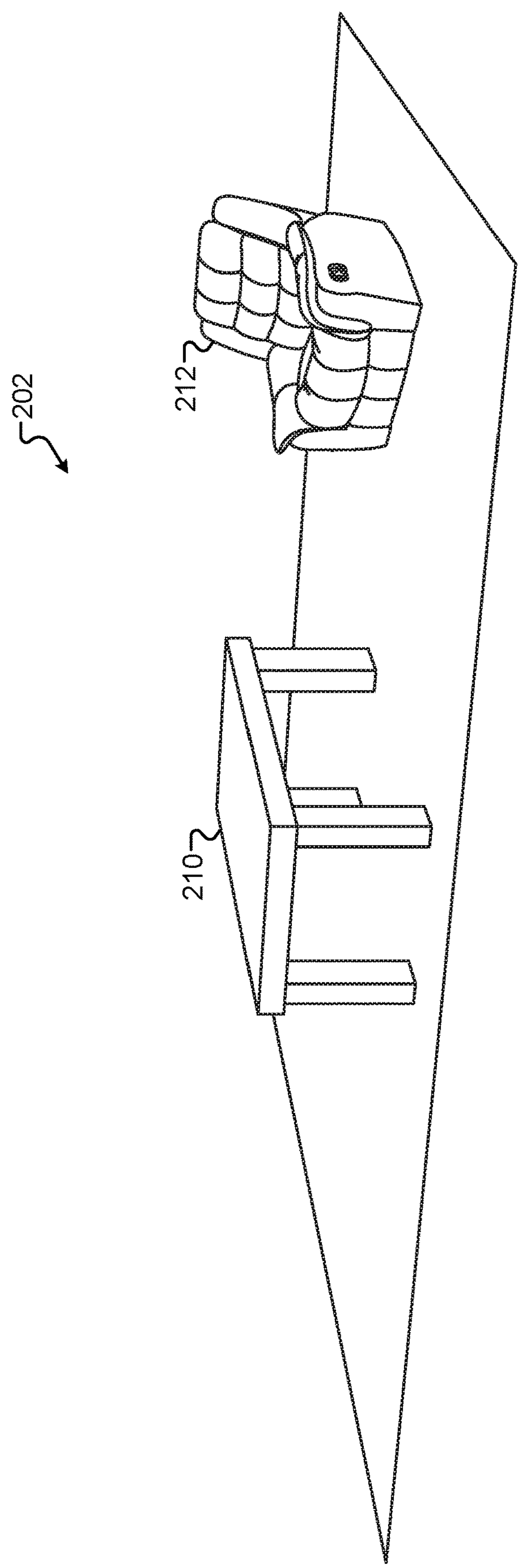
FIG. 2B illustrates a 3-D virtual model of the first performance area using predefined 3-D objects, according to some embodiments.

FIG. 2B illustrates a 3-D virtual model of the first performance area 102 using predefined 3-D objects, according to some embodiments. Some embodiments may not require the depth cameras 104 illustrated in FIG. 1. Instead, pre-existing 3-D models of objects in the first performance area 102 can be inserted in the 3-D virtual scene 202. If the physical configuration of the first performance area 102 is known beforehand, the 3-D virtual scene 202 can be constructed from pre-existing digital models before the performance takes place. A model 210 of a table can be used to represent the table 110 from the first performance area 102, and the model 210 can be placed in a position and orientation that matches the physical table 110 in the first performance area. Similarly, a model 212 representing a chair can be placed in a position and orientation that matches the physical chair 112 in the first performance area 102.

Some embodiments may adapt to choreographed changes in the first performance area 102. For example, if the chair 112 in the first performance area 102 changes from an upright position to a reclining position at a certain time during the performance, the model 212 representing the chair in the 3-D virtual scene 202 can be programmed to also transition to a reclining position at the same time. Alternatively, the immersive content presentation system may accept human inputs in real time during the performance to manipulate objects in the 3-D virtual scene 202. For example, if the human character 108 moves the chair 112 into a reclining position in the first performance area 102, a human operator can provide an input to the immersive content presentation system that changes the position of the model 212 representing the chair 112 such that objects in the 3-D virtual scene 202 reflect changes made to the first performance area 102 in real time.

In the example of FIG. 2B, the 3-D virtual scene 202 does not show a model for the human character 108. Some models may be omitted from the 3-D virtual scene if they lack a predefined model in a content library or if they move dynamically in the first performance area 102 without a predefined, choreographed motion pattern. For example, if the human character 108 is free to move about the first performance area 102, a stationary model in the 3-D virtual scene may not be required. However, some embodiments may place a model that approximates the form of the human character 108 in the 3-D virtual scene 102. A human operator can move the model around the 3-D virtual scene 202 in real time to match the movements of the human character 108 in the first performance area 102. This may be useful in embodiments where the human character 108 interacts with virtual characters or objects that are added to the 3-D virtual scene 202 as described below.

Some embodiments may combine the concepts of FIG. 2A and FIG. 2B. For example, the volumetric object 220 from FIG. 2A may be generated by virtue of the depth cameras 104 distributed about the first performance area 102. As illustrated in FIG. 2B, these volumetric objects lose the texture, color, and other fine surface details of the objects they are modeling. However, the volumetric characteristics of the volumetric object 220 can be used to select a predefined digital model of the table 110 from a pre-existing library of objects. For example, the volumetric characteristics of the object 220 can be compared to volumes of pre-existing tables. The immersive content presentation system can then select a table from a content library that is most similar to the volume of the table 110. The volumetric objects 220, 222 can then be replaced with the 3-D models 210, 212 in the 3-D virtual scene 202. This also allows new objects to be added to the 3-D virtual scene 202 during the performance. For example, if a new human character enters the first performance area 102, the volume of the new human character as approximated by the depth cameras 104 can be used to select a digital model of a human character from a content library that is the same or similar to the new human character in the first performance area. As the new human character moves throughout the first performance area 102, the model of the new human character selected from the content library can be moved throughout the 3-D virtual scene 202 based on the motion of the volume detected by the depth cameras 104. This provides a real-time 3-D virtual scene 202 that is nearly identical to the physical scene in the first performance area 102.

In addition to capturing a real-time visible-light video of the first performance area 102 and generating a 3-D virtual scene 202 that corresponds in real-time to the objects and movements in the first performance area 102, the immersive content presentation system can insert additional virtual assets into the 3-D virtual scene 202 that can then be rendered and displayed for viewers of the first performance area 102 in real time. A human actor can be used to drive the animation, selection, placement, and/or other visible characteristics of any virtual asset added to the 3-D virtual scene 202. As described below, the motion and/or position of the human actor can be used as a trigger input to a game engine that inserts or alters the virtual assets into the 3-D virtual scene 202 in real time.

In some embodiments, the content presentation system may capture a performance being performed by a performer in a second performance area. The performance area may be, for example, a movie/television set, a stage, a stadium, a park, etc. During the performance, the content presentation system may detect the motion and/or positioning of the performer. Such detection may be based on markers or sensors worn by the performer, depth and/or other motion detection sensors of the content presentation system, motion-capture cameras, and/or the like. For example, an array of depth sensors may be positioned in proximity to and directed at the performance area, such as surrounding the perimeter of the performance area. In some embodiments, the depth sensors measure the depth of different parts of the performer in the performance area over the duration of a performance. The depth information may then be stored and used by the content presentation system to determine the positioning of the performer over the performance.

Figure 3:
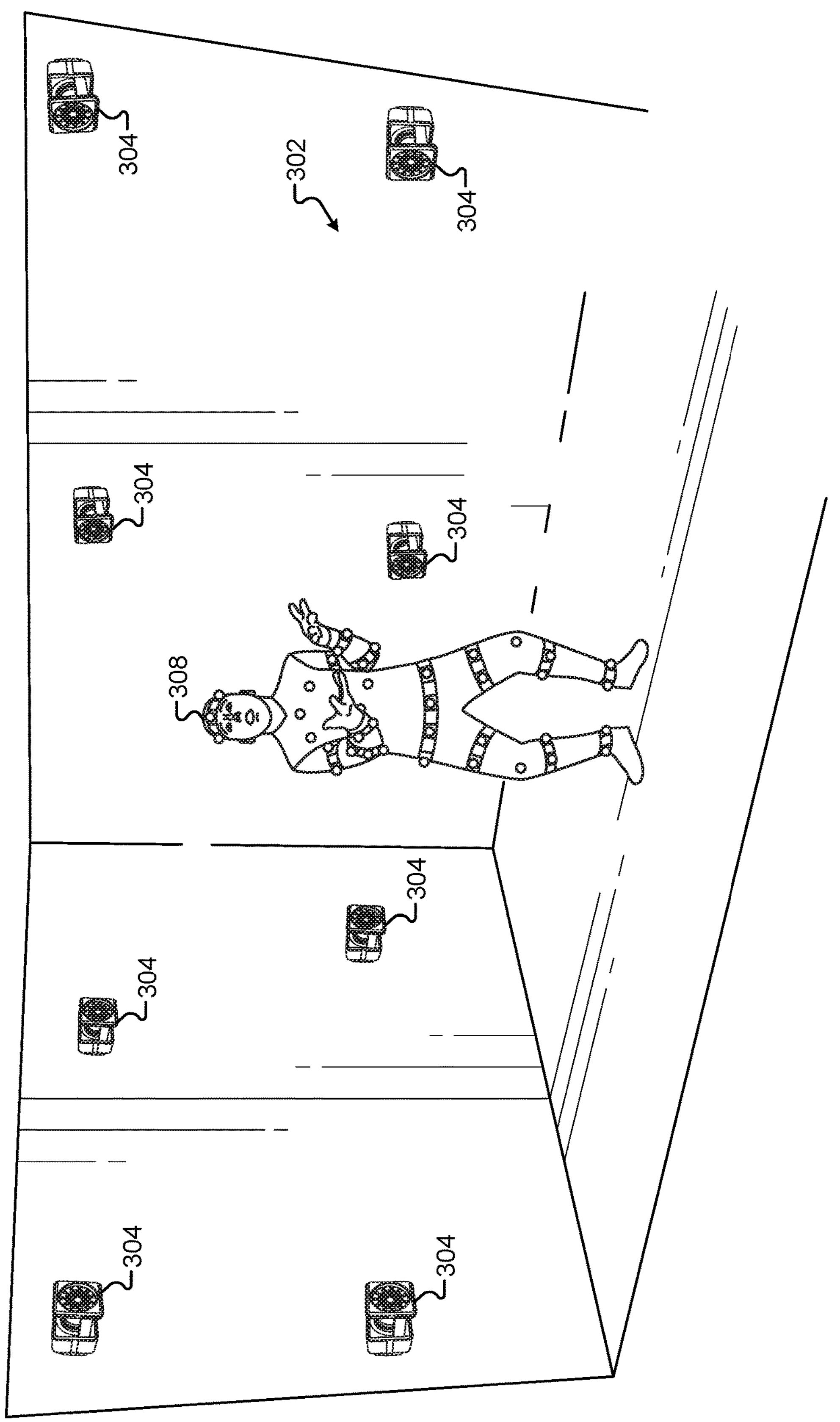
FIG. 3 illustrates a second performance area for a motion-capture performer to drive the visible characteristics of one or more virtual assets, according to some embodiments.

FIG. 3 illustrates a second performance area 302 for a motion-capture performer 308 to drive the visible characteristics of one or more virtual assets, according to some embodiments. The second performance area 302 may include a plurality of motion-capture cameras 304 that are part of a motion-capture system. For example, one test embodiment has used a VICON® motion-capture system that includes the plurality of motion-capture cameras 304 and a server process that processes the motion information captured by the motion-capture cameras 304. The motion-capture performer 308 may wear special clothing and/or objects for the motion-capture process. For example, some motion-capture systems use balls that are coated with reflective tape or other reflective surfaces. These can be attached (e.g., velcroed) to a bodysuit made of spandex or lycra worn by the motion-capture performer 308. Other types of visual fiducials may be used as well to track the motion of the motion-capture performer 308, such as barcodes, QR codes, lights, crosses, and/or other visual patterns or geometries.

In some embodiments, the second performance area 302 may be within view of the first performance area 102. For example, the motion-capture actor 308 may be able to see the first performance area 102, including the human character 108, the table 110, and so forth. Similarly, the human character 108 may be able to see the second performance area 302 including the motion-capture performer 308. This allows the human character 108 to see the movements and/or hear the voice of the motion-capture actor 308 and respond accordingly. For example, when the motion-capture actor 308 begins making a juggling motion, the human character 108 can applaud in reaction because the human character 108 can see the actions of the motion-capture actor 308. Thus, even though the first performance area 102 may be physically separated from the second performance area 302, humans in either performance area 102, 302 can interact with each other as though they share the same performance area. This allows the CGI character representing the motion-capture actor 308 to be inserted into a view of the first performance area 102 while the human character 108 interacts with the CGI character in a realistic, un-choreographed fashion.

In some embodiments, the first performance area 102 may be remotely located away from the second performance area 302. For example, the first performance area 102 may be located in a first building or structure while the second performance area 302 is located in a second building or structure. The first performance area 102 may be remotely located such that it is a distance of greater than 1 mile away from the second performance area 302. The first performance area 102 may be located such that it is not visible to the motion-capture performer 308, and such that the second performance area 302 is not visible to the human character 108. In this configuration, the second performance area 302 may be equipped with a camera that captures a real-time video of the motion-capture performer 308 and displays this video in real time on a display screen that is visible to the human character 108 in the first performance area 102. Similarly, the first performance area 102 may broadcast video captured by the camera 106 to a display screen that is visible to the motion-capture performer 308 in the second performance area 302 in real time. This allows an un-choreographed, interactive performance between the human character 108 and a CGI character represented by the motion-capture actor 308 even though the two performance areas 102, 302 may be physically separated by large distances.

In some embodiments, the first performance area 102 may be combined with the second performance area 302 into the same physical performance area. For example, the combined performance area may include the depth cameras 104, the camera 106, and/or the motion-capture cameras 304. The combined performance area may also include the human character 108, the table 110, the chair 112, and the motion-capture performer 308 in the same set. The depth cameras 104 can still capture a depth image of the combined set as described above, and the motion-capture cameras 304 can still generate the motion-capture data for the motion-capture performer 308. As described below, a view of the combined performance area on a display device, such as a display screen, VR goggles, AR glasses, a mobile computing device, etc., can "re-skin" the motion-capture performer 308 with an alternate CGI representation such that the view of the motion-capture performer 308 is replaced by the CGI representation in the composited view of the combined performance area described below.

Figure 4:
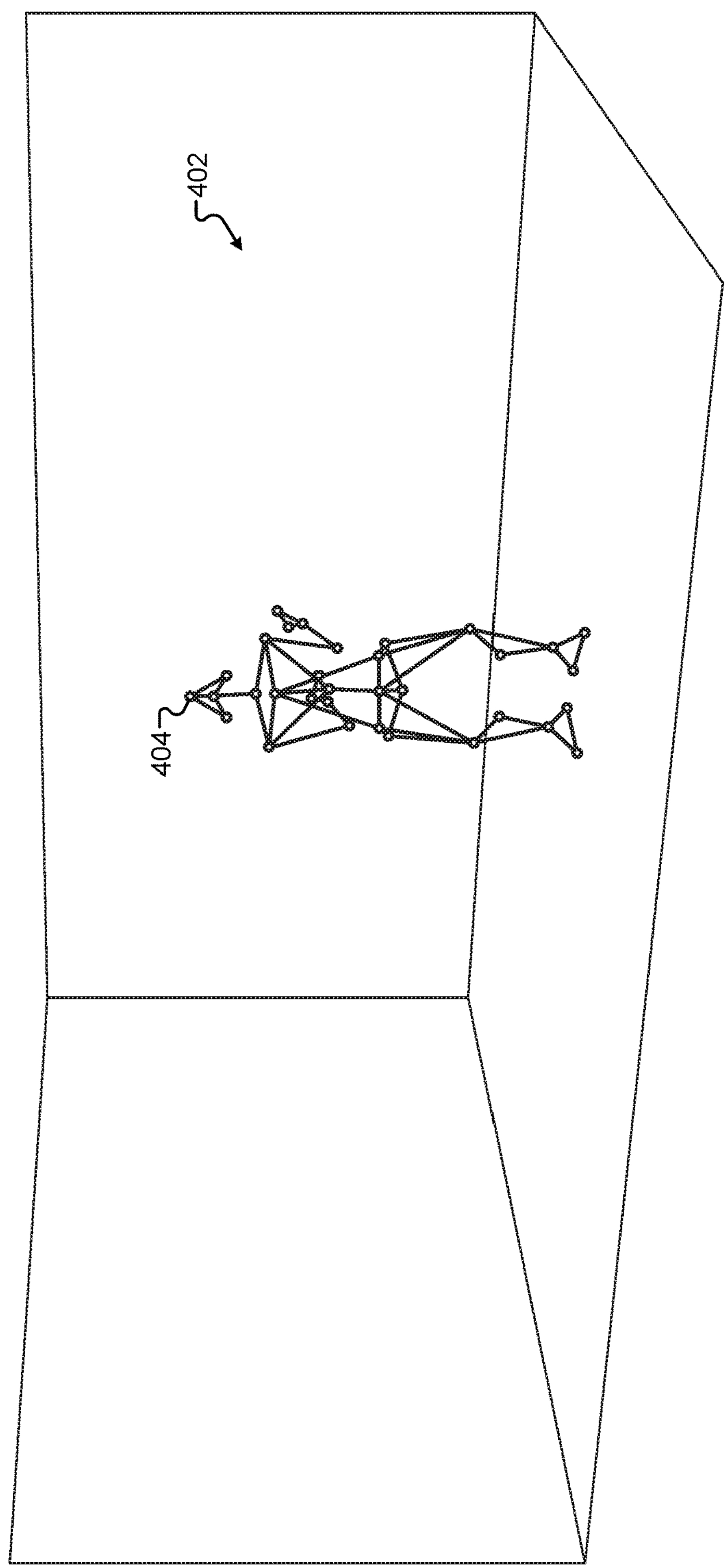
FIG. 4 illustrates a resulting motion-capture output derived from the images captured by the motion-capture cameras, according to some embodiments.

FIG. 4 illustrates a resulting motion-capture output derived from the images captured by the motion-capture cameras 304, according to some embodiments. The motion-capture output can be used to generate a representation of the motion-capture performer 308 in the second performance area 302. In this example, each of the visual fiducials used to track the motion of the motion-capture performer 308 can be represented by a vertex, and each of the vertices can be connected to represent a skeleton or wireframe of the motion-capture performer 308. As depicted in FIG. 4, a 3-D representation of the motion-capture frame 404 can be created in a 3-D environment 404. The visual fiducials on the motion-capture suit of the motion-capture performer 308 are tracked in real time by the motion-capture system, and the vertices of the motion-capture frame 404 can move accordingly in real time in the 3-D environment 404 to mimic exactly the motions of the motion-capture performer 308.

For example, when the motion-capture performer 308 begins making a juggling motion with his hands and arms, the frame 404 may begin moving its "hands and arms" in a corresponding fashion.

As will be described in greater detail below, the motions of the frame 404 can be translated into a set of inputs for a game engine. A game engine comprises a software development and execution environment designed to support a videogame or virtual-reality experience. A game engine may include several core functional blocks comprising a rendering engine for 2-D or 3-D graphics, a physics engine including collision detection and/or response, a sound engine, scripting pipelines, animation sequencing, artificial intelligence, network communications, memory management, process threading, scene graph support, and video processing. Most relevant to the embodiments described herein, a game engine may provide a physics system that simulates physical interactions between virtual objects based on programmable physics rules. This can include collisions, friction, reactions, and/or other inertial characteristics of physical objects modeled in the defined physics environment. For example, a game engine can receive inputs that would affect or apply a simulated force to a virtual object, and the game engine can output resulting movements of the affected object.

Figure 5:
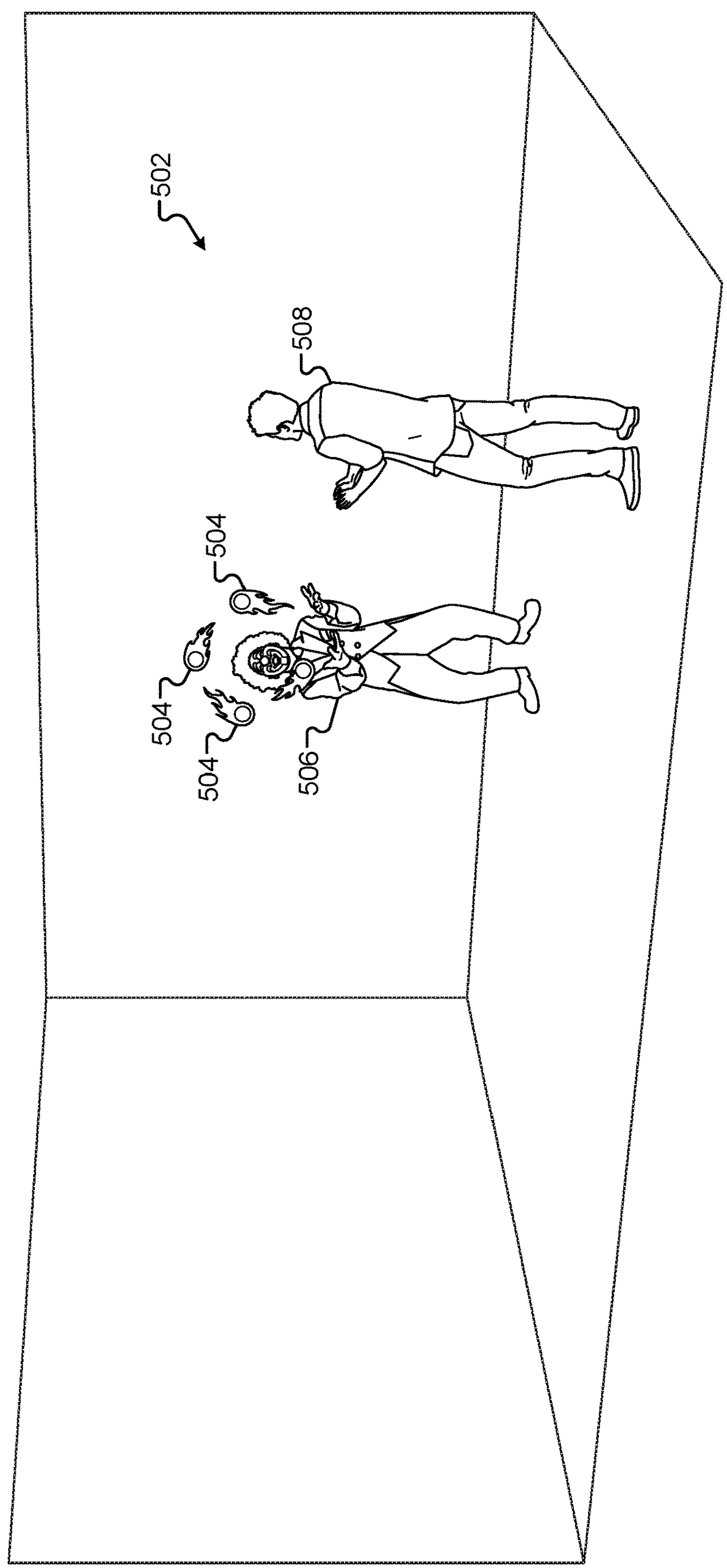
FIG. 5 illustrates a view of a 3-D environment that includes virtual assets that are generated and/or controlled by movements of the motion-capture frame, according to some embodiments.

In some embodiments, an existing game engine can be modified to include code that recognizes predefined movements of the frame 404 and triggers the insertion and/or motion of predefined virtual assets in a 3-D environment accordingly. FIG. 5 illustrates a view of a 3-D environment 502 that includes virtual assets that are generated and/or controlled by movements of the motion-capture frame, according to some embodiments. In this example, the immersive content presentation system can cause the frame 404 representing the position and/or movements of the motion-capture performer 308 to be "re-skined," which may include adding additional textures and/or volumetric features to the representation of the frame 404 to provide a different appearance. For example, in FIG. 5, the frame 404 has been replaced with a 3-D model of a clown 506. In some embodiments, the 3-D model of the clown 506 may include a full 3-D character model of a clown character with control points that are linked to the vertices on the frame 404. The movements of the vertices of the frame 404 may then drive corresponding movements of the 3-D model of the clown 506. The location of the 3-D model of the clown 506 can be placed in the 3-D environment 502 in a location that corresponds to the location of the motion-capture performer 308 in the second performance area 302.

The 3-D model of the clown 506 may be considered a "virtual asset" that is generated, added to the 3-D environment 502, and motion controlled by the motion and/or position of the motion-capture performer 308. For example, the 3-D model of the clown 506 can be inserted into the 3-D environment 502 when the motion-capture performer 308 reaches a certain position in the second performance area 302. When the motion-capture performer 308 walks to the center of the second performance area 302, the 3-D model of the clown 506 can be generated in the 3-D environment 502. In another implementation, the 3-D of model of the clown 506 can be inserted into the 3-D environment 502 whenever the motion-capture performer 308 is visible to the motion-capture cameras 304 in the second performance area 302. Similarly, when the motion-capture performer 308 moves to a predefined position or executes a predefined gesture/action, the 3-D model of the clown 506 can be removed from the 3-D environment 502. Thus, not only do the movements of the motion-capture performer 308 drive the movements of the 3-D model of the clown 506, but the position and/or movements of the motion-capture performer 308 may also trigger the generation/deletion of the 3-D model of the clown 506 from the 3-D environment 502. This functionality may be provided through the game engine, which has been modified to recognize predefined positions and/or movements of the frame 404 from the motion-capture system and trigger the generation, deletion, and/or motion of virtual assets in response.

The 3-D model of the clown 506 is used only as an example and is not meant to be limiting. In other embodiments, more elaborate and fantastical re-skins can be applied to the frame 404. For example, some embodiments use the motion of the frame 404 to drive humanoid or robotic characters, animal characters, human-animal hybrid characters, dinosaurs, alien creatures, objects, machinery, and/or any other virtual asset. Thus the frame 404 can be replaced or re-skinned with any virtual asset, and the motion of the vertices of the frame 404 can be used to drive the corresponding motion, if any, of the virtual asset.

In addition to using the recognition of predefined positions and/or movements of the frame 404 to create a "re-skin" for the frame 404, the game engine can also recognize predefined positions and/or movements of the frame to generate visual effects and/or other visual assets. In the example of FIG. 5, the back-and-forth motion of the "hands" of the frame 404 would correspond to the juggling motion made by the motion-capture performer 308 in the second performance area 302. This back-and-forth motion of the vertices of the frame 404 can match a predefined movement pattern of those vertices that is recognized by the game engine. In response, the game engine can insert one or more digital effects into the 3-D environment 502. The game engine can insert 3-D models of objects that the 3-D model of the clown 506 can appear to be juggling, such as the 3-D models of the flaming balls 504 depicted in FIG. 5.

Other visual effects may include generating mist or fog, causing lightning to strike, creating magic effects, such as electricity being emitted from a character's fingertips, generating fire or ice, changing the lighting of the 3-D environment 502, moving other virtual assets in the scene, and so forth. The following non-limiting list of examples illustrates some of the many conceivable virtual assets or effects that can be generated in the 3-D environment 502 in response to recognizing predefined motions of the frame 404. A character may slowly raise and lower their arms to increase or decrease the lighting in the 3-D environment 502. A character may point at an object and cause the object to lift off the ground as though by magic—the object may be purely virtual and visible in the view provided to an audience, or the object may be a physical object that is made to appear to move by compositing a rendered version of the object moving on top of the visible object to the audience. A character may perform a predefined finger gesture to cause lightning, fire, ice, or other substances to be emitted from their hands or fingertips. A character may lift a virtual object or cause it to shrink or grow in size by "squeezing" it between their arms or hands. A character may perform a predefined gesture that causes fireworks, fire, lightning, explosions, and/or other sudden occurrences. The modifications made to the game engine for these embodiments can be programmed to perform these and many other digital effects based on the recognition of predefined motions, gestures, and/or positions of the frame 404.

In addition to re-skinning the frame 404 with the 3-D model of the clown 506 and inserting a new set of visible objects comprising the 3-D models of the flaming balls 504, the recognition of predefined motions, gestures, and/or positions of the frame 404 can also drive the reactions of other digital CGI characters. In the example of FIG. 5, an observing character 508 has been added to the 3-D environment 502. The observing character 508 can be placed by default into the 3-D environment 502 at the beginning of the performance, or may be generated in response to the recognition of a predefined motion/gesture/position of the frame 404 from the motion-capture performer 308. For example, when the frame 404 walks into a center area of the 3-D environment 502, the game engine can cause the 3-D model of the observing character 508 to walk into the 3-D environment 502 using a predefined animation sequence.

Once the 3-D model of the observing character 508 has been added to the 3-D environment 502, the motion/gesture/position of the frame 404 can also trigger reactions from the observing character 508. For example, after performing the juggling motion for a predefined time interval, the game engine can cause the 3-D model of the observing character 508 to transition to an animation sequence that causes the observing character 508 to applaud the performance of the clown 506 enthusiastically. Similarly, when the game engine recognizes that the juggling gesture performed by the frame 404 has stopped, the game engine can cause the 3-D model of the observing character 508 to transition back to an animation sequence where he stands still. In addition to providing a realistic, unscripted, real-time performance between the human character 108 and the 3-D model of the clown 506, this also allows the game engine to insert additional virtual characters into the performance such that the human character 108, the 3-D model of the clown 506, and the 3-D model of the observing character 508 are all able to interact with each other with the scene being driven by the movements of the motion-capture performer 308.

At this point, elements of the 3-D scene 502 may have been generated in a virtual environment, but they still remain separate from the physical environment of the first performance area 102. In order to integrate these two environments together for viewers of the first performance area 102, the immersive content presentation system can first combine the two environments in a virtual form, then generate a rendered 2-D image that can be composited in real time with the image from the camera 106 of the first performance area 102.

Figure 6A:
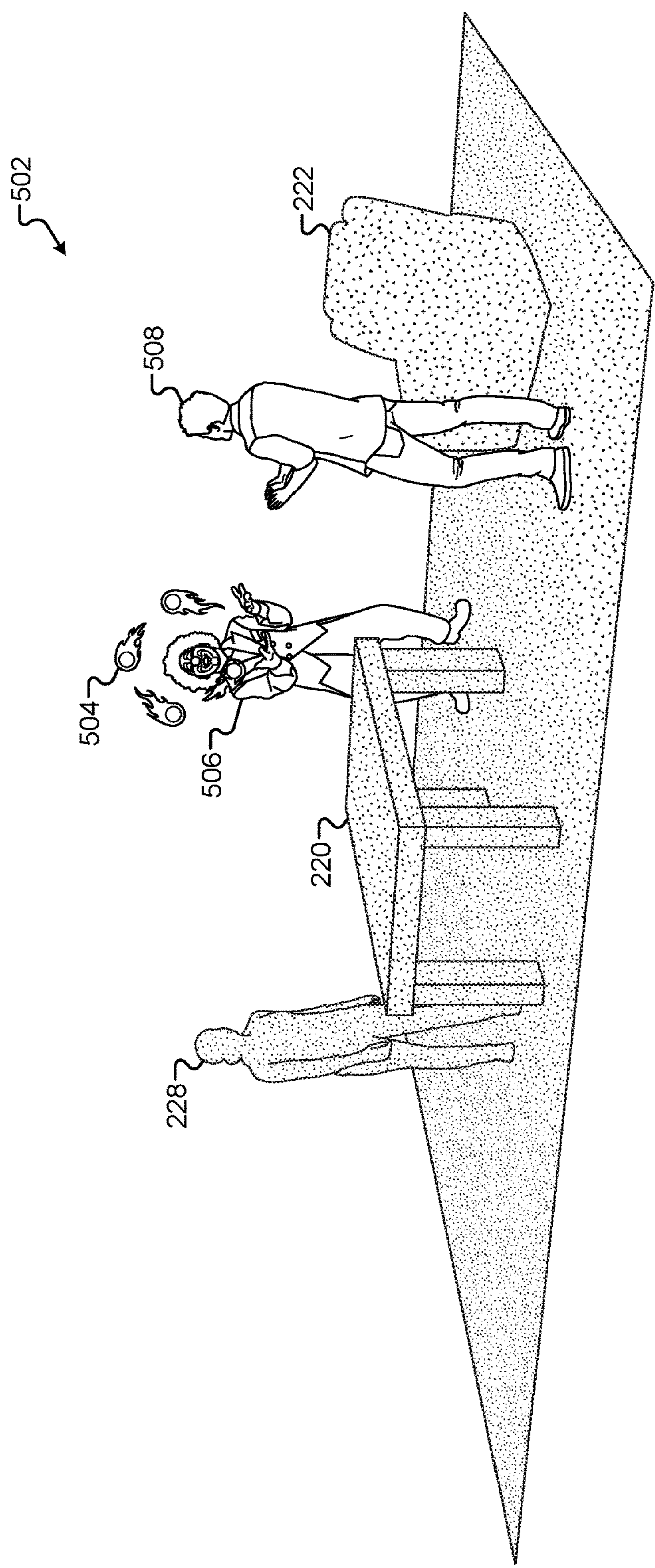
FIG. 6A illustrates a view of the 3-D environment that incorporates elements based on the first performance area, according to some embodiments.

FIG. 6A illustrates a view of the 3-D environment 502 that incorporates elements based on the first performance area 102, according to some embodiments. FIG. 6A illustrates the same 3-D model of the clown 506, 3-D models of the flaming balls 504, and 3-D model of the observing character 508 that were present in the 3-D environment 502 of FIG. 5. However, FIG. 6A adds additional virtual objects that model the real-world objects from the first performance area 102. Specifically, objects created as volumetric models of the elements of the first performance area 102 have been added to the 3-D environment 502. For example, the object 220 representing the volumetric model of the table 110 has been added in front of the 3-D model of the clown 506. The object 222 representing the volumetric model of the chair 112 has been added behind the 3-D model of the observing character 508. The object 228 representing the volumetric model of the human character 108 has been added behind the object 220.

In this example, the physical areas in the first performance area 102 and the second performance area 302 have been combined into a single virtual area in the 3-D environment 502. Thus, the relative locations of the objects in each of the performance areas 102, 302 have been maintained in the 3-D environment 502. A single coordinate system may be used to place elements from each scene relative to each other. For example, if the center coordinates of the first performance area 102 centered on the table 110, then the corresponding center coordinates of the second performance area 302 would be centered in front of the motion-capture performer 308 where the table should be. When combining elements from both of the performance areas 102, 302, this would place the object 220 representing the volumetric model of the table 110 in front of the 3-D model of the clown 506. In some embodiments, the second performance area 302 can be marked with cutouts, props, floor tape, holograms, or other representations of physical objects in the first performance area 102. These can provide visual cues to the motion-capture performer 308 such that they can act/move around the object that would be present in the first performance area 102. This provides a more lifelike and realistic performance when the elements of both scenes are combined for the audience. Additional details for maintaining a consistent coordinate system between different performance areas is described in greater detail below.

This example uses the objects representing volumetric models of elements of the first performance area 102 as captured by the plurality of depth cameras 104. This is possible because these objects as captured by the depth cameras 104 are not actually rendered from the 3-D environment 502. Instead, they are placed in the 3-D environment 502 so that when images of the 3-D model of the clown 506 and the 3-D model of the observing character 508 are rendered and composited onto an image of the first performance area 102, the images of these characters can be seen moving seamlessly in front of, behind, and in-between the objects in the first performance area 102. Therefore, an approximation of the volume of objects in the first performance area 102 can be used without requiring textures, colors, patterns, or other surface details that would not necessarily be captured by the depth cameras 104. The volumes alone may be sufficient to create cutouts in the rendered images of the virtual characters 506, 508 as described further below.

Figure 6B:
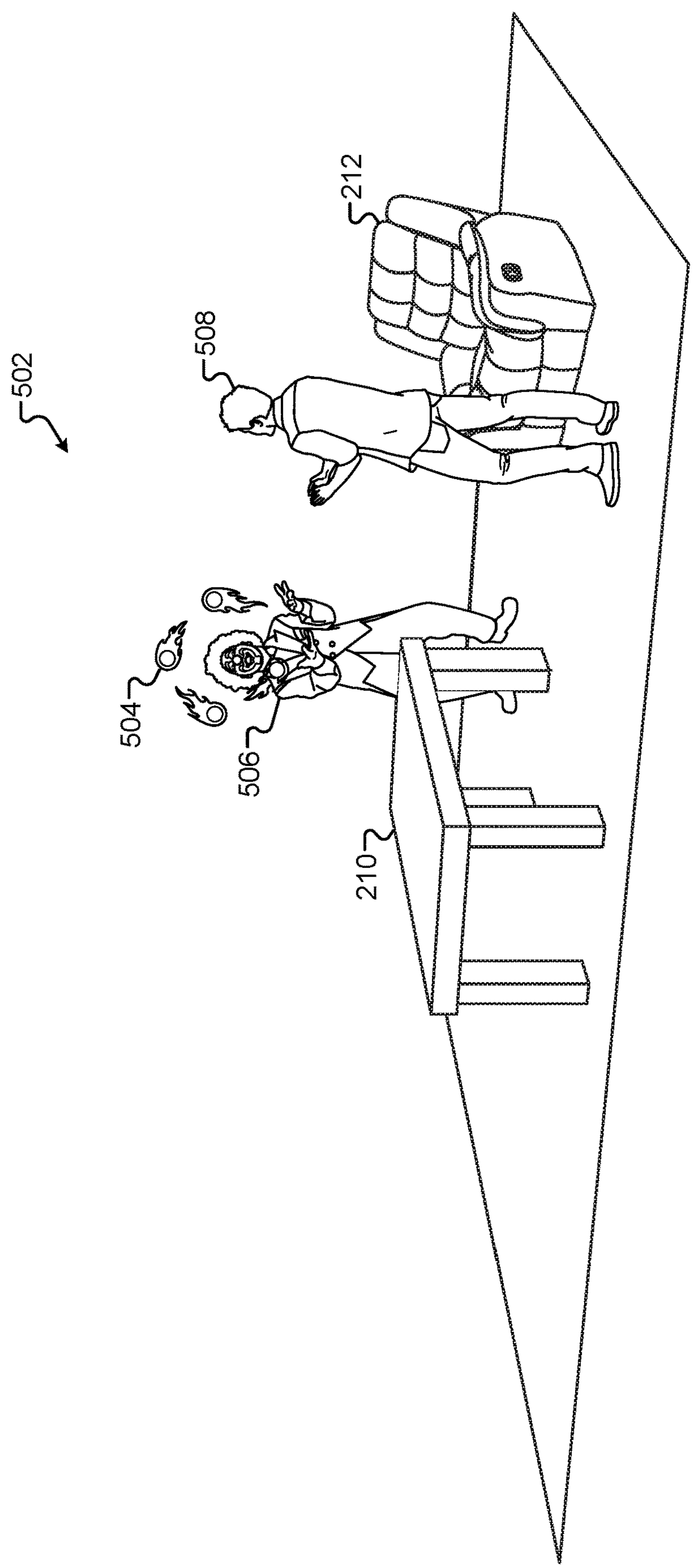
FIG. 6B illustrates a view of the 3-D environment that incorporates elements based on the first performance area, according to some embodiments.

FIG. 6B illustrates a view of the 3-D environment 502 that incorporates elements based on the first performance area 102, according to some embodiments. FIG. 6B illustrates the same 3-D model of the clown 506, 3-D models of the flaming balls 504, and 3-D model of the observing character 508 that were present in the 3-D environment 502 of FIG. 5. However, in contrast to FIG. 6A, FIG. 6B adds the 3-D models 210, 212 that were selected in FIG. 2B. Specifically, the 3-D model of the table 210 and the 3-D model of the chair 212 have been placed into the 3-D environment 502 in their corresponding locations from the first performance area 102. As described above, these 3-D models 210, 212 can be selected by human inputs, such as an administrator designing the 3-D environment to load and place virtual assets corresponding to objects and locations from the first performance area 102. Alternatively, these 3-D models 210, 212 may be automatically selected by matching virtual assets from a content library or virtual asset data store that match within a predetermined threshold the volumetric model created by the depth cameras 104.

In this example, the object 228 representing the volumetric model of the human character 108 has not been included in the 3-D environment 502. Some embodiments may omit the model of the human character 108 because the human character 108 is dynamic and can move throughout the first performance area 102 in an unscripted manner. Alternatively, some embodiments can include a digital character model of the human character 108 in the 3-D environment 502 as described above. Some embodiments may also use the object 228 representing the volumetric depth model of the human character 108 from FIG. 6A. Thus, objects from volumetric depth models may be mixed and matched with models loaded from a content library in the 3-D environment 502 in any combination and without limitation. For example, objects that may be considered static, such as the table 110 may be represented by models loaded from a content library, while objects that may be considered dynamic in the scene, such as the human character 108, may be generated in real time in the 3-D environment 502 based on the real-time generation of the volumetric depth model from the depth cameras 104.

Figure 7:
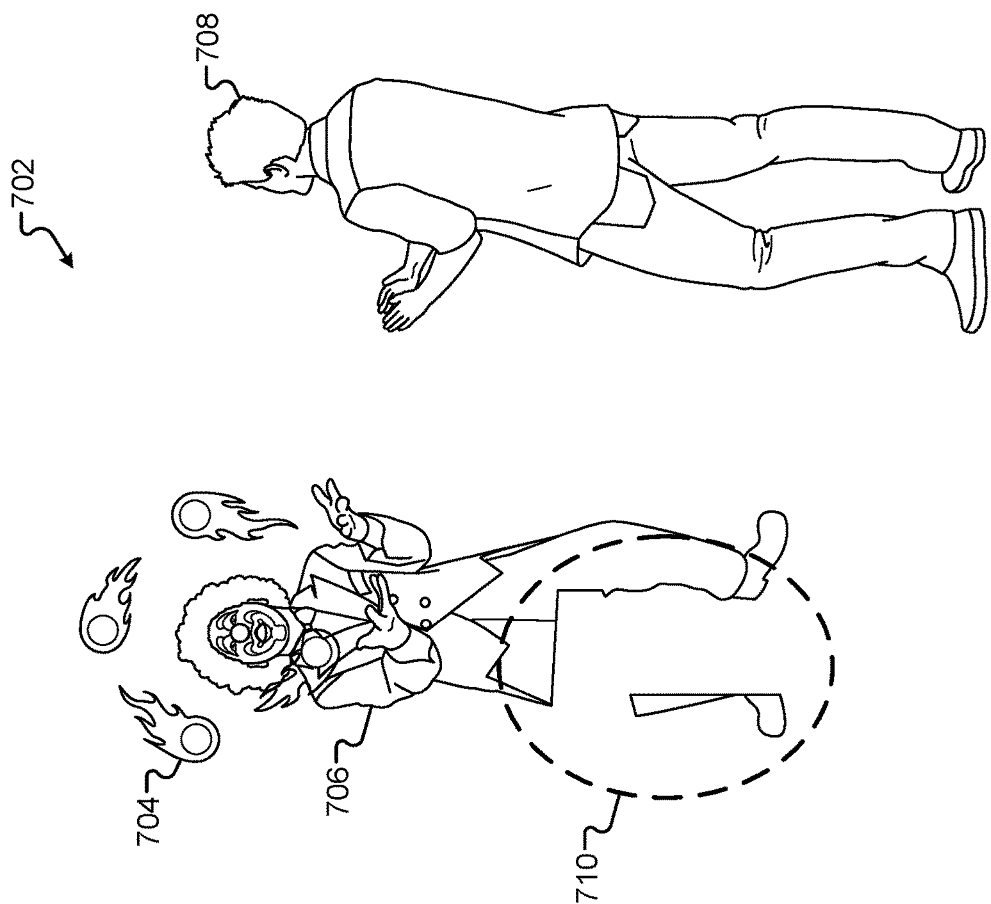
FIG. 7 illustrates a rendered 2-D image of the 3-D environment before it is composited for display, according to some embodiments.

FIG. 7 illustrates a rendered 2-D image of the 3-D environment 502 before it is composited for display, according to some embodiments. Instead of simply rendering a view of the complete 3-D environment 502 for display to the audience, the embodiments herein combine some of these rendered elements with a real-time view of the first performance area 102 to provide an immersive mixed-reality experience. Recall that some objects in 3-D models were added to the 3-D environment 502 to represent real-world objects from the first performance area 102. However, because these objects already exist in images captured of the first performance area 102, they do not need to be rendered and composited for display to the audience, which would create duplicate, overlapping views of the same objects. Instead, the actual images of these objects can be included in the composited image to provide a more realistic and lifelike experience.

These objects and 3-D models may have been added to the 3-D environment 502 in order to create cutouts in the digital characters that are added to the scene by virtue of the performance of the motion-capture performer 308. For example, FIG. 6B shows the 3-D model of the clown 506 standing behind the 3-D model of the table 210. If the 3-D model of the clown 506 were simply rendered without the 3-D model of the table 210, then the entire clown would be visible in the rendered image. Consequently, when this image is composited with a real-world image of the first performance area 102, the clown would appear to be in front of the table 110.

In some embodiments, the 3-D environment 502 can be rendered and pixels in the 2-D image 702 corresponding to objects and 3-D models added to the 3-D environment 502 that are based on real-world objects from the first performance area 102 can be removed from the rendered 2-D image 702. In the example of FIG. 7, pixels in the 2-D image 702 have been removed that correspond to the 3-D model of the table 210 and the 3-D model of the chair 212. Because the 3-D model of the chair 212 was behind the observing character 508 in the 3-D environment 502, the image of the observing character 708 has not been affected. The pixels rendered from the 3-D model of the chair 212 that show through from behind the image of the observing character 708 can be removed and replaced with transparent values. Alternatively, instructions can be provided to the rendering process of the game engine to not render the 3-D model of the chair 212 into the resulting 2-D image 702. Generally, pixels that are not rendered, background pixels, and pixels that are removed from the 2-D image 702 can be replaced with pixels having transparent values such that the 2-D image 702 can be composited with another background image.

Removing the 3-D model of the table 210 has a different effect than removing the 3-D model of the chair 212. Because the 3-D model of the clown 506 is behind the 3-D model of the table 210 from the view of the virtual camera rendering the 2-D image 702, removing the pixels resulting from the 3-D model of the table 210 will leave a cutout 710 in the 2-D image of the clown 706. The cutout 710 corresponds to the portions of the image of the clown 706 that would not be visible behind the 3-D model of the table 210 relative to the virtual camera of the rendering operation. As will be shown below, creating the cutout 710 allows the image of the clown 706 to appear behind an image of the table when the 2-D image 702 is composited with a real-world image of the first performance area 102.

The rendering operation that generates the 2-D image 702 can be captured from the virtual camera location corresponding to the location of the camera 106 in the first performance area 102. For example, image 702 can be rendered from a perspective of a camera positioned in a similar location in the first performance area 102. This may be true for compositing operations where the same composited image is displayed to all of the audience members, such as on a large display screen above or beside the first performance area 102. In other embodiments, multiple devices may be used to view the composited image. For example, audience members may each be wearing an individual pair of AR glasses, or audience members may be viewing the first performance area 102 through the camera display screen of mobile computing devices such as a smartphone or tablet computer. In these implementations, the rendering operation that generates the 2-D image 702 may take place once for each individual display device, and these rendering operations may be captured from virtual cameras in the 3-D environment 502 corresponding to the individual locations of the display devices. For example, for audience members wearing AR glasses, the rendering operation may generate a unique 2-D image 702 for each individual device that are based on their location relative to the first performance area 102. As described below, these display devices can provide location information to the rendering operation such that the rendering operation can determine the location of each virtual camera. Thus, each version of the rendered 2-D image 702 may appear different based on the location of the audience member. For example, as an audience member removes towards the left side of the first performance area 102, the cutout 710 will shift to the right in the 2-D image 702 and cover more of the image of the clown 706. This rendering operation can be distributed to a mobile device, or may be performed centrally at a single server or plurality of servers having sufficient processing power to render multiple images of the 3-D environment 502 simultaneously such that real-time video sequences can be generated for multiple viewing devices.

Figure 8:
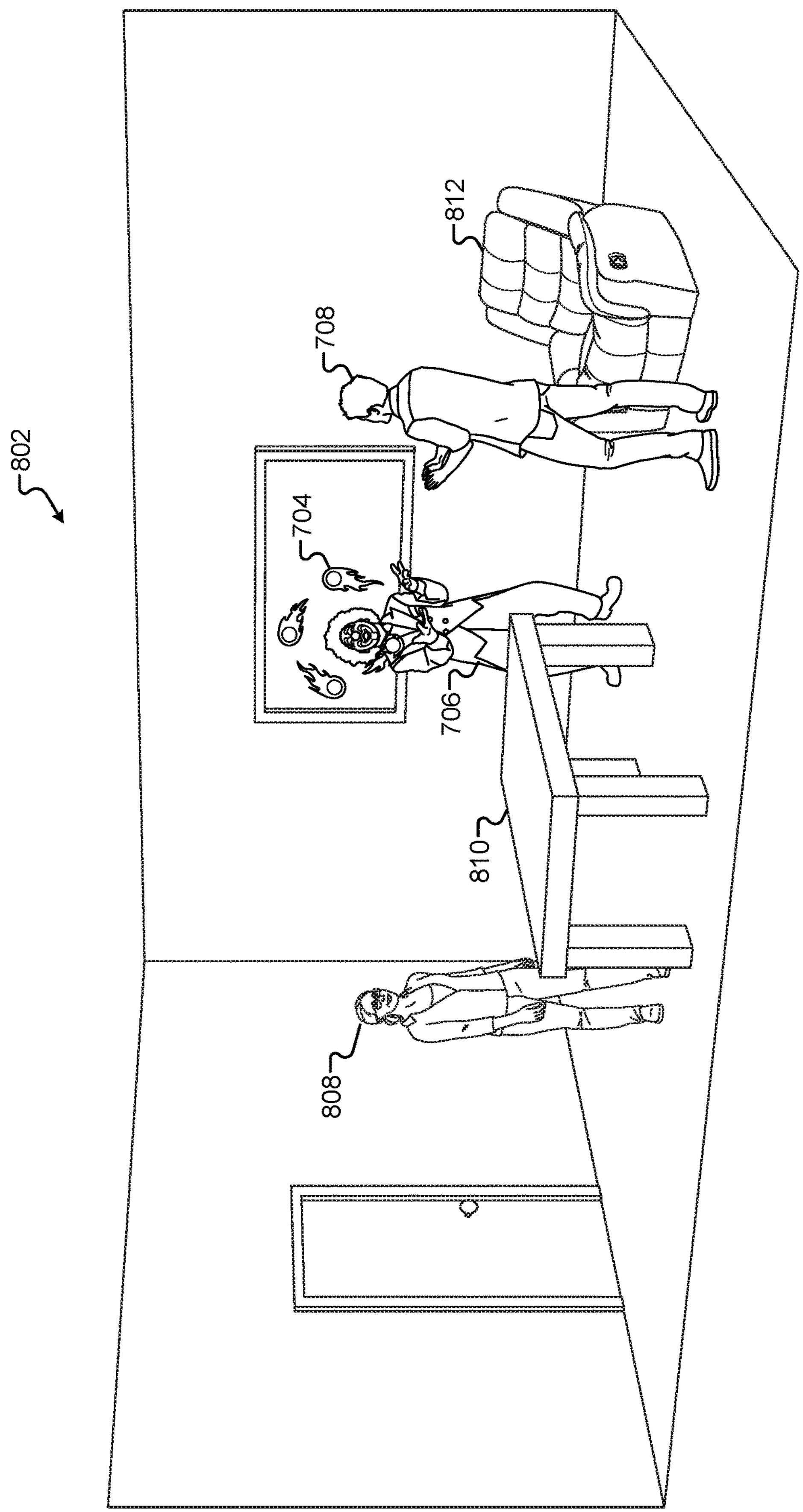
FIG. 8 illustrates a view of a composited view that combines an image of the first performance area with the rendered 2-D image of the 3-D environment, according to some embodiments.

FIG. 8 illustrates a view of a composited view 802 that combines an image of the first performance area 102 with the rendered 2-D image 702 of the 3-D environment 502, according to some embodiments. Additional composited views according to different embodiments will discussed in subsequent figures. In this embodiment, the image of the first performance area 102 may include a real-time 2-D image captured from the camera 106. For example, the camera 106 may capture a real-time 2-D image of the character 808, as well as an image of the table 810, an image of the chair 812, along with other visible components of the first performance area 102.

The capture of the image of the first performance area 102 and the display of the composited view 802 may occur in real-time. As used herein, the term "real-time" refers specifically to an interactive frame rate, or a frame rate at which there is not a noticeable, significant lag between what a viewer in the audience would observe in the first performance area 102 using their naked eye and the display of the composited view 802. In some cases, real-time implies less than a 1-second delay between capturing the image of the first performance area 102 and the display of the corresponding composited view 802.

Additionally, the examples described herein refer largely to a single composited view, a single 2-D image, a single 2-D rendering of the 3-D environment, and so forth. However, each of these views/images may be part of continuous real-time video streams. Thus, any reference to a single view/image should be understood to be applicable to a sequence of views/images that are presented as a real-time video stream comprised of a plurality of views/images. By applying the techniques and methods described herein to each view/image/frame in a real-time video stream or sequence, an audience member is able to experience an immersive experience where real-world and virtual-world elements are combined in a single, continuous, live presentation. Similarly, any reference to a camera refers to a camera capable of capturing single images and/or capturing continuous video streams.

As described above, the composited view 802 may use images in the video stream of images captured by the camera 106 as one layer in compositing operation. Additionally, the immersive content presentation system may use the rendered 2-D image 702 that includes the image of the clown 706, the image of the observing character 708, and the image of the flaming balls 704 as a second layer in the compositing operation. Because the location of the virtual camera used to render the 2-D image 702 corresponds to a location in the first performance area 102 of the camera 106, these two layers can be composited together to form the single composited view 802 of the complete scene.

As described above, the rendered 2-D image 702 can apply cutouts to rendered virtual assets that are to be inserted into the composited view 802. For example, the image of the clown 706 has a cutout 710 corresponding to the image of the table 810 from the view of the camera 106. Thus, when the two layers are composited together, the cutout 710 causes the image of the clown 706 to appear to be behind the image of the table 810. Again, this cutout/rendering of the 3-D environment 502 can be executed for each image frame in a video stream that includes the composited view 802. For example, if the motion-capture performer 308 begins to move around the second performance area 302 in a pattern that would walk around the location of the table 110 in the first performance area 102, the cutout 710 in the image of the clown 706 would be adjusted in each frame such that the image of the clown 706 would appear to walk around the image of the table 810 in the composited view 802. This cutout/rendering operation in a video stream makes the image of the clown 706 appear to be an integral part of the overall composited image 802 such that it is indistinguishable to a viewer that the image of the clown 706 is not a part of the real-world environment of the first performance area 102.

The composited view 802 of FIG. 8 can be displayed on any suitable display device. In some embodiments, the composited view 802 can be displayed on a large display screen that is near the first performance area 102. This allows the audience to watch the performance of a human character 108 in the first performance area 102 and simultaneously see the resulting composited view 802 on the large display screen. For example, the large display screen may be an image projected on the wall, a large digital display in a concert venue or sports arena, a television screen, a "Jumbotron," or any other display device. In some embodiments, the composited view 802 can be displayed on a screen that is part of the first performance area 102. For example, one of the walls in the first performance area 102 may be implemented using a display screen or wall projection that displays the composited view 802 behind the performance of the human character 108.

The composited view 802 may also be displayed on a pair of VR goggles worn by audience members. In some embodiments, the composited view 802 may be the same for each audience member regardless of their position in the audience surrounding the first performance area 102. In some embodiments, the composited view 802 may be different for each audience member and may depend at least in part on their position relative to the first performance area 102. Operations for rendering specific views of the 3-D environment 502 based on a position of each audience member and are described in greater detail below relative to FIG. 9 and FIG. 10.

Figure 9:
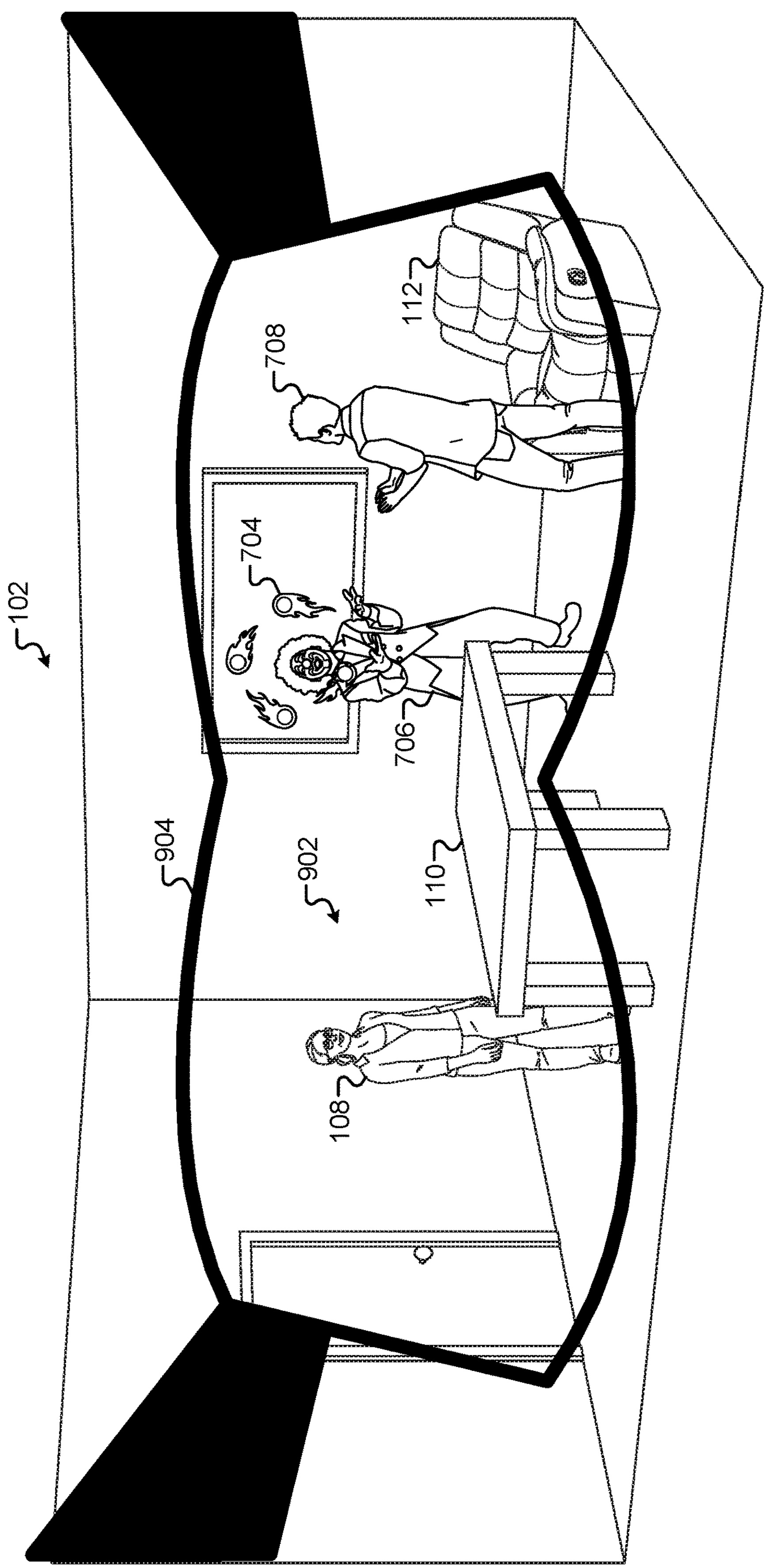
FIG. 9 illustrates a display of a composited view on a pair of AR glasses, according to some embodiments.

FIG. 9 illustrates a display of a composited view 902 on a pair of AR glasses 904, according to some embodiments. In comparison to the display of the composited view 802 in FIG. 8, this composited view 902 includes a layer comprising the natural view of the first performance area 102 that is visible through and around the AR glasses 904. An audience member wearing the AR glasses 904 would be able to see this natural view of the first performance area 102 using their naked eye. Additionally, the second layer of the compositing operation includes the rendered 2-D image 702 that includes the image of the clown 706, the image of the observing character 708, and the images of the flaming balls 704. This compositing layer is displayed by the AR glasses 904. Therefore, in these embodiments, the "compositing" operation includes displaying the rendered 2-D image 702 on the AR glasses 904 such that elements of the 2-D image 702 are overlaid on the natural view of the first performance area 102 when viewed through the AR glasses 904.

The immersive content presentation system may include additional devices for audiences who view the first performance area 102 through multiple pairs of AR glasses 904. In some embodiments, audience members may be equipped with individual pairs of AR glasses 904, and may each view the first performance area 102 from a unique position surrounding the first performance area 102. Therefore, one or more central computing devices or servers may be in wired or wireless communication with each of the pairs of AR glasses 904.

In some embodiments, the immersive content presentation system can determine the location and/or orientation of each pair of AR glasses 904 individually. This can be done using RF devices that are placed on each side of the AR glasses 904. The position of each pair of AR glasses 904 can then be triangulated using a plurality of RF transmitters/receivers positioned around the audience of the first performance area 102. The location of the AR glasses 904 can also be determined by placing visual fiducials on the glasses that can be visually tracked by motion-capture cameras. Additional motion-capture cameras can then be placed around the audience to determine the locations of the AR glasses 904 in real time. These embodiments allow users to bring their own AR glasses 904 and apply the RF tags, visual fiducials, and so forth, when entering the audience area.

In some embodiments, the immersive content presentation system can receive a location that is determined by the AR glasses 904 themselves. For example, the AR glasses 904 may be equipped with accelerometers, motion sensors, gyroscopes, gravitational sensors, digital compasses, and other location/orientation determination devices. Based on a calibrated starting point that can be determined and transmitted at the beginning of the performance, each pair of AR glasses 904 can track their position/orientation relative to the starting point throughout the performance. This position/orientation data can then be transmitted in real-time to the server of the immersive content presentation system.

Because each pair of AR glasses 904 in the audience may be positioned at a unique location, the composited view 902 may look different through each pair of AR glasses 904. Therefore, the immersive content presentation system can generate rendered 2-D images 702 that are based on the unique position of each of the AR glasses 904. For example, the 3-D environment 502 may be the same for each audience member. However, the position of the virtual camera that is used to render the 2-D image 702 from the 3-D environment 502 may change for each audience member. Specifically, the position of the virtual camera in the 3-D environment 502 may be positioned in the 3-D environment 502 for each audience member in a location that corresponds to the location of their pair of AR glasses 904 in the audience area of the first performance area 102. An audience of 25 people would thus generate 25 versions of the 2-D image 702, each being rendered from a different perspective corresponding to the locations of the AR glasses 904 of each audience member.

As described below, a specialized protocol has been developed for handling the real-time broadcasts of camera images, rendered images, an 3-D environment information to accommodate various hardware and software configurations that may be present in different embodiments of the immersive content presentation system. In some embodiments, rendering images of the 3-D environment 502 for each pair of AR glasses 904 to generate the unique 2-D images 702 may be performed at a central server. As described below, this central server may include a game engine. The central server may have significant processing power that allows the immersive content presentation system to generate a large number of rendered images of the 3-D environment 502 simultaneously for real-time broadcast to multiple display devices. This also allows the AR glasses 904 to be relatively lightweight in hardware and software processing power and simply receive rendered images from the central server.

Additionally or alternatively, some embodiments may allow the rendering operation to take place at each mobile device carried by the audience members. For example, some commercially available AR glasses 904 may have sufficient processing power onboard to perform real-time rendering operations of the 3-D environment 502. Instead of transmitting rendered images, the central server can instead transmit real-time transforms that are applied to the 3-D environment 502. For example, the 3-D environment 502 may be represented in a virtual 3-D scene that is stored on each mobile device when the motion-capture performer 308 moves throughout the second performance area 302, the immersive content presentation system can send transforms that should be applied to the motion-capture frame 404 representing the motion-capture performer 308. The individual mobile devices of each audience member can receive these transforms and apply them in real-time to the 3-D model of the clown 210, the 3-D model of the observing character 508, etc. Each mobile device can then perform its own render of the 3-D environment 502 from its own perspective and display the rendered 2-D images 702 (with any appropriate cutouts 710) on each individual pair of AR glasses 904.

The various embodiments illustrated by FIG. 9 use AR glasses 904 as an example, but this is not meant to be limiting. Other embodiments that may use a similar technology include holograms that are projected into the first performance area 102, images that are projected onto a transparent screen that surrounds the first performance area 102, and/or any other technology that may composite a rendered 2-D image 702 onto a real-time natural view of the first performance area 102.

Figure 10:
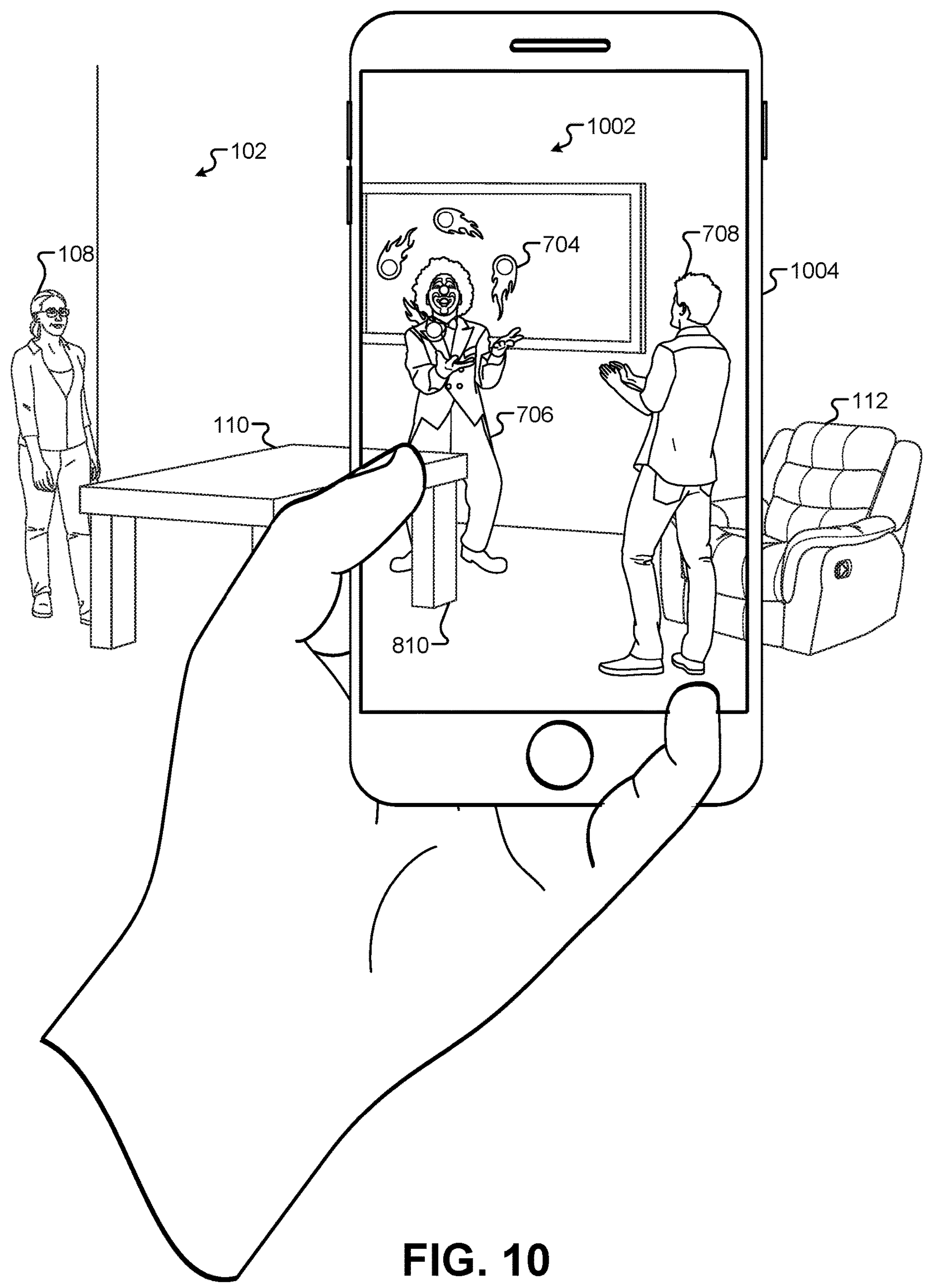
FIG. 10 illustrates an embodiment that displays a composited view on a mobile device equipped with a camera and a display screen, according to some embodiments.

FIG. 10 illustrates an embodiment that displays a composited view 1002 on a mobile device 1004 equipped with a camera and a display screen, according to some embodiments. The mobile device 1004 may include any electronic device with a camera that can display real-time video streams on a corresponding display screen, such as a smart phone, a digital music player, a PDA, a tablet computer, a notebook computer, a laptop computer, and so forth. The mobile device 104 may be held by each audience member or otherwise positioned in front of each audience member such that the camera of the mobile device 1004 can capture a view of the first performance area 102 and display that view of the first performance area 102 on the display screen of the mobile device 1004 such that it appears to the audience member that they are viewing the first performance area 102 through a "window" of the mobile device 104. For example, a view of the human character 108 will look the same to the user when viewing the human character 108 through the mobile device 1004 and when using their naked eye when the mobile device 1004 is moved out of the line of sight between the audience member and the human character 108.

As described in detail above, the immersive content presentation system may also receive a location and/or orientation of each mobile device 1004 for each audience member. As was the case with the AR glasses 904, the view through each mobile device 1004 may be unique and based at least in part on the location and/or orientation of each individual mobile device 1004. Therefore, each mobile device 1004 may be equipped with the internal location determination circuitry described above (e.g., accelerometers, gyroscopes, gravitational sensors, compasses, etc.) and the location and/or orientation can be transmitted from each mobile device 1004 to a central server in real-time. Alternatively or additionally, each mobile device 1004 may be equipped with devices that allow the immersive content presentation system itself to determine their location and/or orientation (e.g., RF tags, visual fiducials, etc.).

Using this unique location/orientation information for each mobile device 1004, the immersive content presentation system can render images of the 3-D environment 502 that correspond to the locations of each mobile device 1004 relative to the first performance area 102. As described above, a virtual camera that is used to render the 3-D environment 502 for each mobile device 1004 can be positioned in the 3-D environment 502 corresponding to the real-world position of the mobile device 1004 in the audience. Alternatively or additionally, the central server can use the communication protocol described below to stream transforms that should be applied to virtual assets in a version of the 3-D environment 502 that is stored locally at each of the mobile devices 1004. Each of the mobile devices 1004 can then perform their own real-time render of the locally stored 3-D environment 502 to generate their own unique 2-D image 702 of the 3-D environment 502.

The compositing operation can be carried out by each individual mobile device 1004. The first layer of the compositing operation can include images from the real-time video captured by the camera of the mobile device 1004. The second layer of the compositing operation can include the elements of the rendered 2-D image 702 for that mobile device 1004. When composited together, the composited view may be displayed on the display screen of the mobile device 1004. For example, when viewing the first performance area 102 with their naked eye, none of the elements of the 3-D environment 502 (e.g., the clown, the observing character, the flaming balls, etc.) would be visible. However, when the audience member moves their mobile device 1004 in front of their eye to view the first performance area 102 through the mobile device 1004, the elements of the 3-D environment 502 may be displayed as though they were a natural part of the real-world first performance area 102.

Figure 11:
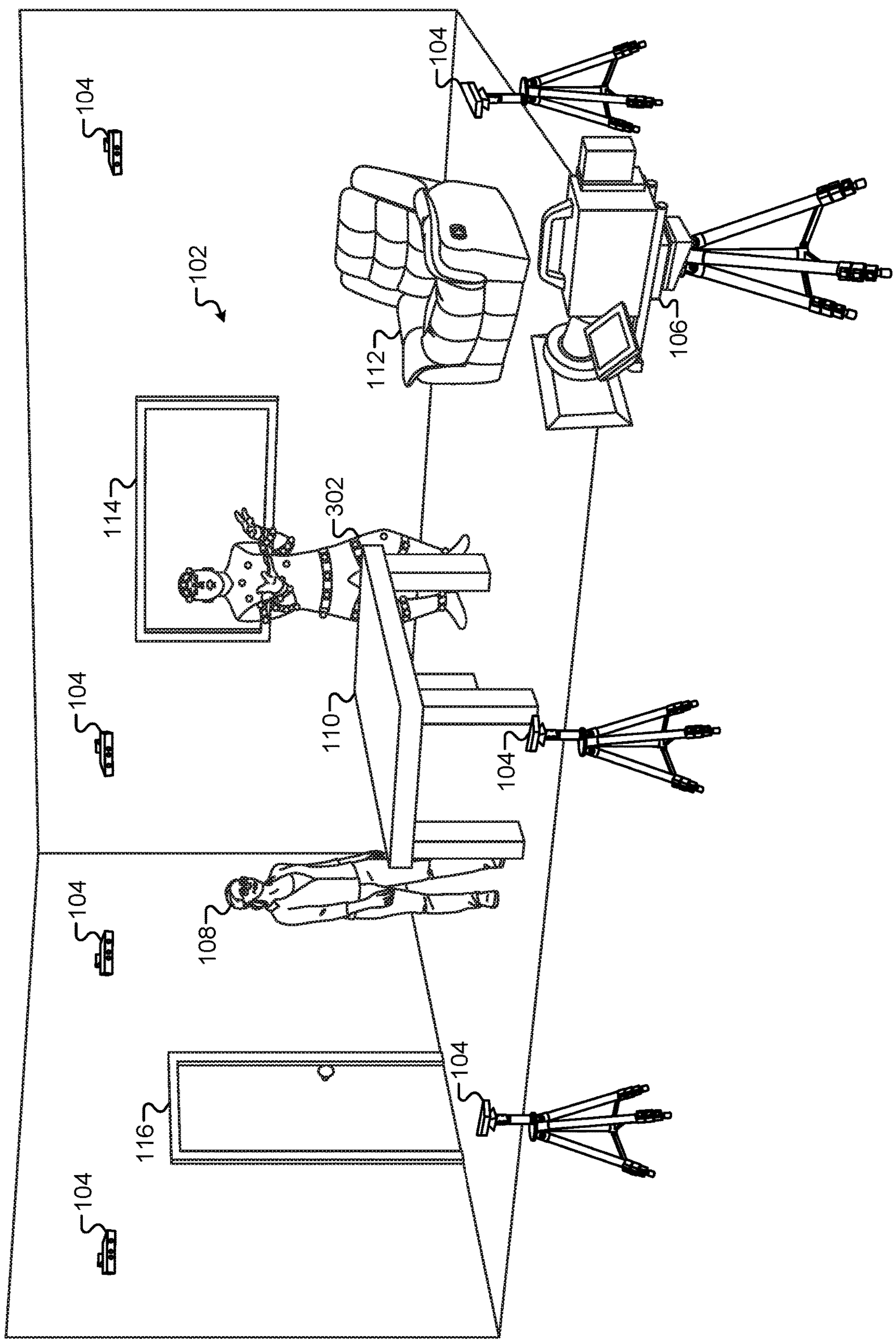
FIG. 11 illustrates the first performance area combined with the second performance area 302 in the same physical space, according to some embodiments.

FIG. 11 illustrates the first performance area 102 combined with the second performance area 302 in the same physical space, according to some embodiments. Instead of having separate performance areas, one for the live scene elements (e.g., the human character 108) and one for the motion-capture performer, these embodiments place the motion-capture performer 308 in the first performance area 102. Thus, for purposes of this disclosure, certain embodiments may use the terms "first performance area" and "second performance area" or "first real-world environment" and "second real-world environment" to refer to the same physical space in the real world.

Advantages of these embodiments include the fact that the motion-capture performer 308 can navigate around the first performance area 102 without using simulated props or other means to simulate movement around/on objects in the first performance area 102 while physically separated from the actual objects. For example, the motion-capture performer 308 can walk around the table 110 without being required to use a prop simulating the size and geometry of the table 110 or guessing the location of the table in a physically separate space.

In these embodiments, the first performance area 102 can still include the depth cameras 104 and the visible-light camera 106. These devices can perform the same functions described above, such as recording a real-time video stream of the first performance area 102 and capturing depth images used to construct volumetric objects or 3-D models in the corresponding 3-D environment 502. Additionally, some embodiments may use the depth images to generate a volumetric object representing the motion-capture performer 308. This volumetric object can be used to estimate a vertex/wireframe representation of the motion-capture performer 308 that is similar to the vertex/wireframe representation generated by the motion-capture system described above. This allows the immersive content presentation system to instead use data from the depth cameras 104 to determine the motion of the motion-capture performer 308. The resulting motion/position of the frame derived from the depth images can be fed into the game engine in the same way that the frame derived from the motion-capture system is fed into the game engine to generate/control virtual assets that are added to the 3-D environment 502. Alternatively or additionally, the first performance area 102 may include a plurality of motion-capture cameras 304 as depicted in the second performance area 302 of FIG. 3 above. Although not shown in FIG. 11, these motion-capture cameras 304 can be distributed throughout the first performance area 102 in a similar fashion.

In these embodiments, the 3-D environment 502 can be generated using the methods described above to include volumetric objects (e.g., 220, 222, 228), 3-D models (e.g., 210, 212), and virtual assets such as the 3-D model of the clown 506, the 3-D model of the observing character 508, and so forth. A rendered 2-D image 702 can be generated based on a single location of the camera 106 and/or based on multiple locations of individual AR glasses 904 and/or mobile devices 1004 in the audience.

One difference in these embodiments is that when viewing the first performance area 102 with the naked eye, audience members would see the motion-capture performer 308 in the first performance area 102. While in previous embodiments the motion-capture performer 308 may have been seen off to the side in the second performance area 302, these embodiments insert the motion-capture performer 308 into the same scene as the human character 108. This may allow for more lifelike interactions between a digital character controlled by the motion-capture performer 302 and the human character 108 and/or other objects in the first performance environment 102 (e.g., the table 110).

Figure 12:
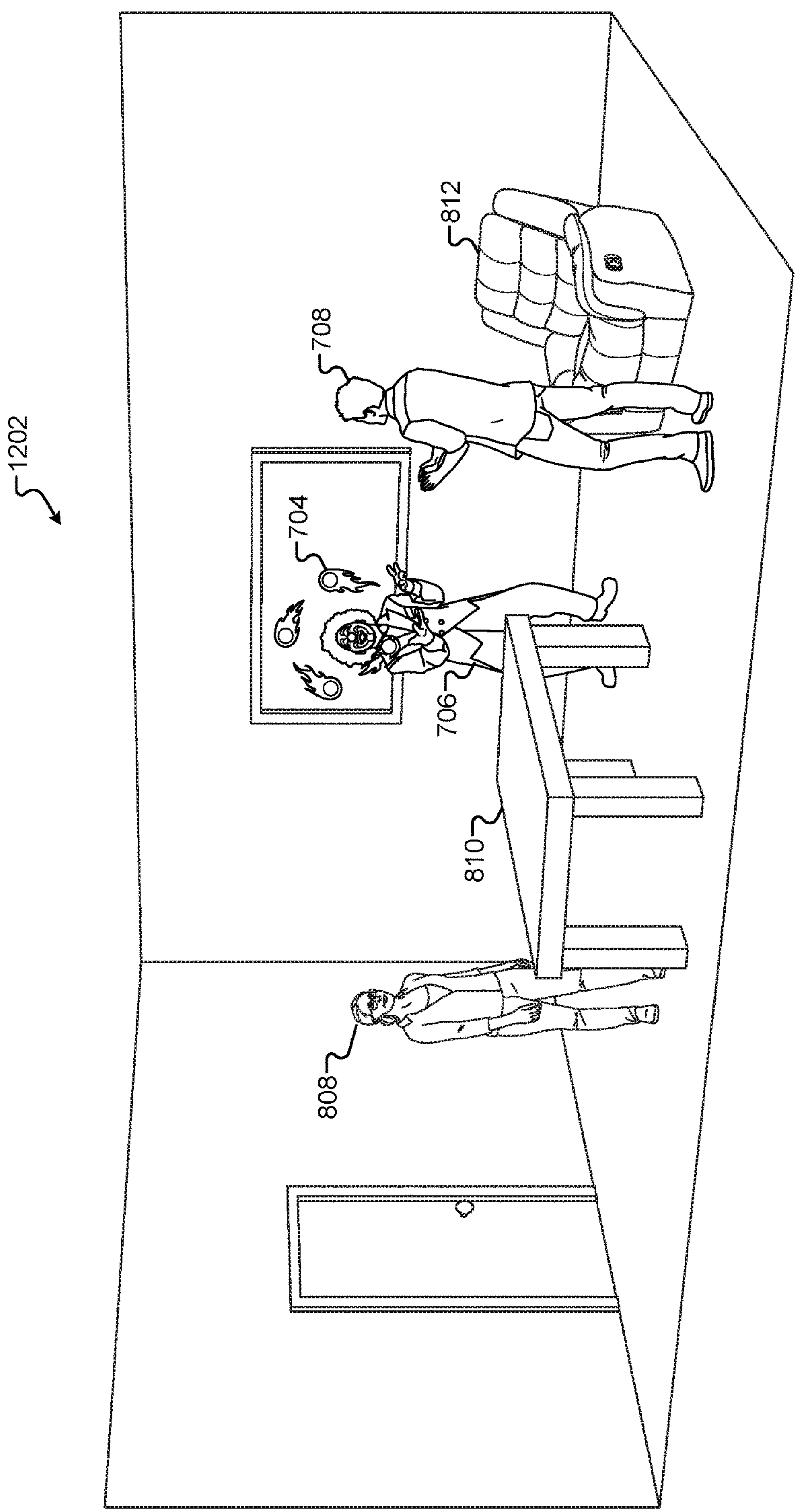
FIG. 12 illustrates a composited view of the first performance area as displayed on a display screen.

FIG. 12 illustrates a composited view 1202 of the first performance area 102 as displayed on a display screen. It should be noted that the composited view 802 generated when the motion-capture performer 308 is in a separate physical space is nearly identical to the composite view 1202 generated when the motion-capture performer 308 is in the same physical space as the first performance area 102. A difference in the process, however, is that the first layer of the compositing operation that includes the real-time, visible-light view of the first performance area 102 would include the motion-capture performer 308. Therefore, the composited view 1202 covers the view of the motion-capture performer 308 with the image of the clown 706. For example, as the arms of the motion-capture performer 308 move in the juggling fashion, the arms of the image of the clown 706 would move in a similar fashion to visually cover the moving arms of the motion-capture performer 308 in the composite view 1202. In another example, if the motion-capture performer 308 walks around the table 110, the image of the clown 706 would also walk around the image of the table 810 such that the view of the motion-capture performer 308 may remain completely covered by the image of the clown 706 in the composite view 1202.

These embodiments that cover a view of the motion-capture performer 308 with a rendered view of a digital character allow the immersive content presentation system to "re-skin" live characters to appear different to the audience through the composite view 1202. Although FIG. 12 uses a human CGI character that is similar in size and build to the motion-capture performer 308, other embodiments are not so limited. For example, some embodiments may re-skin the motion-capture performer 308 with a robot character, a humanoid character, an animal character (e.g., a dinosaur), a vehicle, a piece of scenery, an object, or any other virtual asset.

Additionally some embodiments can re-skin other objects in the first performance area 102. For example, the depths cameras 104 and/or the motion-capture cameras 304 can visually recognize configurations of props in the first performance area 102 and replace them with 3-D models of objects in the 3-D environment 502. For example, the depth cameras 104 may generate a volumetric object for the table 110 that is recognized as such by the immersive content presentation system. The table 110 may be recognized by comparing it to a predefined volume for the table 110 that is previously provided to the immersive content presentation system. Alternatively or additionally, the table 110 may be visually recognized as such by the motion-capture cameras 304. In either case, the immersive content presentation system can re-skin the table 110 by inserting a new virtual asset into the 3-D environment 502 that would cover the view of the table 110 in the composite view 1202. For example, the table 110 can be replaced in the 3-D environment 502 with a 3-D model of a circus platform. When the motion-capture performer 308 climbs on top of the table 110, it will appear in the composite view 1202 that the image of the clown 706 climbs on top of an image of the circus platform. These operations can visually enhance the first performance area 102 with CGI props and environments that may not be feasible or practical in the real world.

Figure 13:
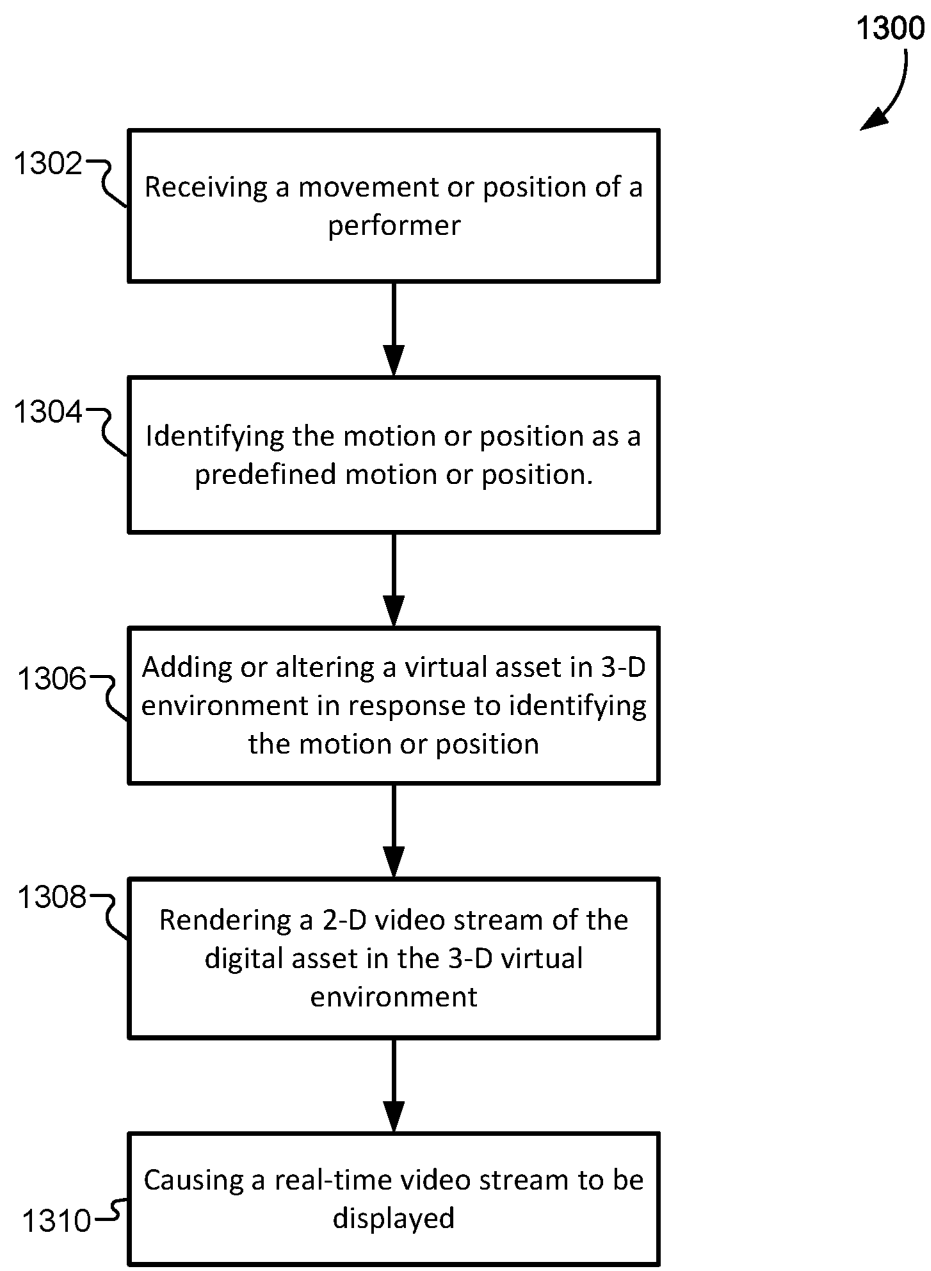
FIG. 13 illustrates a flowchart of a method for generating an immersive experience that mixes real-world and virtual-world content, according to some embodiments.

FIG. 13 illustrates a flowchart 1300 of a method for generating an immersive experience that mixes real-world and virtual-world content, according to some embodiments. The method may include receiving a real-time motion or position of a performer in a first real-world environment (1302). The performer may include a motion-capture performer whose movements/position are captured by a motion-capture system. The motion or position of the performer may also be captured by a plurality of depth cameras. The first real-world environment may include the second performance 302 area described above.

The method may also include identifying the motion or position as a predefined motion or position (1304). Some embodiments may encode the motion or position as a 3-D frame comprising vertices and/or wireframe representations of the performer. The 3-D frame may be provided to a game engine that has been altered to include code that recognizes motions of the 3-D frame and/or positions of the 3-D frame by comparison to a predefined set of motions and/or positions. The identified motion and/or position may include hand gestures, body movements, dance moves, fighting actions, stunts, acrobatics, and so forth. The identified motion and/or position may also include more subtle movements, such as finger gestures, head positions and/or rotations, foot movements, or any other position/motion that may be represented by the 3-D frame and/or captured for the performer.

The method may additionally include adding or altering a virtual asset in a 3-D virtual environment in response to identifying the motion or position as the predefined motion or position (1306). The 3-D virtual environment may model a second real-world environment, such as the first performance area 102 described above. The 3-D virtual environment may also comprise the 3-D environment 502 described above. The 3-D virtual environment may include volumetric objects and/or 3-D models of objects that are found in the second real-world environment, such as physical objects, human characters, props, scenery, and/or any other physical characteristics of the second real-world environment. The virtual asset may include one or more 3-D models of digital characters, digital objects, digital scenery, and other objects that can be added and/or moved in the 3-D virtual environment. The virtual asset may also include digital effects, such as flames, ice, weather effects, smoke, fog, explosions, lightning, or any other digital effect. In some embodiments, the virtual asset may include a plurality of virtual assets of different types.

The method may further include rendering a 2-D video stream of the virtual asset in the 3-D virtual environment (1308). In some embodiments, elements from the second real-world environment are removed such that they are not visible in the 2-D video stream. The 2-D video stream may be comprised of individual rendered 2-D images of the 3-D virtual environment that include views of the virtual asset. Images of the virtual asset in the 2-D video stream may include cutouts corresponding to objects that would be visible in a corresponding view of the second real-world environment.

The method may also include causing a real-time video stream to be displayed on the display device (1310). The real-time video stream may include the 2-D video stream of the virtual asset. The real-time video stream may also be composited with a real-time view of the second real-world environment. For example, the 2-D video stream can be composited on a real-time view of the second real-world environment that comprises a video stream captured by a camera of the real-world environment. Additionally, the 2-D video stream can be composited on a real-time view of the second real-world environment that is viewed through a pair of AR glasses such that the real-time view of the second real-world environment comprises the natural view of the second real-world environment as viewed by the eye of an audience member wearing the AR glasses.

It should be appreciated that the specific steps illustrated in FIG. 13 provide particular methods of generating an immersive experience that is reactive to the motion and/or position of a performer according to various embodiments. Other sequences of steps may also be performed according to alternative embodiments. For example, alternative embodiments of the present invention may perform the steps outlined above in a different order. Moreover, the individual steps illustrated in FIG. 13 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 14A:
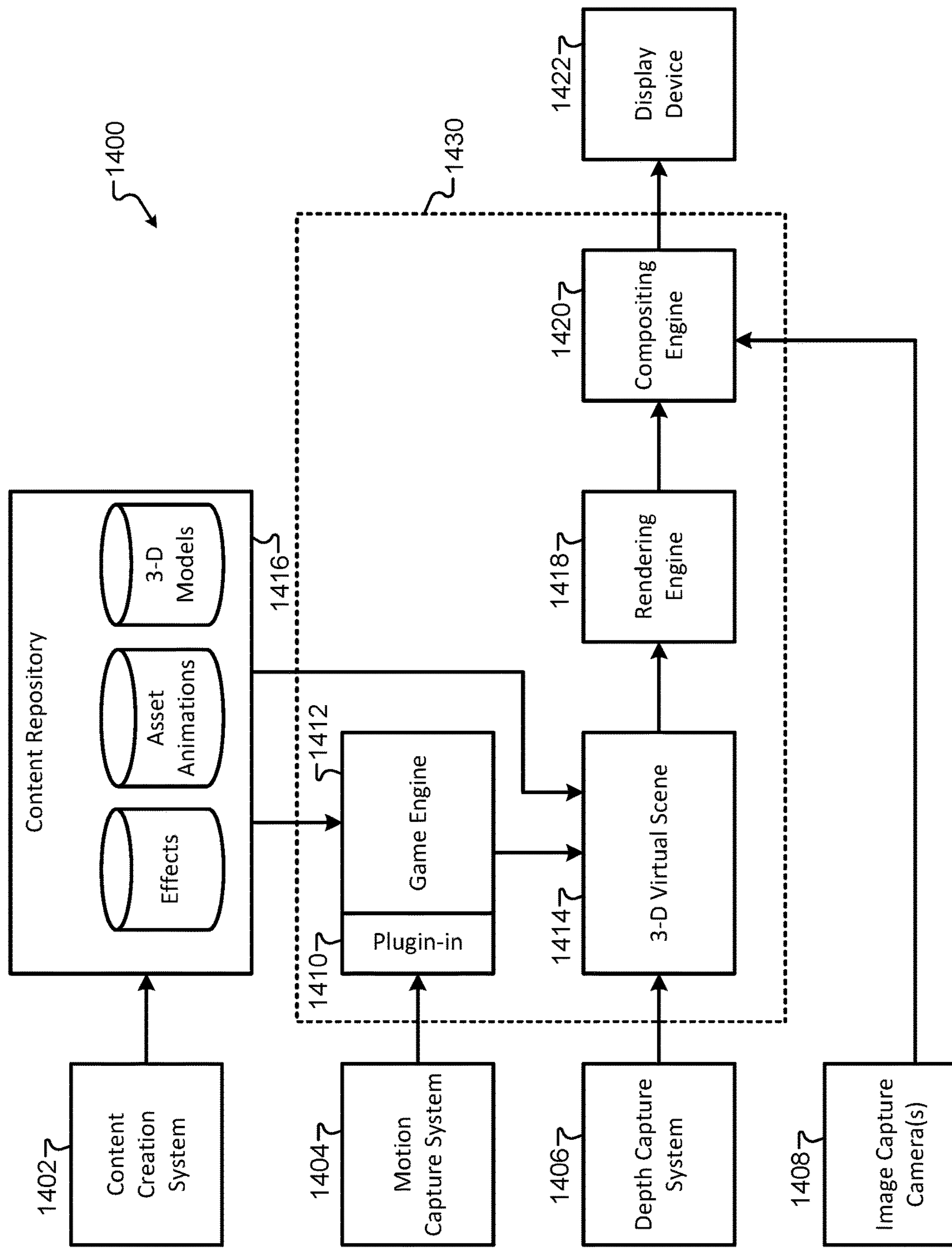
FIG. 14A illustrates a block diagram of an immersive content presentation system, according to some embodiments.

FIG. 14A illustrates a block diagram 1400 of an immersive content presentation system, according to some embodiments. The system may include one or more image capture cameras 1408 that capture real-time video images of the first performance area 102 as described above, such as camera 106. The system may also include a depth capture system 1406, which may include the depth cameras 104. The system may also include a motion-capture system 1404 that includes the motion-capture cameras 304.

The output of the motion-capture system 404 may be provided to a central server 1430. The central server 1430 may include a game engine 1412 that has been modified to accept inputs from a motion-capture system 1404. Specifically, the motion-capture frame that is provided by the motion-capture system 404, comprising one or more vertices corresponding to visual fiducials captured by the motion-capture system 1404, can be provided to the game engine 1412. In some embodiments, the alterations made to the game engine 1412 may be contained in a plug-in 1410, however this is not necessary. Other embodiments may provide these modifications to the game engine 1412 using other methods, such as altering the game engine code itself, generating a custom game engine, and/or the like.

The game engine 1412 may also accept virtual assets that are retrieved from a content repository 1460. The content repository 1416 can be populated by a content creation system 1402. In some embodiments, the content creation system 1402 may be integrated with the game engine 1412 such that users can modify a virtual environment or game environment using tools provided by the game engine 1412. The content repository may include various virtual assets, such as effects, asset animations, 3-D models, and so forth.

The game engine 1412 can be configured to compare positions and/or motion sequences of the 3-D frame provided from the motion-capture system 1404 to a predefined library of positions and/or motion sequences. Each of the entries in the predefined library of positions and/or motion sequences can also include a corresponding virtual asset that should be added to a 3-D virtual scene or an action that should be taken relative to an existing virtual asset in a 3-D virtual scene. For example, one of the actions that may be taken is to alter/blend the animation state for an AI-driven digital character.

The central server 1430 may also include a representation of a 3-D virtual scene 1414. Some embodiments may store and manipulate the 3-D virtual scene 1414 as part of, or using, the game engine 1412. Some embodiments may receive transforms provided from the game engine to manipulate virtual assets in the 3-D virtual scene 1414. For example, the game engine 1412 may recognize motions and/or positions from the motion-capture system 1404 and generate transforms or add virtual assets that may be applied to the 3-D virtual scene 1414. As described above, the depth capture system 1406 may also generate additional digital items that may be added to the 3-D virtual scene 1414, such as volumetric objects and/or 3-D models of objects corresponding to real-world objects in the first performance area 102.

In some embodiments, the central server 1430 may also include a rendering engine 1418 that can generate one or more to the images of the 3-D virtual scene 1414 from various locations. The various locations may correspond to real-world locations/orientations of display devices used by audience members viewing the first performance area 102. Note that in some embodiments, the rendering engine 1418 may be additionally or alternatively moved from the central server 1430 to one or more of the individual display devices or mobile devices used by audience members.

In some embodiments, the central server may also include a compositing engine 1420. Note that some embodiments may move the compositing engine 1420 from the central server 1430 to one or more individual mobile/display devices used by the audience members. The compositing engine 1420 may composite the rendered 2-D images from the rendering engine 1418 on top of images captured from the image capture cameras 1408. These images may be composited in real time as part of a live video stream. The output of the compositing engine 1420 can be displayed on one or more display devices 1422, such as a display screen that is visible to audience members.

Figure 14B:
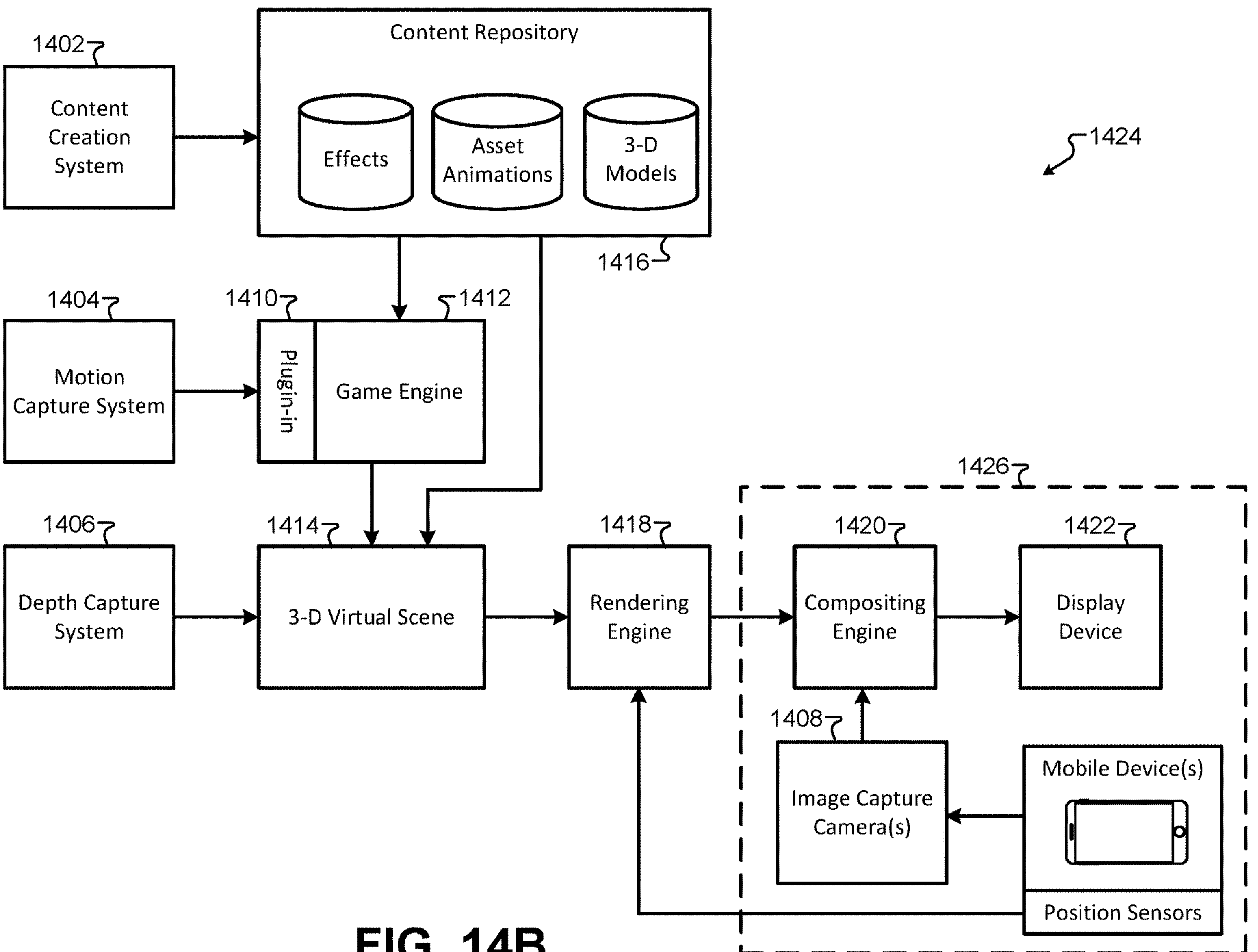
FIG. 14B illustrates a block diagram of an alternate arrangement of the elements of the immersive content presentation system, according to some embodiments.

FIG. 14B illustrates a block diagram 1424 of an alternate arrangement of the elements of the immersive content presentation system, according to some embodiments. This embodiment is similar to arrangement in block diagram 1400, except the system has been customized for use of mobile devices that include their own image capture cameras 1408, such as smart phones or tablet computers. In this arrangement, position sensors on the mobile devices 1426 can provide location and/or orientation information to the rendering engine 1418 such that the rendering engine 1418 can generate a plurality of 2-D images of the 3-D virtual scene 1414 corresponding to the locations and/or orientations of the mobile devices 1426.

The rendering engine 1418 can then provide the rendered 2-D images to a compositing engine 1420 that operates on the mobile devices 1426. The rendered 2-D images can be composited with real-time images captured by image capture cameras 1408 that are part of the mobile devices 1426, such as cameras on a smart phone. The resulting composited view can be displayed on the display device 1422, such as a screen of the mobile devices 1426. Note that in some embodiments, the position sensors can be removed from the mobile device 1426 and made part of the first performance area 102 as described above. Additionally, some embodiments may move the rendering engine 1418 to the mobile device 1426 such that the central server transmits transforms that may be applied to the 3-D virtual scene 1414 by the rendering engine 1418 at the mobile device 1426.

Figure 14C:
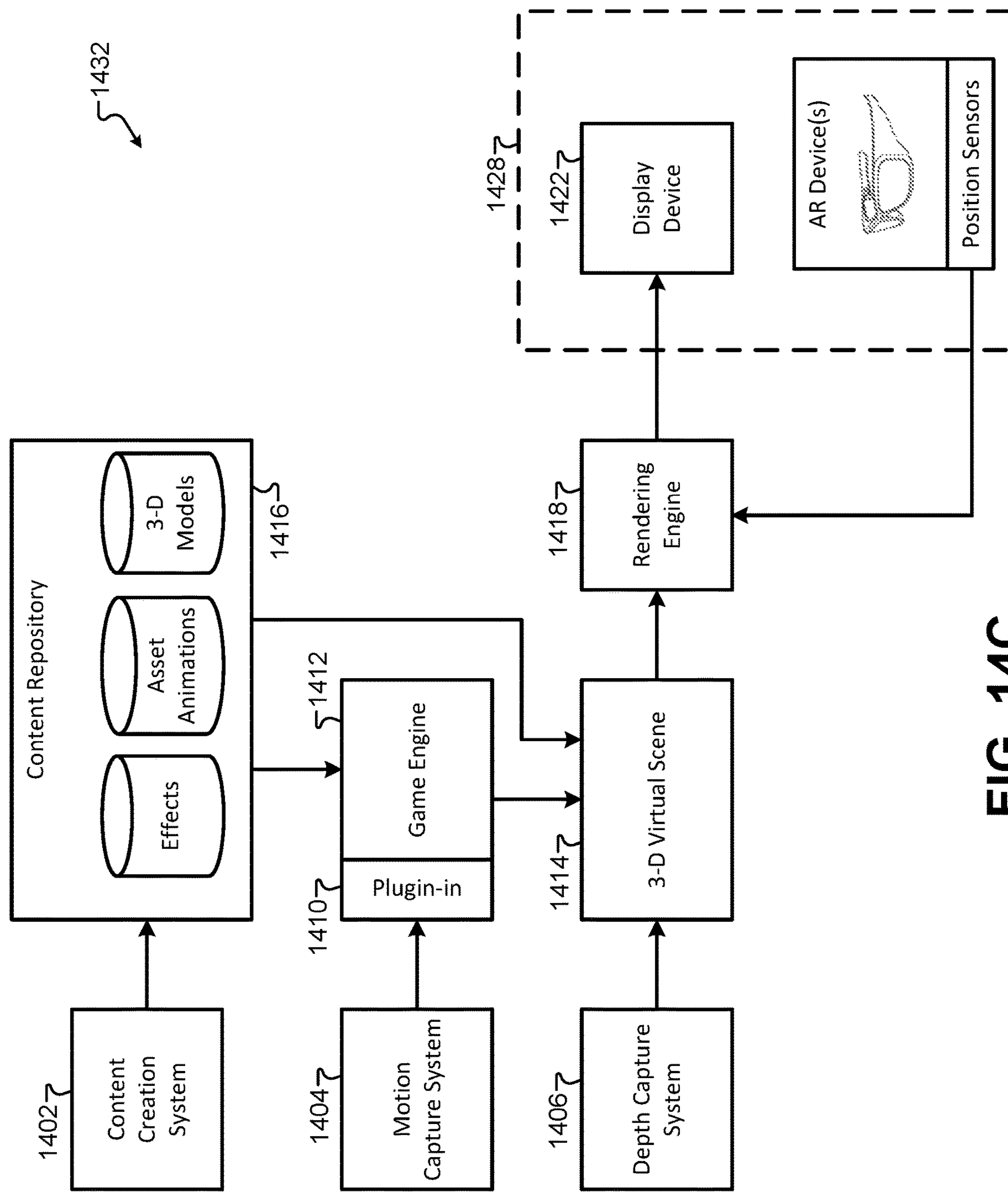
FIG. 14C illustrates a block diagram of an alternate arrangement of the elements of the immersive content presentation system, according to some embodiments.

FIG. 14C illustrates a block diagram 1432 of an alternate arrangement of the elements of the immersive content presentation system, according to some embodiments. This embodiment is similar to the arrangement in block diagram 1400, except the system has been customized for use of AR devices 1428, such as AR glasses. As described above, the relative position and/or location of the AR devices 1428 may be determined by the AR devices 1428 themselves and/or by other devices present near the first performance area 102. The location and/or orientation of each of the AR devices 1428 can be provided to the rendering engine 1418 to generate rendered 2-D images of the 3-D virtual scene 1414 that are based at least in part on the location and/or orientation of each of the individual AR devices 1428. The rendered images may then be displayed on a display device 1422 of the AR devices 1428, for example, by being projected on a lens on a pair of AR glasses such that the rendered images are composited with a natural view of the first performance area 102 as described above.

One of the innovations of the immersive content presentation system is the ability for performers to drive the actions and movements of the other characters in various 3-D environments. Traditional game engine technology uses AI-driven character locomotion. Specifically, for non-player characters, the game engine will employ one or more state machines that can be used to blend between different animation states for any CGI character in the game environment. A series of animations can be combined together in an animation state graph, and transitions to blend between different animation states in the state graph have been traditionally triggered by controller inputs from the user.

In one example, a first animation state for a non-player CGI character may include an animation of the character standing still, breathing in and out slowly. A second animation state for the CGI character may include the character walking forward at an average speed, swinging their arms by their side. A third animation state for the CGI character may include the character running forward at a rapid pace. Each of these animation states may represent a single state in the animation state graph governing the behavior of the CGI character. To transition between animation states in the state graph, the game engine may receive an input provided by a user control device, such as a joystick or game controller. Continuing with this example, the user can cause the displayed animation of the CGI character to transition from the first animation state where the CGI character stands still to the second animation state where the CGI character walks forward by actuating a joystick slightly forward on a game controller. Similarly, the user can cause the displayed animation of the CGI character to transition from the second animation state where the CGI character walks forward to the third animation state where the CGI character runs at a rapid pace by further actuating the joystick fully forward on the game controller.

Similarly, game engine embodiments may generate digital effects in the corresponding 3-D virtual scene of the game environment as part of a pre-scripted sequence of events in a scene graph for a 3-D virtual scene. For example, certain storyboard events in a scene graph for a virtual scene can cause virtual effects to appear in the scene. For example, after a predefined amount of time or in response to a predefined event, the scene graph may dictate that the weather event occurs, lightning strikes, and explosion occurs, and so forth. However, these virtual effects are not generated by an external user stimulus in most cases.

The embodiments described herein alter this traditional functionality of the game engine to (1) receive movements and/or positions captured by a motion-capture system, (2) compare movements and/or positions of the motion-capture frame of a motion-capture performer to a library of predefined motions and/or positions, and (3) cause a transition between predefined animation states in a CGI character or generate a virtual effect in the 3-D virtual scene. As described above, this altered functionality can be provided as a plug-in to the game engine. For example, commercially available game engines, such as the Unreal Engine® provide a programmer interface to accept plug-ins that can alter its functionality. Alternatively or additionally, a custom game engine may be designed that includes this functionality, or the code of existing game engines can be altered to execute this functionality.

Figure 15A:
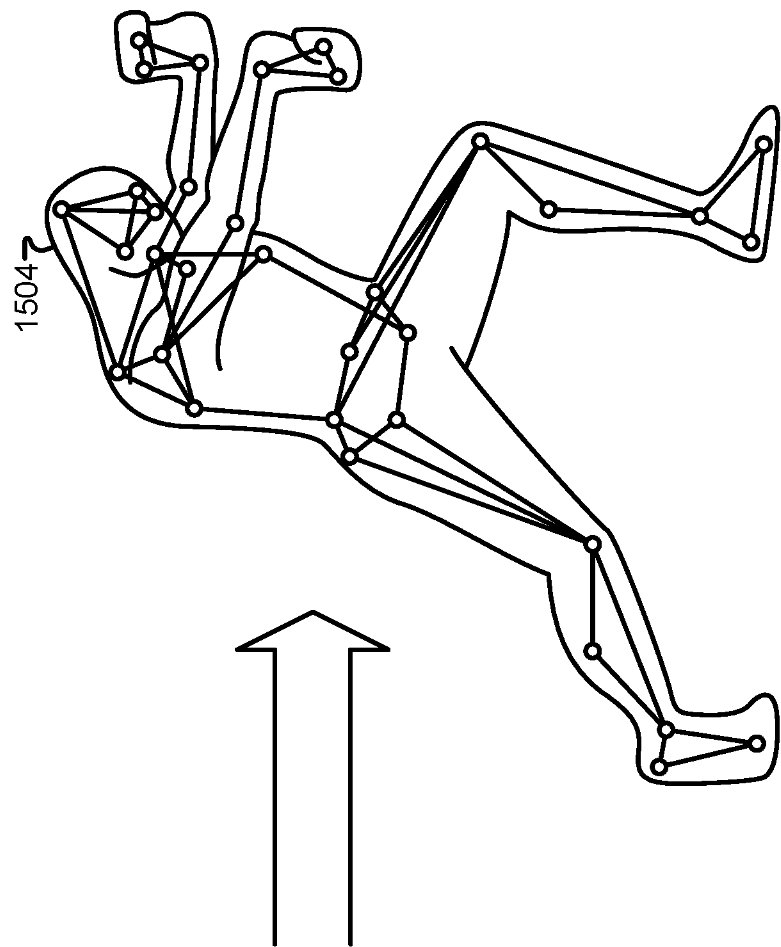
FIG. 15A illustrates an example of a motion sequence executed by a motion-capture performer that may be used to trigger actions by a game engine, according to some embodiments.
Figure 15A:
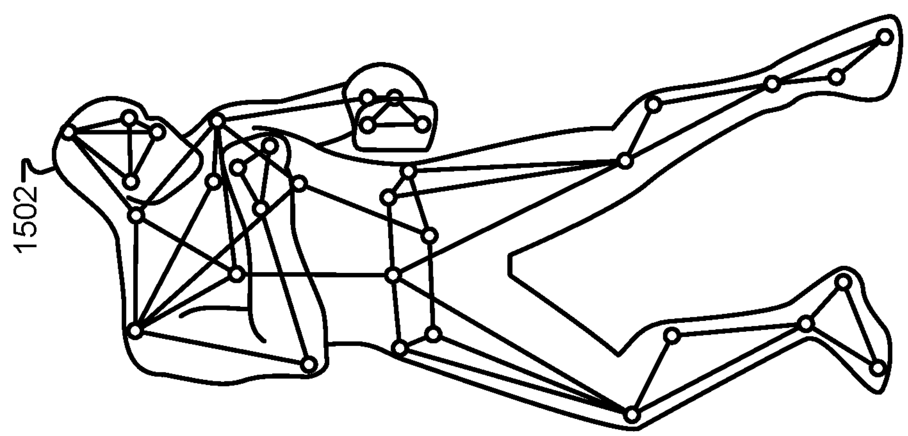

FIG. 15A illustrates an example of a motion sequence executed by a motion-capture performer that may be used to trigger actions by a game engine, according to some embodiments. This figure illustrates two different poses performed by the motion-capture performer. A first pose 1502 shows the motion-capture performer standing with his arms in a ready position. A second pose 1504 shows the motion-capture performer lunging forward with his arms in an outstretched position. These poses show the frame that may be captured by the motion-capture system comprised of vertices that are connected to form a wireframe skeleton representing the motion-capture performer in a 3-D environment referred to herein as a "motion-capture frame," or simply "frame." Furthermore, FIG. 15A includes a silhouette around the frame in each pose. This silhouette is for illustrative purposes only to provide a clear picture of the pose of the motion-capture performer.

The first pose 1502 and the second pose 1504 may be captured sequentially in successive images captured by the motion-capture system. Additional intermediate images may also have been captured between the first pose 1502 and the second pose 1504 that are not illustrated in FIG. 15A. For example, a time interval, such as 1 second, may have passed between capturing pose 1502 and pose 1504 by the motion-capture system. Thus, pose 1502 may represent a starting point for a motion performed by the motion-capture performer, and pose 1504 may represent an ending point for the motion. As described above, these poses 1502, 1504 can be provided as successive inputs to the game engine, and the game engine can compare this motion between pose 1502 and pose 1504 to a predefined library of known motions and/or locations to drive various elements of the 3-D virtual scene.

Figure 15B:
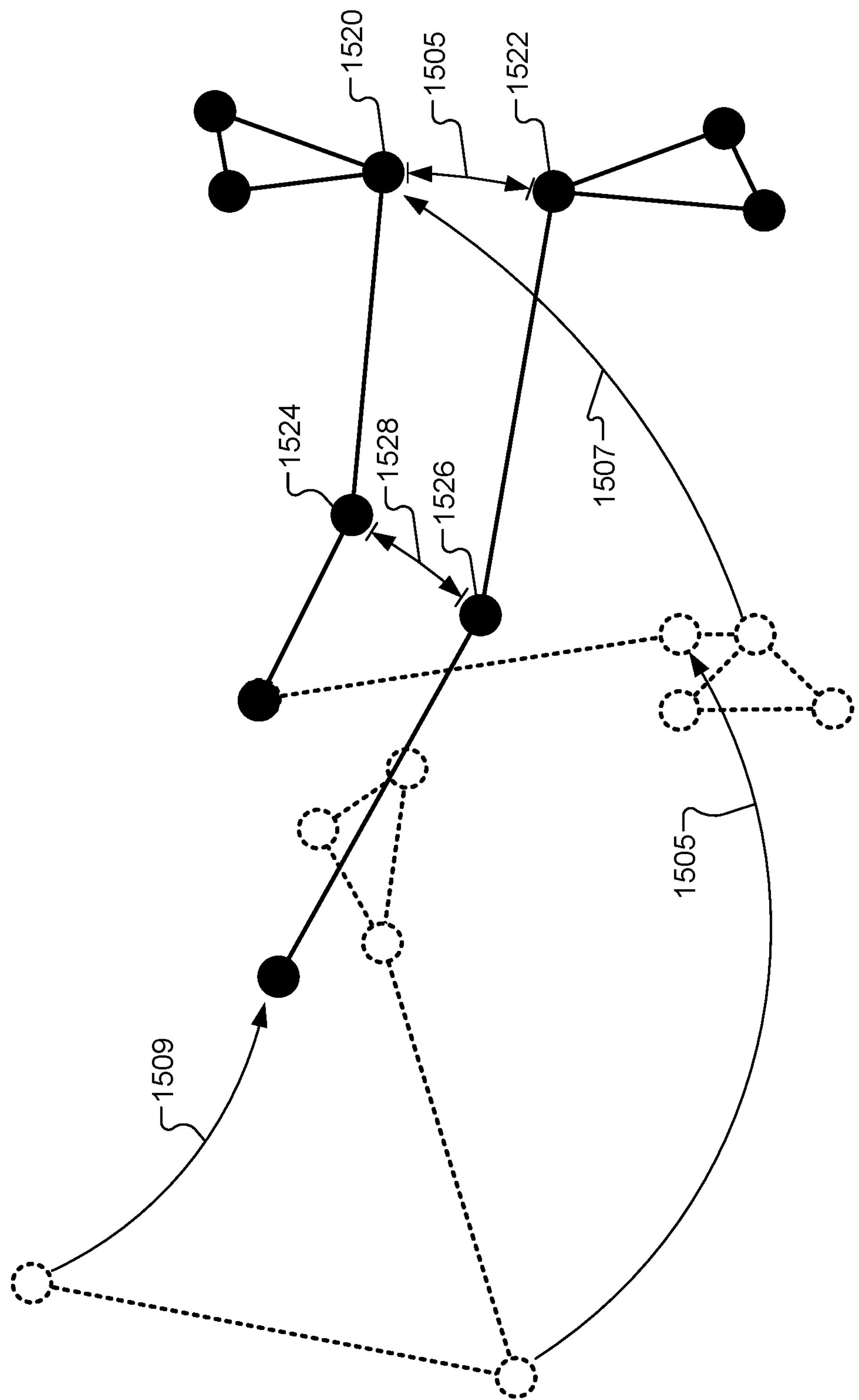
FIG. 15B illustrates a detailed view of portions of the motion-capture frame from the first pose and the second pose to demonstrate how the game engine can identify a predefined motion, according to some embodiments.

FIG. 15B illustrates a detailed view of portions of the motion-capture frame from the first pose 1502 and the second pose 1504 to demonstrate how the game engine can identify a predefined motion, according to some embodiments. The dashed lines/vertices represent a portion of the motion-capture frame from the first pose 1502, and the solid lines/vertices represent a portion of the motion-capture frame from the second pose 1504. These two frames are superimposed on each other in FIG. 15B to show how these vertices can move in the 3-D virtual scene to create an identifiable motion. These portions of the motion-capture frames correspond to the arms of the character in FIG. 15A.

In some embodiments, the game engine can recognize motions based on a single pose or the location of vertices in a frame. For example, when the motion-capture performer holds their arms outstretched in front of them with their hands extended in opposite directions, the game engine can compare the directions of distances between vertices to determine that the current pose matches a predefined pose. In this example, the game engine can determine a distance 1528 between vertex 1524 and vertex 1526 of the frame and can determine a distance 1505 between vertex 1520 and vertex 1522 of the frame. The distances between these vertices can indicate that the arms of the motion-capture performer are within a threshold distance of each other, and the orientation of these distance vectors (e.g., approximately perpendicular to the ground) can indicate that the arms are outstretched in front of the motion-capture performer. Similar position/distance determinations can be made regarding the vertices representing the hands of the motion-capture performer to determine that the hands are outstretched in opposite directions. This is just one example of how the distance and orientation of the collection of vertices in the motion-capture frame can be used to determine a current location and/or pose of the motion-capture performer. The process used in this example can be used to identify any pose and/or any other position that can be defined by a collection of vertices for a motion-capture frame. For example, this process can be used to identify when the motion-capture performer points a finger in a certain direction, enters a predefined area of the second performance area 302, contacts a real-world object in either of the performance areas 102, 302, contacts a virtual-world object in the 3-D virtual environment, and so forth.

In addition to identifying static poses, the game engine can also analyze successive poses of the frame to identify motions performed by the motion-capture performer. For example, by calculating distances between vertices in successive poses, the game engine can calculate a velocity, acceleration, trajectory, and/or motion path for each vertex. Motion paths of vertices can then be compared to predefined motion paths to identify predefined gestures. A gesture may be defined as one or more predefined motion paths of vertices from a motion-capture frame over a plurality of poses over time. Motion vectors can be calculated for corresponding vertices in the first pose 1502 and the second pose 1504. For example, FIG. 15B illustrates motion vectors 1505, 1507, 1509 as the arms of the motion-capture performer are extended away from the body of the motion-capture performer.

In the example described above, the motion-capture performer 308 is able to make a juggling motion with their hands. In the 3-D environment 502, this would correspond to the vertices of the hands of the motion-capture frame 404 of the motion-capture performer 308 moving back and forth in an arc motion at a predetermined height relative to the motion-capture performer 308. Motion vectors that correspond to this arced back-and-forth motion can be stored as a template for the predefined gesture by the game engine. When the motion-capture performer 308 performs a similar motion, the game engine can compare the motion vectors calculated for the current movement of the motion-capture performer 308 and compare them to the template for the predefined gesture. If they match within a threshold amount of the template motion vectors for the gesture (e.g., if the motion vectors are within 10%, 20%, 25%, or some other predetermined threshold), then the game engine can execute one or more actions in response to the identified gesture. Some embodiments may allow the identified motion vectors to be rotated or translated such that the motion-capture actor 308 can be positioned in any orientation relative to an origin, and the game engine may still identify predefined motions.

Some embodiments can use the movements of the motion-capture performer 308 to train the game engine to recognize new predefined motions and/or positions. For example, to train the game engine to recognize the juggling motion, the motion-capture performer 308 can move their hands back and forth in an arc pattern in front of them. This gesture can be recorded by the game engine. Some embodiments may also prompt the motion-capture performer 308 to repeat the gesture a plurality of times, and the game engine can average the motion vectors from each iteration of the gesture to generate an average set of motion vectors defining the gesture, as well as a standard deviation that can be used as a threshold when comparing subsequent gestures to the predefined gesture after the training session.

Figure 15C:
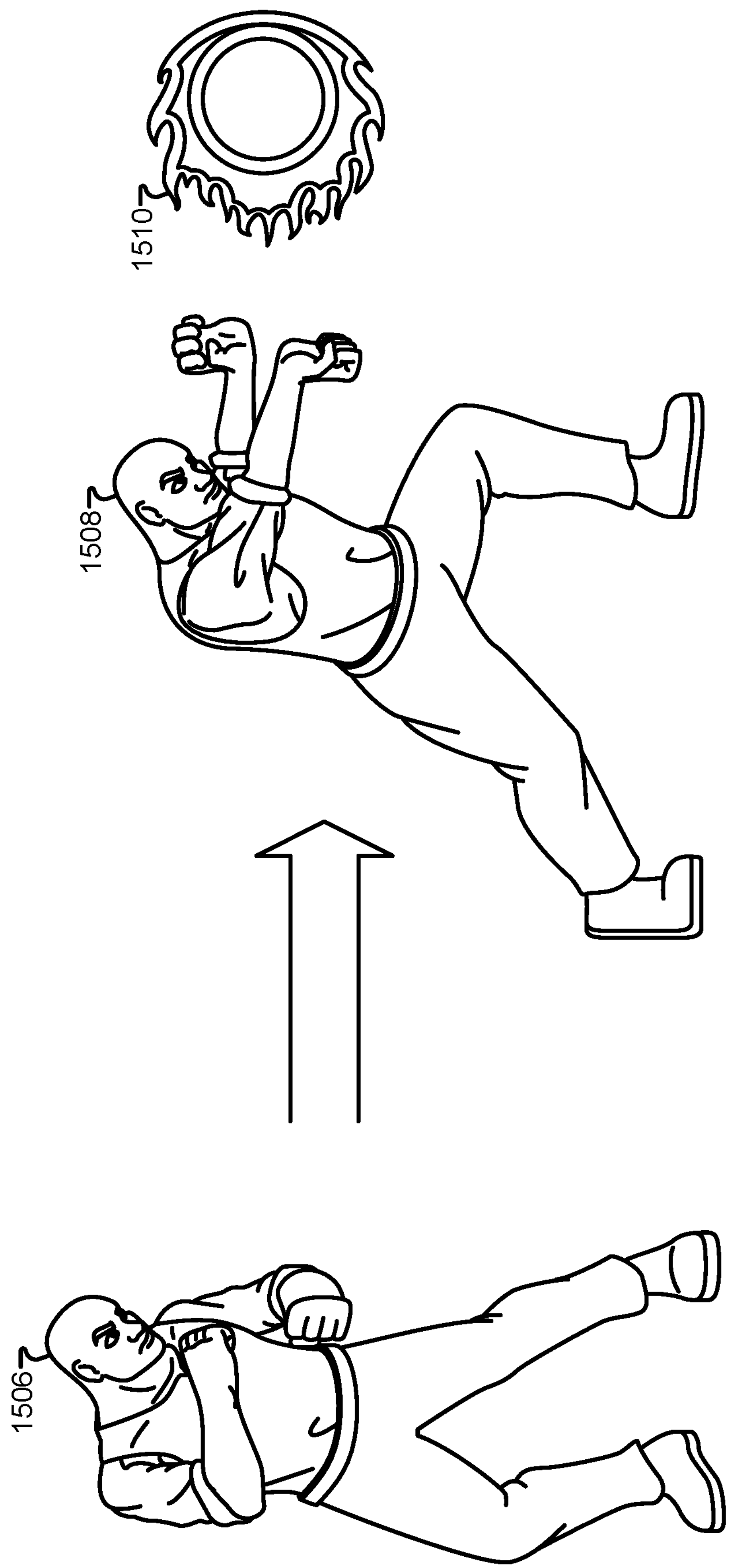
FIG. 15C illustrates an example of virtual effects that can be triggered based on identifying predefined motions and/or positions, according to some embodiments.

FIG. 15C illustrates an example of virtual effects that can be triggered based on identifying predefined motions and/or positions, according to some embodiments. Each of the predefined motions and/or positions that are stored by the game engine and identified when performed by a motion-capture performer can be associated with one or more actions that can be executed by the game engine in the 3-D virtual scene. In some embodiments, these actions may include adding virtual assets to the 3-D virtual scene that were not present prior to identifying the motion/position. These virtual assets may include additional CGI characters, scenery, props, objects, and/or other 3-D models or objects. These virtual assets may also include virtual effects that are applied to the scene.

FIG. 15C illustrates one example of a virtual asset that may be added to the scene as well as effects that may be applied. In this example, the motion-capture frame has been replaced or re-skinned in the 3-D virtual scene with a CGI character in a first pose 1506 and a second pose 1508 corresponding to the poses 1502, 1504 of the motion-capture frame. The motion-capture frame can drive the motion of the CGI character. Additionally, after identifying the predefined gesture depicted in FIG. 15B, the game engine can insert a new digital object into the 3-D virtual scene. In this example, the digital object may include a fireball 1510 that is emitted from the hands of the CGI character when completing the identified gesture/pose. The new digital object may comprise a 3-D model that is added to the scene and is subject to the physics engine of the game engine. For example, the fireball 1510 may have a virtual mass and velocity when it is initially generated from the hands of the CGI character. The trajectory of the fireball 1510 may be governed by the physics engine like any other object in the 3-D virtual scene after it is added to the 3-D virtual scene.

In addition to generating the new fireball 1510 object, virtual effects may be applied to the 3-D virtual scene in response to identifying the motion/position of the motion-capture frame. For example, an explosive sound or burst of light may be added to the 3-D virtual scene when the fireball 1510 is generated. The fireball 1510 itself may generate virtual effects, such as flames, smoke, and a burning sound. Other virtual effects may include a flash of light, lightning, sounds, strobe effects, and/or other effects.

Figure 16B:
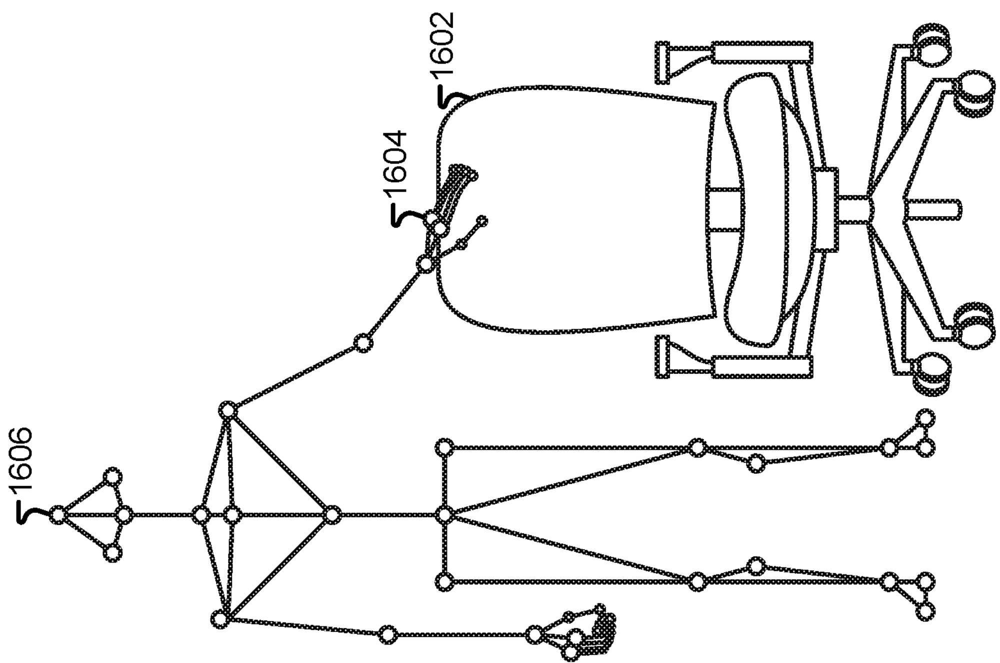
FIG. 16B illustrates a position that may be recognized by the game engine, according to some embodiments.
Figure 16A:
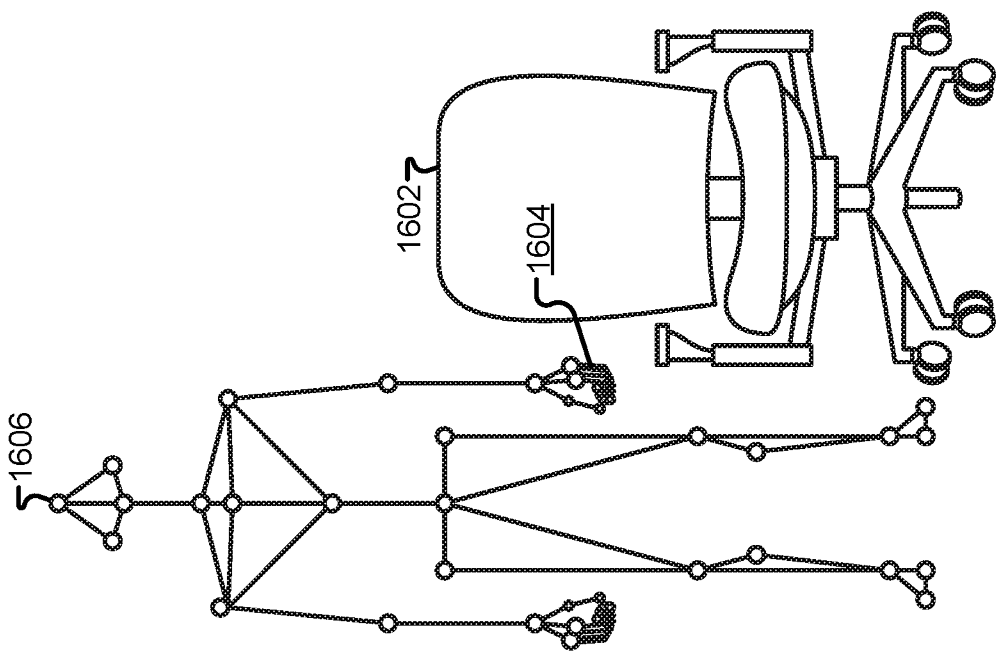
FIG. 16A illustrates how a motion-capture frame can interact with existing virtual objects in the 3-D virtual environment, according to some embodiments.

FIG. 16A illustrates how a motion-capture frame 1606 can interact with existing virtual objects in the 3-D virtual environment, according to some embodiments. In this example, the motion-capture performer 308 can stand with their arms down to their side. In a motion-capture area, such as the second performance area 302, the motion-capture performer 308 may be provided with a screen that shows a real-time view of the 3-D virtual environment. On the screen, the motion-capture performer 308 may see various virtual assets in the 3-D virtual scene, such as a chair 1602. However, because the chair 1602 does not exist in the second performance area 302, some embodiments may include props that are similar in size that are placed in the 3-D virtual environment—such as a real-world chair.

FIG. 16B illustrates a position that may be recognized by the game engine, according to some embodiments. As the motion-capture performer 308 raises their left-hand and places it out to their side, the game engine can recognize this as a predetermined position that triggers an action by the game engine. In this case, the motion-capture frame 1606 corresponding to the motion-capture performer 1308 can place its left hand 1604 out to the side. When the vertices of the left hand 1604 are within a threshold distance of the virtual representation of the chair 1602, the game engine can identify this as a predefined position. One action that may be taken is to simulate contact between the hand 1604 and the chair 1602 in the 3-D virtual environment. This may be accomplished using virtual friction properties that are enforced by the physics engine of the game engine. This may also be accomplished by creating a temporary attachment between the hand 1604 and the chair 1602.

Figure 16D:
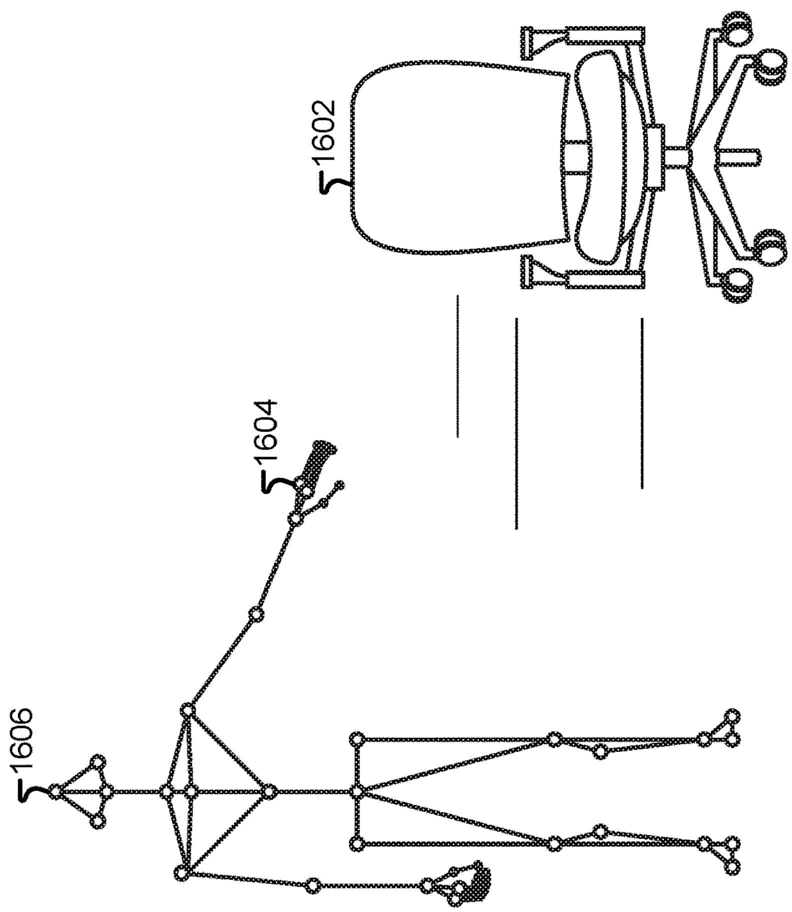
FIG. 16D illustrates how the motion-capture frame can become uncoupled from a virtual object, according to some embodiments.
Figure 16C:
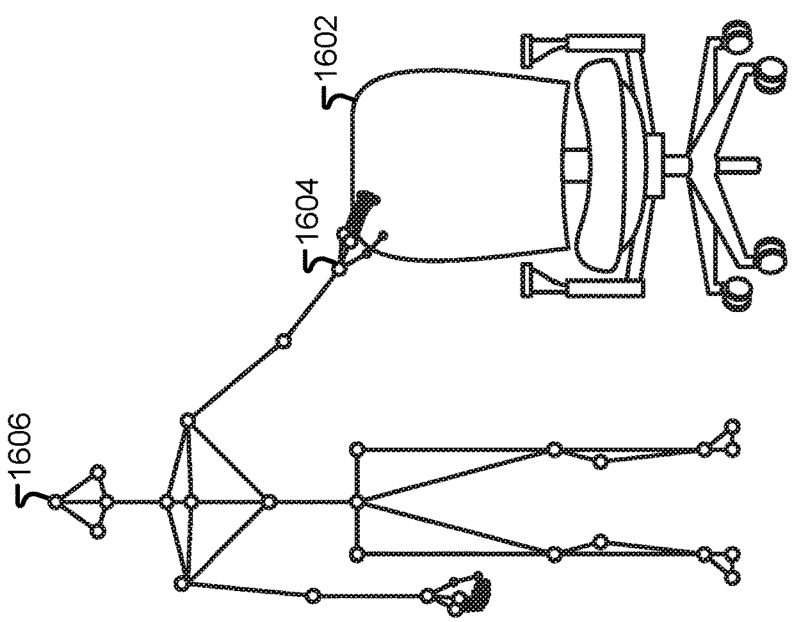
FIG. 16C illustrates how subsequent motions of the motion-capture frame can generate actions by the game engine in the 3-D virtual environment, according to some embodiments.

FIG. 16C illustrates how subsequent motions of the motion-capture frame 1606 can generate actions by the game engine in the 3-D virtual environment, according to some embodiments. In this example, the motion-capture performer 308 can further extend their left hand out to their side. In the 3-D virtual environment, the corresponding motion-capture frame 1606 can extend its left hand 1604 out to the side in a corresponding fashion. However, because the left hand 1604 is connected to the chair 1602 by friction or otherwise, the chair 1602 may move away from the motion-capture frame 1606. If the motion-capture performer 308 moves their left hand back and forth, the virtual chair 1602 would also move back and forth with the left hand 1604 in the 3-D virtual environment. The motion of the chair 1602 can be governed by the physics engine of the game engine in response to virtual forces applied by the motion-capture frame 1606.

FIG. 16D illustrates how the motion-capture frame 1606 can become uncoupled from a virtual object, according to some embodiments. In this example, as the motion-capture performer 308 pushes their left hand out to their side with more than a threshold amount of force or speed, the game engine can recognize this velocity vector of the hand 1604 as an identified predefined vector that is sufficient to detach the left hand 1604 from the virtual representation of the chair 1602. As governed by the physics engine of the game engine, the chair 1602 can accelerate away from the motion-capture frame 1606 by rolling way on the ground.

It should be noted that this same concept was demonstrated above with the juggling motion of the 3-D model of the clown 506. As the motion-capture performer 308 moves their arms back and forth, the game engine generated the 3-D models of the flaming balls 504 in response to this identified, predefined motion. The flight path and trajectory of the flaming balls 504 may be governed by the physics engine, and the game engine may recognize when the fingers of the motion-capture actor 308 close around the ball and subsequently release the ball as they are juggled to apply virtual forces to the balls.

Figure 17A:
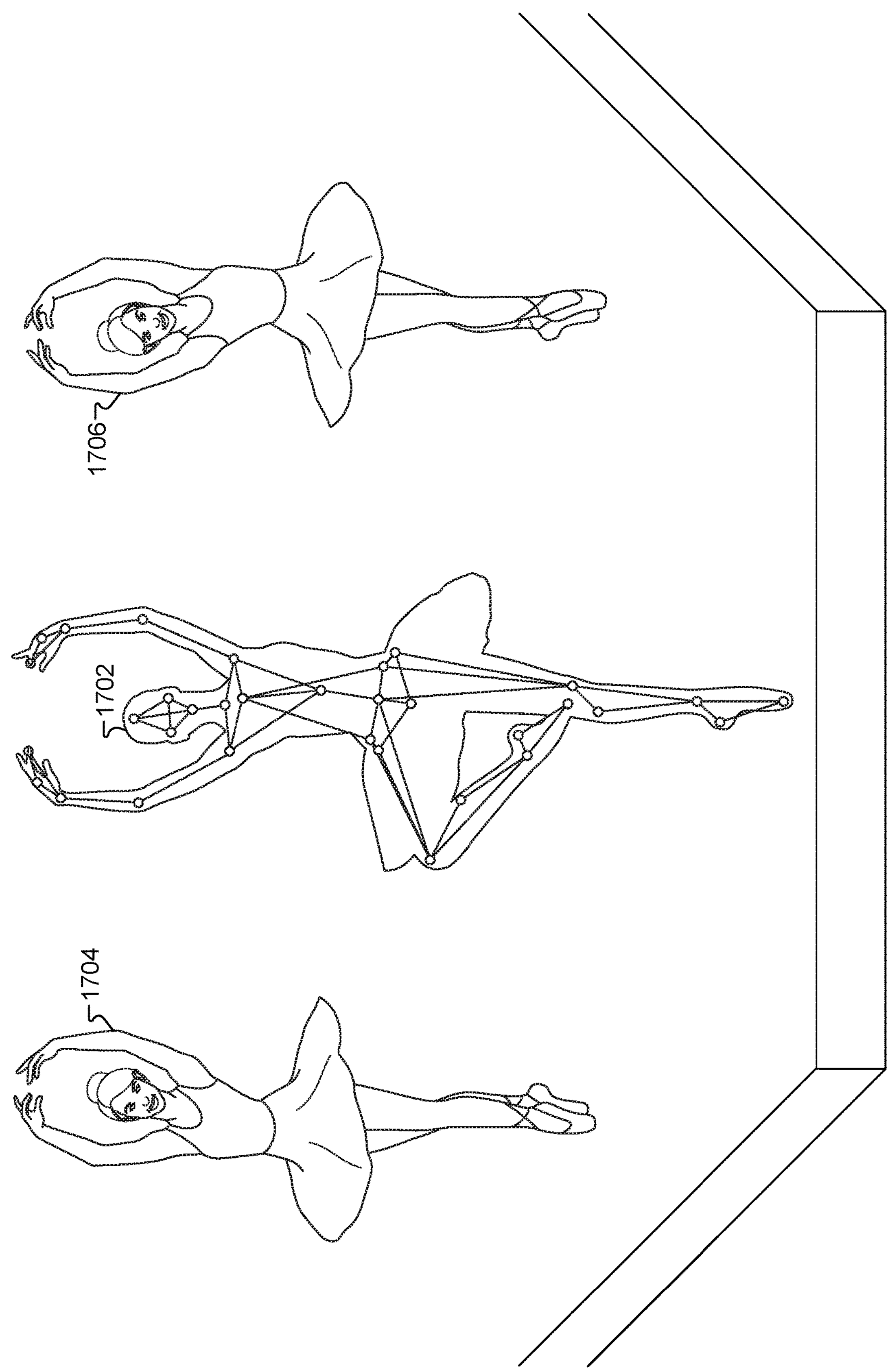
FIG. 17A illustrates how the actions of others CGI characters in the 3-D virtual scene can be governed by the motion and/or position of a motion-capture actor, according to some embodiments.

FIG. 17A illustrates how the actions of others CGI characters in the 3-D virtual scene can be governed by the motion and/or position of a motion-capture actor, according to some embodiments. A motion-capture frame 1702 may correspond to a motion-capture performer 308 in the second performance area 302 performing a ballet dance. For example, the motion-capture performer 308 may be spinning clockwise in a circle on one foot. At the same time, the 3-D virtual environment may include two CGI characters, or non-player characters, that follow individual animation graphs to govern their motions as described above. A first dancer 1704 may be animated as a CGI character having a 3-D model in the 3-D virtual environment that is poseable according to a variety of animations. Similarly, a second dancer 1706 may also be animated in the 3-D virtual environment. They may execute a current animation in their assigned animation graphs such that they spin counterclockwise in the circle on two feet.

Figure 17B:
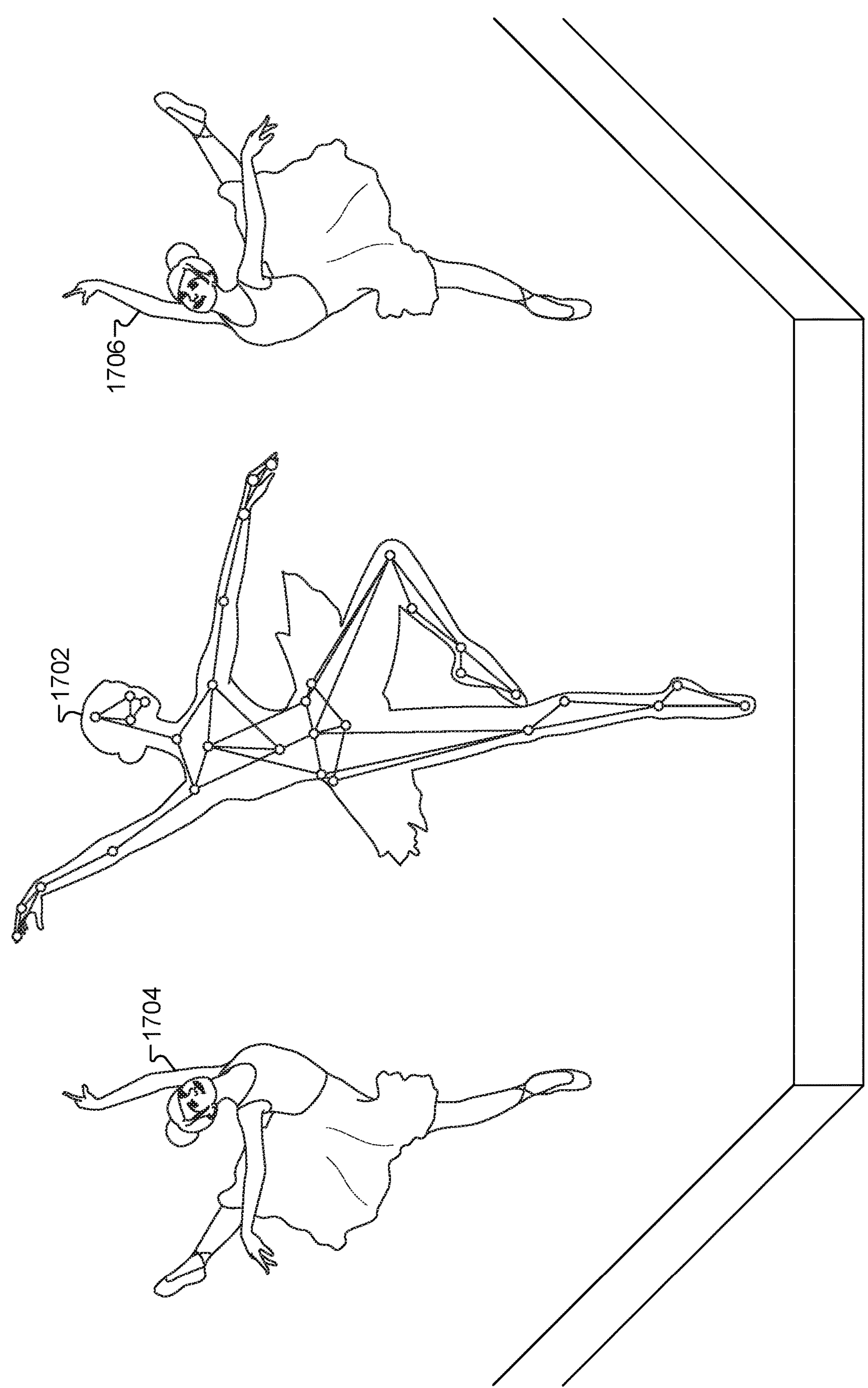
FIG. 17B illustrates an identified motion of the motion-capture frame that changes the state in the animation graph of each of the CGI characters, according to some embodiments.

FIG. 17B illustrates an identified motion of the motion-capture frame 1702 that changes the state in the animation graph of each of the CGI characters, according to some embodiments. Generally, CGI characters may be associated with many (e.g., hundreds) of animation sequences that can be used to program the motion and behavior of CGI characters according to inputs received by the game engine. These animation sequences can be strung together in the animation graph to govern how the CGI character respond to inputs to the game engine. The choice of which animation sequence to execute and the specific manner in which the game engine blends from one animation sequence to the other is determined by specified control factors, such as gain control inputs. However, in the embodiments described herein the game engine has been modified to accept movements and positions by a motion-capture frame and identify predefined motions and/or positions that trigger transitions in the animation graphs and/or the manner in which they should be blended.

In this example, the motion-capture performer 308 may stop spinning in a clockwise motion and perform a new dance move that is recognized as a predefined motion sequence or position by the game engine. For example, the pose depicted in FIG. 17B may result from a predefined motion sequence that is identified by the game engine, or may itself be a predefined pose or position that is identified by the game engine. The response to this identification, the animation sequence for the first dancer 1704 and the second dancer 1706 can be changed in their respective animation graphs such that they perform different dance moves.

This modification to the game engine solves a technical problem that existed in the art. Specifically, when blending human and virtual performances, the human had to follow the script and timing of the virtual performance. These embodiments solve this problem by allowing the human element in the scene to drive the actions of the CGI characters. This allows for a more lifelike, fluid, and interactive exchange between CGI characters and human characters. Furthermore, as described below, this allows audience members or other human participants that are not aware of any scripted performance to interact with virtual characters through their motions or gestures.

Figure 18:
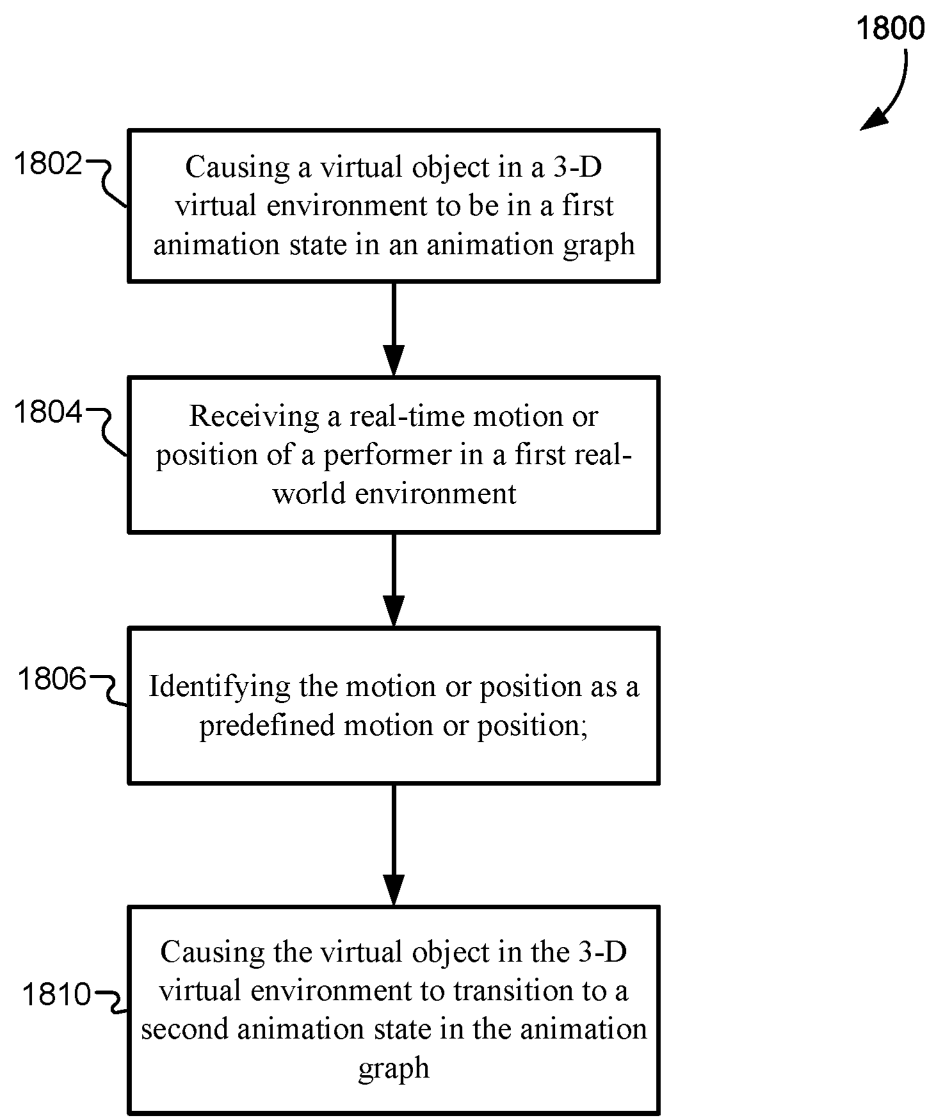
FIG. 18 illustrates a flowchart of a method for governing virtual animations by identifying predefined motions/positions of a motion-capture performer, according to some embodiments.

FIG. 18 illustrates a flowchart 1800 of a method for governing virtual animations by identifying predefined motions/positions of a motion-capture performer, according to some embodiments. The method may include causing a virtual object in the 3-D virtual environment to be in a first animation state in animation graph (1802). The virtual object may be a CGI character, a CGI animal, a CGI vehicle, a scenery element, and/or any other virtual object. The virtual object may also be a virtual effect object that is executed in the 3-D virtual scene. In some embodiments, the first animation state may include a state wherein the object is not yet active or visible in the 3-D virtual scene.

The method may also include receiving a real-time motion or position of a performer in a first real-world environment (1804). The performer may include a motion-capture performer that is captured by a motion-capture system. The motion or position of the performer may also be captured by a plurality of depth cameras. The first real-world environment may include the second performance 302 area described above.

The method may also include identifying the motion or position as a predefined motion or position (1806). Some embodiments may encode the motion or position as a 3-D motion-capture frame comprising vertices and/or wireframe representations of the performer. The 3-D frame can be provided to a game engine that has been altered to include code that recognizes motions of the 3-D frame and/or positions of the 3-D frame by comparison to a predefined set of motions and/or positions. The identified motion and/or position may include hand gestures, body movements, dance moves, fighting actions, stunts, acrobatics, and so forth. The identified motion and/or position may also include more subtle movements, such as finger gestures, head positions and/or rotations, foot movements, or any other position and/or motion that may be represented by the 3-D frame and/or captured for the performer. Motions, gestures, positions, etc., may also be identified by a speed of a movement, such as motions characterized as movements that stop momentum, movements that increase momentum, movements that are perform slower than momentum would normally imply, movements that are continuous but that have low momentum, discontinuous or "jerky" movements, vibrations or jitters, and so forth. Motions or positions may also be identified by a posture or pose of the motion-capture frame, such as a positioning of the head, neck, tips, chest, arms, and/or legs. Other poses or postures that may be recognized may include a posture that is relaxed or balanced over the chest or hips, a folded posture where the chest curves inwards over the hips, and arm positions such as in, out, extended, folded, and so forth. Head gestures can also be recognized, such as head nods, head turns, head shakes, nuzzles, etc.

Additional types of motion performed by the motion-capture frame can be recognized as predefined motions, such as crawling on all fours, laying down, standing up, sitting down, stretching, and so forth. A wide variety of athletic motions may also be trained and recognized by the game engine, such as throwing, catching, tackling, jumping, shooting a ball, kicking a ball, wrestling moves, and so forth. Interactions between characters may generate identifiable predefined motions, such as kicking, hitting, blocking, and so forth. Some embodiments may also identify motions that mimic nonhuman motions, such as flapping a character's arms, jumping like an animal, creating "claws" with their fingers and so forth. These motions can be used particularly when the motion-capture performer is re-skinned to look like an animal or other creature to trigger virtual motions or effects. Virtually any other type of movement or position may be trained by the game engine and identified to trigger new virtual effects or govern existing virtual objects/characters. The list above is provided merely by way of example and not meant to be limiting.

The method may further include causing the virtual object in the 3-D virtual environment to transition to a second animation state in the animation graph (1810). In some embodiments, the transition may be triggered by identifying the motion or position as the predefined motion or position. The second animation state may include causing the virtual object to appear or a virtual effect to execute.

It should be appreciated that the specific steps illustrated in FIG. 18 provide particular methods of controlling a 3-D virtual environment using the motions/positions of a motion-capture performer according to various embodiments of the present invention. Other sequences of steps may also be performed according to alternative embodiments. For example, alternative embodiments of the present invention may perform the steps outlined above in a different order. Moreover, the individual steps illustrated in FIG. 18 may include multiple sub-steps that may be performed in various sequences as appropriate to the individual step. Furthermore, additional steps may be added or removed depending on the particular applications. One of ordinary skill in the art would recognize many variations, modifications, and alternatives.

The embodiments described thus far use a single first performance area 102 and/or a single second performance area 302 with a single motion-capture performer 308 that triggers virtual assets in the 3-D environment 502 and integrates virtual assets in the 3-D environment 502 with the real-world elements of the first performance area 102. The audience viewing the composited views of the first performance area 102 may include a plurality of individuals. However, these embodiments are presented merely a simplified examples and are not meant to be limiting. Other embodiments may include a large number of audience members, a plurality of motion-capture performers, a plurality of virtual assets, and a plurality of performance areas that can all be integrated together using the 3-D environment 502 to generate composited views. This sharing of physical and virtual environments may be referred to as a "shared reality" experience or system.

Figure 19:
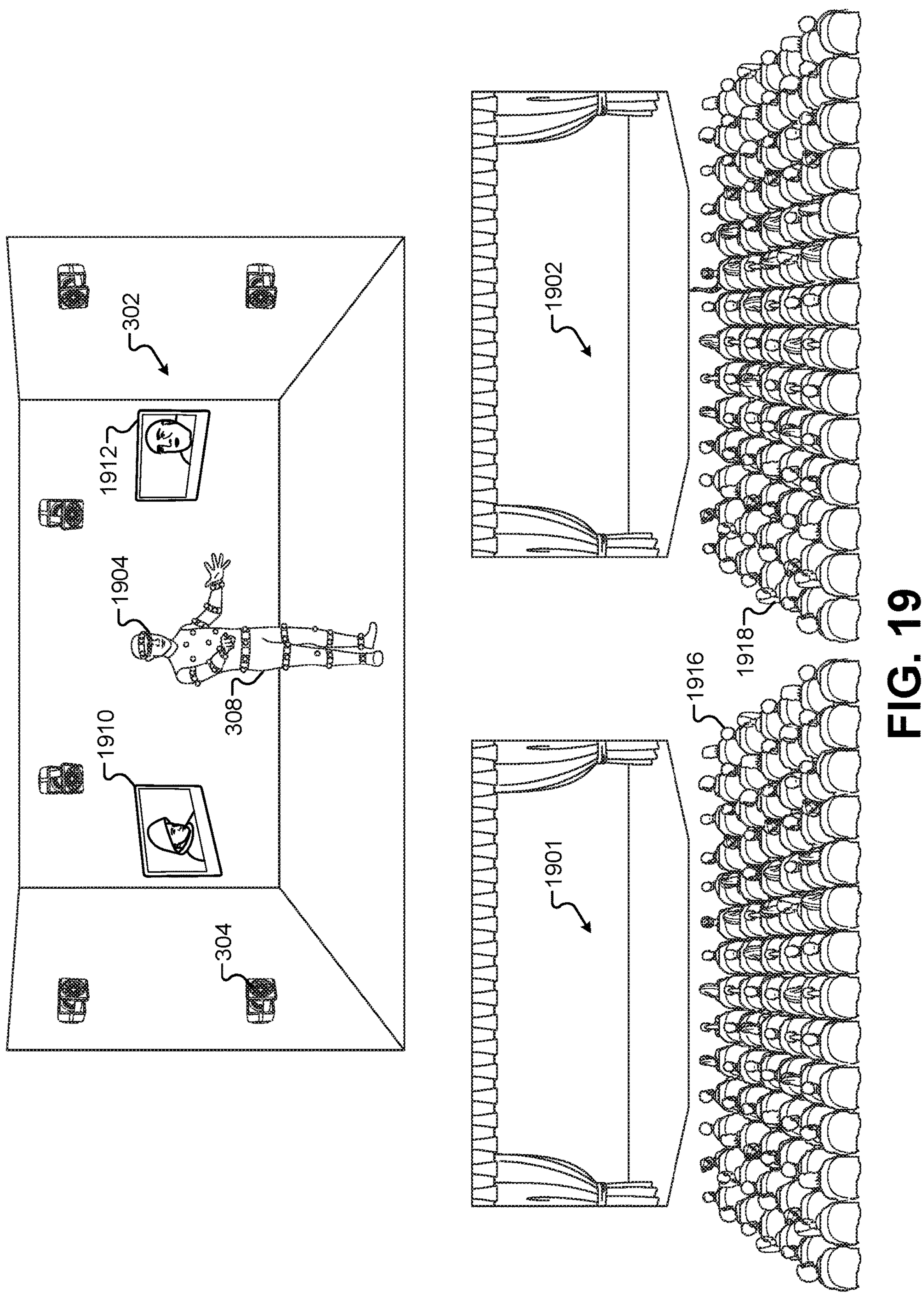
FIG. 19 illustrates one example of a multi-venue distribution of the immersive content presentation system, according to some embodiments.

FIG. 19 illustrates one example of a multi-venue distribution of the immersive content presentation system, according to some embodiments. This example may include a plurality of performance areas, which may be referred to specifically in this example as a first stage 1901, a second stage 1902, a third stage (not shown), and so forth. Each of these stages 1901, 1902 may be equipped with all of the devices described above as part of the immersive content presentation system. Specifically, each of these stages 1901, 1902 may be equipped with depth cameras, visible-light image cameras, motion-capture cameras, and so forth. Additionally, each of the stages 1901, 1902 may be presented in front of live audiences 1916, 1918 having a large number of human participants watching the stages 1901, 1902. Each of the stages 1901, 1902 may be remotely located from each other, such as located in different states or located in different cities. Generally, each of the stages 1901, 1902 may be located in separate physical facilities or buildings in different geographic locations or separated by at least 0.1 miles.

Although not shown explicitly in FIG. 19, each of the stages 1901, 1902 may include human performers, props, scenery, and other real-world objects that can be re-created as part of the 3-D environment 502. In this example, each of the stages 1901, 1902 has been presented as empty for the sake of simplicity and clarity. If a human character and/or physical object is present on the first stage 1901 but not on the second stage 1902, then the composited view of the second stage 1902 as seen by its audience may include renders of 3-D objects that are inserted into the 3-D environment 502 based on the human character and/or physical object from the first stage 1901. Thus, elements from both of the stages 1901, 1902 can be re-created digitally on the other stages such that the composited view of each of the stages 1901, 1902 looks the same regardless of whether they are viewed by the audience 1916 or the audience 1918.

In addition to the stages 1901, 1902, the immersive content presentation system may include one or more second performance areas 302 specifically designed for motion-capture performers 308. In this example, the motion-capture performer 308 in the second performance area 302 may act as the performer to be seen on the stages 1901, 1902. For example, the motion-capture performer 302 may be portrayed as an MC, a musician in a band, a comedian, a political candidate, an athlete, and/or any other type of real-world performer. In some embodiments, the second performance area 302 may be equipped with digital screens 1910, 1912 to provide real-time, real-world video feeds of the audiences 1916, 1918. This may allow the motion-capture performer 308 to view the audiences 1916, 1918 and see their reactions to his/her performance. Alternatively or additionally, the motion-capture performer 308 may wear a pair of AR glasses 1904 and see a composited view of members of the audiences 1916, 1918 in front of them such that they may interact with members of the audiences 1916, 1918 in a realistic fashion as described in greater detail below.

Figure 20:
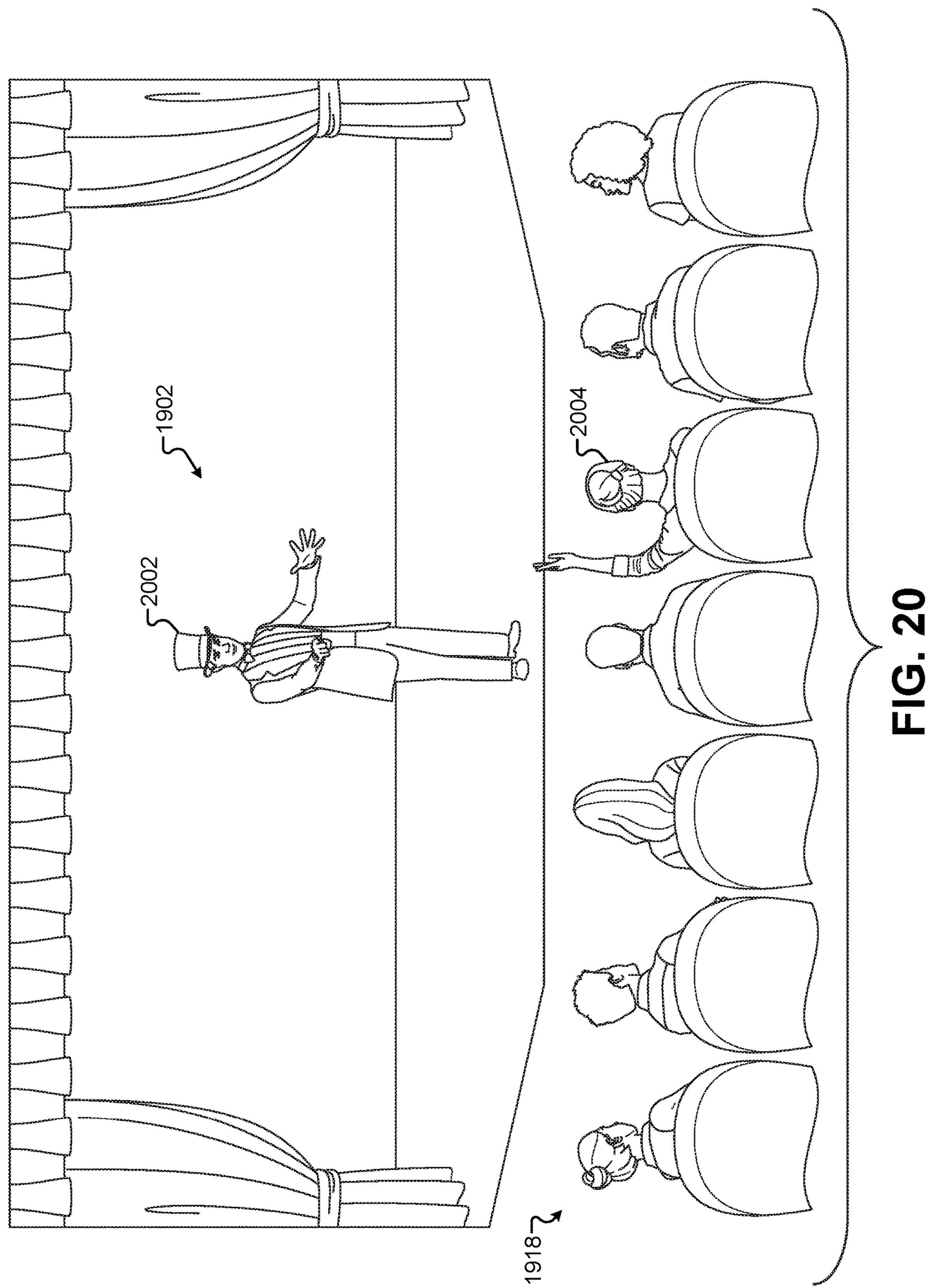
FIG. 20 illustrates a composited view of the second stage with a rendered image of the re-skinned motion-capture performer, according to some embodiments.

FIG. 20 illustrates a composited view of the second stage 1902 with a rendered image of the re-skinned motion-capture performer 308, according to some embodiments. In this example, the motion-capture performer 308 may generate a motion-capture frame 404 in the 3-D environment 502 as described above. The immersive content presentation system can then re-skin the motion-capture frame 404 with a CGI representation of a magician. The 3-D model of the magician may have its movements and interactions governed by the movements of the motion-capture frame 404.

In some embodiments, each member of the audience 1918 may have their own mobile device, such as a smart phone, a pair of VR goggles, a pair of AR glasses, and so forth. In some embodiments, the second stage 1902 may also be equipped with a large display screen that displays a single composited view for all of the members of the audience 1918. In this example, it can be assumed that each member of the audience 1918 is wearing a pair of AR glasses. Thus, the location and/or orientation of each pair of AR glasses can be used to render individual views of the 3-D model of the magician using the process described above. A 2-D image of the magician 2002 may be composited on the AR glasses in front of the view of the second stage 1902. Therefore, each member of the audience 1918 wearing the AR glasses would see the image of the magician 2002 standing on the second stage 1902 as though they were there in person. A similar view may be provided for the audience 1916 of the first stage 1901.

As mentioned above, the motion-capture performer 308 may also be wearing a pair of AR glasses 1904. Any objects that are present on the second stage 1902 can be captured by the depth cameras or preprogrammed into the 3-D environment 502 and re-created in the second performance area 302 by compositing them on the view of the AR glasses 1904 worn by the motion-capture performer 308. This provides a bidirectional, shared, augmented reality experience for both the motion-capture performer 308 and the members of the audience 1918. Additionally, it should be understood that members of the audience 1916 in front of the first stage 1901 would see the same view of the image of the magician 2002 composited on their AR glasses and standing on the first stage 1901.

Note that the use of AR glasses is provided merely as one example. Members of the audience 1916 may also view the first stage 1901 through a smart phone screen/camera, through a tablet, and so forth. Also note that the use of two stages 1901, 1902 is also provided merely as a simplified example. It should be understood that numerous other stages and audiences can be linked to this single 3-D environment 502 and see the same or similar interactive content in real-time. In addition to large audiences, the performance may also be linked to many small audiences, such as single users at home viewing the performance through a pair of VR goggles, on a computer screen, etc.

The motion-capture performer 308 can view the audience 1918 on the display screens 1910, 1912 in the second performance area 302. Alternatively or additionally, the depth cameras, motion-capture cameras, etc., of the second stage 1902 may also have a range that extends into the audience 1918. Therefore, motions and positions of various members of the audience 1918 can be captured and recreated as 3-D models or volumetric objects and place into the 3-D environment 502. This allows the audience 1918 to be re-created in the 3-D environment 502 and composited on the AR glasses 1904 of the motion-capture performer 308. Controls on the AR glasses 1904 and/or on a remote control device can allow the motion-capture performer 308 to toggle back and forth between views of the different audiences 1916, 1918, etc. Thus, the motion-capture performer 308 can interact with different audiences in different locations individually during a live performance.

Figure 21:
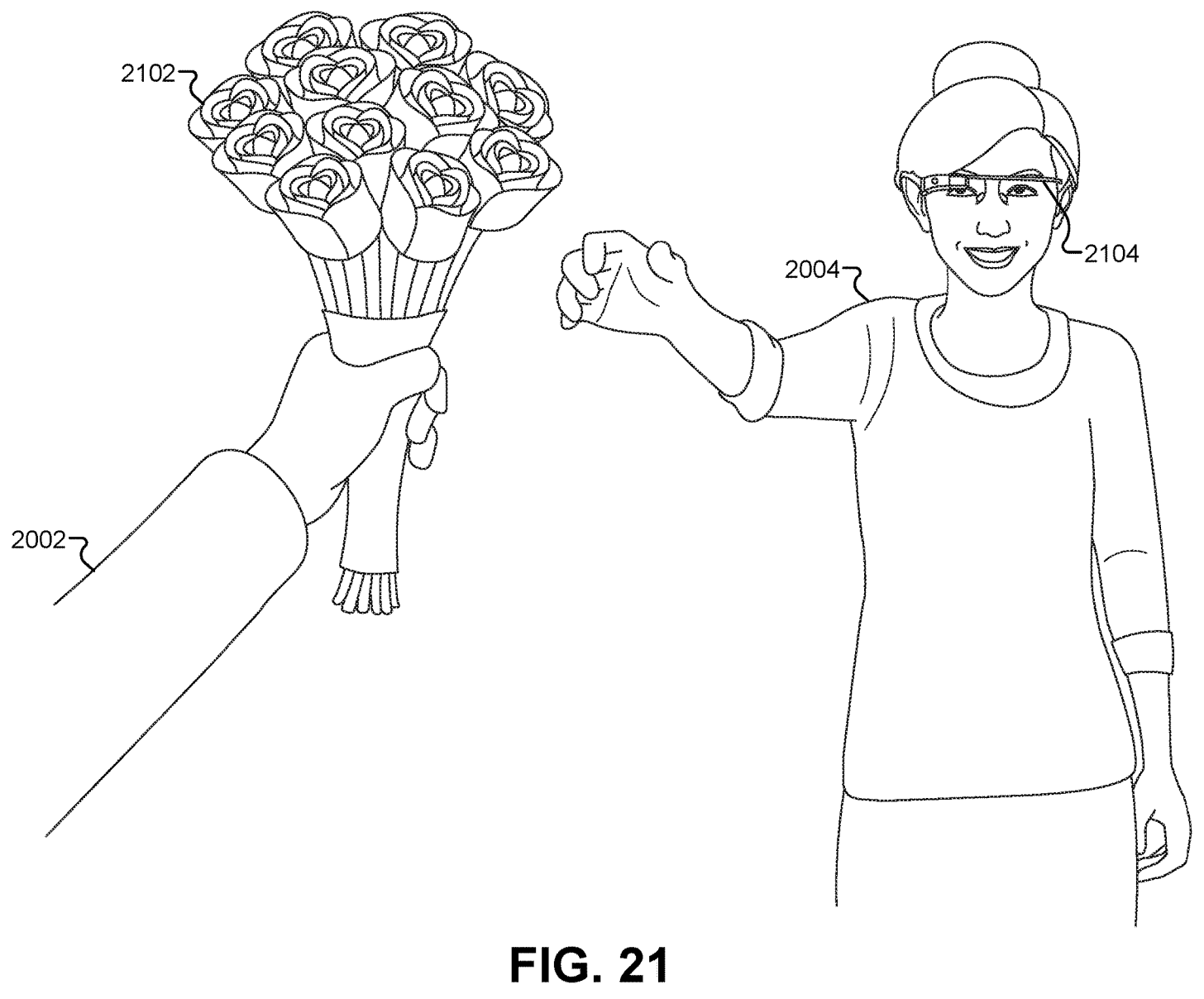

FIG. 21 illustrates how two human performers can control elements of the 3-D environment 502 through predetermined motions and/or positions, according to some embodiments. This figure is seen from the view of the motion-capture performer 308 while wearing the AR glasses 1904. For example, the motion-capture performer 308 can hold their left arm outstretched in front of them and close their hand into a fist. This motion of the corresponding motion-capture frame 404 of the motion-capture performer 308 can be identified by the game engine as a predefined motion and trigger a corresponding action. Raising the left arm and closing the first may cause the game engine to insert a virtual asset into the 3-D environment 502. In this case, the virtual asset may include a 3-D model of a bouquet of flowers. The game engine can insert the 3-D model of the bouquet of flowers into the left hand of the motion-capture frame 404 of the motion-capture performer 308. The 3-D model of the bouquet of flowers can remain attached to the left hand of the motion-capture frame 404 in the 3-D environment 502 and have its movements governed by the physics engine until a subsequent motion or gesture by the motion-capture performer 308 or another performer dictates otherwise.

The AR glasses 1904 worn by the motion-capture performer 308 may render a 2-D image of the 3-D environment 502 based at least in part on their physical location and their corresponding virtual location in the 3-D environment 502. This allows the motion-capture performer 308 to view the virtual interactions with the audience. FIG. 21 illustrates such a view through the AR glasses 1904 worn by the motion-capture performer 308. In this example, the motion-capture performer 308 would view their own arm with a re-skinned exterior, such as the tuxedo as would be seen by the audience members as described above. Thus, the motion-capture performer 308 would see their own limbs, etc. as the re-skinned motion-capture frame 404 from the 3-D environment 502. Additionally, the motion-capture performer 308 would view a rendered image of the bouquet of flowers 2102 as composited on the AR glasses 1904. Specifically, as the motion-capture performer 308 raises their left hand and closes their fist, they would see the rendered image of the bouquet of flowers 2102 appear in their left hand.

As described above, the second stage 1902 may be equipped with depth cameras, motion-capture cameras, visible-light cameras, and so forth. When the motion-capture performer calls for a volunteer, an audience member from the audience 1918 may walk onto or approach the second stage 1902. When this occurs, the depth cameras and/or motion-capture cameras of the second stage 1902 can see the audience member, generate or load a 3-D virtual model of the audience member into the 3-D environment 502, and render a view of the audience number 2004 that would be visible to the motion-capture performer 308 through the AR glasses 1904. The audience member may be made to appear as they look in the real-world environment of the second stage 1902, or the audience member may be re-skinned to appear as any other character, creature, and so forth.

This environment creates a shared reality experience that is mixed between two different physical venues via the AR glasses worn by the audience member(s) and the motion-capture performer 308. Elements from each physical location may be re-created in a shared 3-D environment 502, and rendered views of that shared 3-D environment can be generated from unique positions and/or perspectives of each participant. For example, any objects that appear in the second performance area 302 (e.g., a table, a magician's hat on the table, other magic props, etc.) can be generated in the 3-D environment 502. These objects would be rendered for the composited views of the audience members, but would be left out of the rendering operation for the view of the motion-capture performer 308. Similarly, objects on the second stage 1902 can be viewed naturally by the members of the audience 1918 and would be omitted from their rendered views of the shared 3-D environment 502. However these objects may be rendered for the composited view for the motion-capture performer 308.

Because the 3-D environment 502 is shared between all the participants, multiple participants can interact with virtual assets using gestures, motions and positions of their corresponding motion-capture frames. In this example, the motion-capture performer 308 is able to hand off the bouquet of flowers to the audience member on the stage. As the motion-capture performer 308 opens their hand, this gesture can be recognized by the game engine to uncouple the 3-D model of the bouquet of flowers from their virtual hand. Similarly, as the motion-capture frame of the audience member raises its hand and closes its fist, the game engine can recognize this gesture and attach the 3-D model of the bouquet of flowers to the virtual hand of the audience member, provided that the 3-D model of the bouquet of flowers is within a threshold distance of the hand of the audience member.

Figure 22:
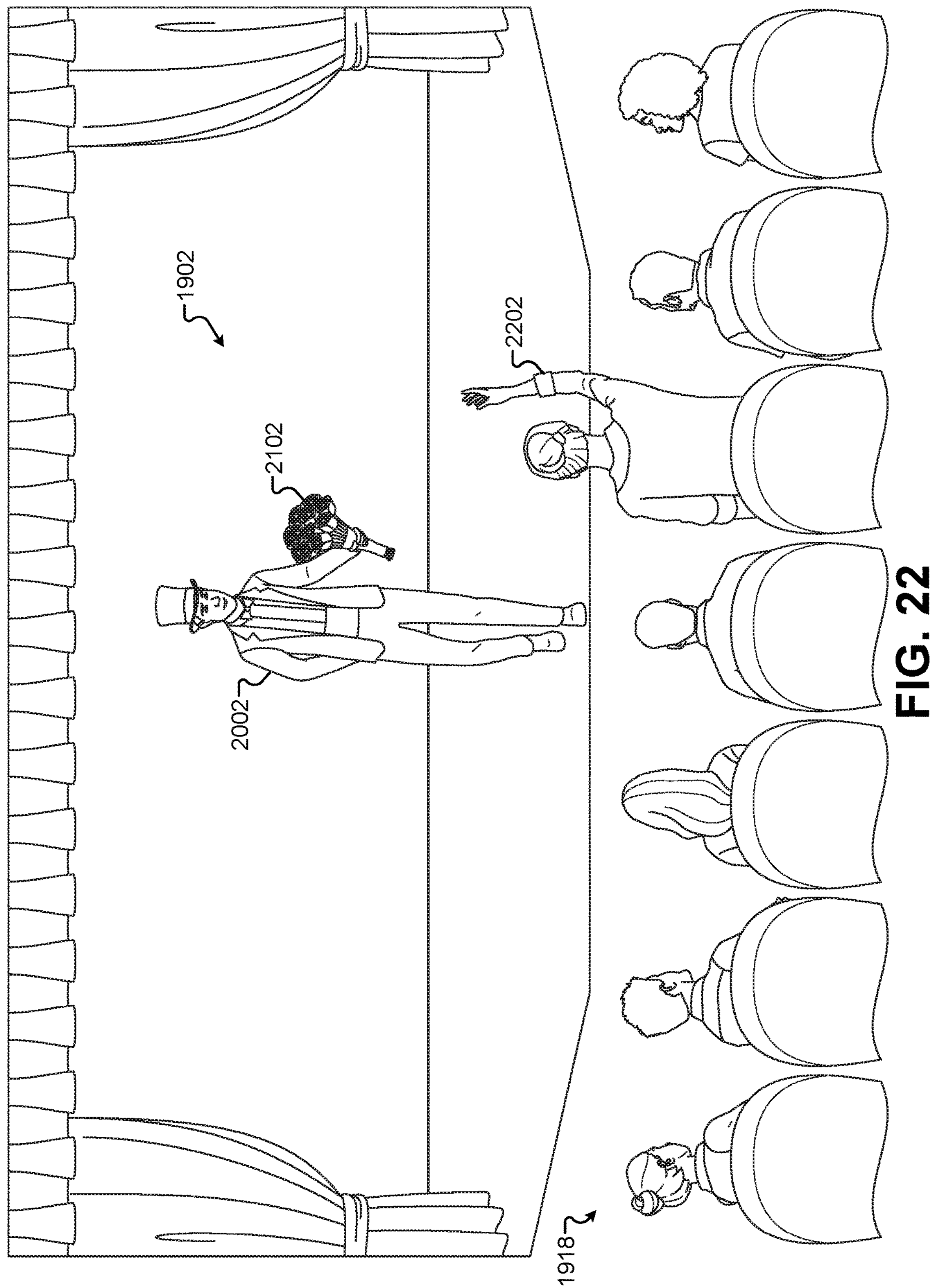
FIG. 22 illustrates a view of the scene from FIG. 21 from the perspective of a member of the audience, according to some embodiments.

FIG. 22 illustrates a view of the scene from FIG. 21 from the perspective of a member of the audience 1918, according to some embodiments. In this view, the view of the audience member 2202 would be seen from the member of the audience 1918 with their natural eyes. The rendered 2-D view of the magician 2002 and the rendered 2-D view of the bouquet of flowers 2102 would be visible as a composited image on their AR glasses. Thus it would appear to every member of the audience 1918 that the 2-D view of the magician 2002 hands the 2-D view of the bouquet of flowers 2102 to the physical audience member 2202. This view for each audience member would be based on their location and/or orientation, and a unique render for each member of the audience 1918 would be provided in each image frame as described above. Again, it should be emphasized that although single image frames have been discussed above, each of these image frames may often be part of a continuous video sequence that is composited and viewed on mobile devices, screens, AR glasses, and so forth in real time. Therefore, members of the audience 1918 would not just see an image of the magician 2002, they would see a continuous, lifelike, video stream of the magician in their composited views.

These figures illustrate just one example of how virtual assets can be created and/or manipulated based on recognized motion gestures and/or positions of various performers in different physical locations in a shared 3-D environment 502. Based on this description, it should be recognized that many other types of interactions with virtual assets are enabled by this technology. For example, participants in multiple locations may participate in a shared fight environment that includes additional CGI characters that react realistically when punched, kicked, etc. Human participants in multiple locations can engage in magic duels and attack each other with virtual effects, such as lightning, fire, ice, and other fantastical simulated powers. Participants can change their location in a virtual scene in ways that defy normal physics. For example, by raising their hands over their head, a participant can cause their corresponding motion-capture frame to fly upwards in the 3-D environment 502. By performing the predefined gesture of snapping her fingers, participants can "warp" their motion-capture frame to different locations in the 3-D environment 502. Participants in different locations can participate in shared sporting events in the 3-D environment 502. For example, players on different physical basketball courts in different locations can use this technology to play in a shared basketball game, where the basketball itself is a virtual asset that is governed by the gestures and positions of the players. Band members can rehearse or record with each other while residing in different locations. Aside from these examples, this technology may be used to implement any other shared-reality experience where interactions with virtual assets can be governed by human gestures/positions.

Figure 23:
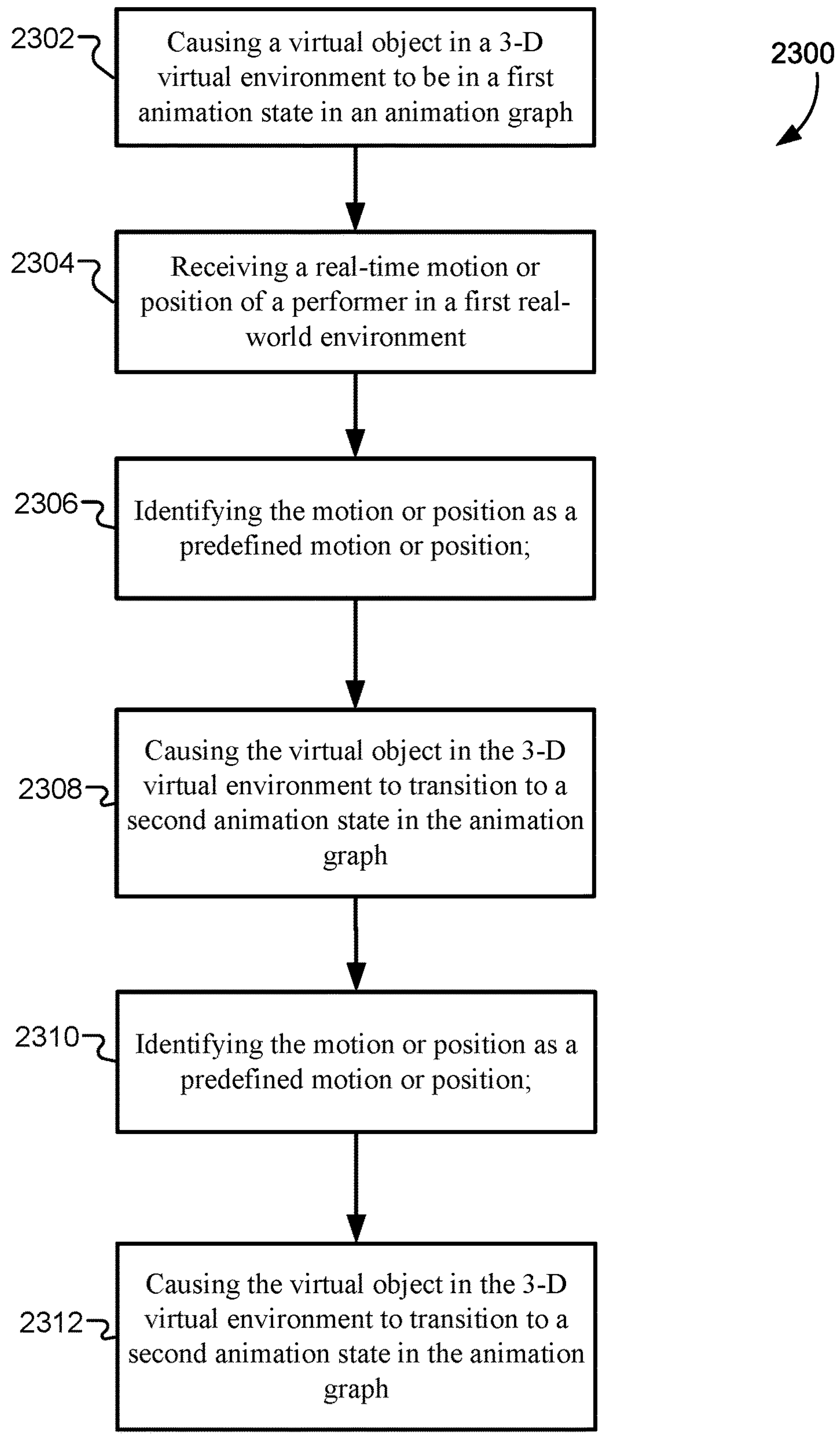
FIG. 23 illustrates a flowchart of a method for providing a shared-reality experience, according to some embodiments.

FIG. 23 illustrates a flowchart 2300 of a method for providing a shared-reality experience, according to some embodiments. The method may include receiving a first motion or position of a first performer in a first real-world environment (2302). The performer may include a motion-capture performer whose movements/position are captured by a motion-capture system. The motion or position of the performer may also be captured by a plurality of depth cameras. The first real-world environment may include the second performance 302 area described above. For example, the first real-world environment may include the area where the performer depicted as a magician performs in the real world.

The method may also include identifying the first motion or position as a first predefined motion or position (2304). Some embodiments may encode the motion or position as a 3-D frame comprising vertices and/or wireframe representations of the performer. The 3-D frame may be provided to a game engine that has been altered to include code that recognizes motions of the 3-D frame and/or positions of the 3-D frame by comparison to a predefined set of motions and/or positions. The identified motion and/or position may include hand gestures, body movements, dance moves, fighting actions, stunts, acrobatics, and so forth. The identified motion and/or position may also include more subtle movements, such as finger gestures, head positions and/or rotations, foot movements, or any other position/motion that may be represented by the 3-D frame and/or captured for the performer. For example, the gesture may include raising the left arm and closing the first of the motion-capture performer 308 depicted as a magician described above.

The method may additionally include adding or altering a virtual asset in a 3-D virtual environment in response to identifying the first motion or position as the first predefined motion or position (2306). The 3-D virtual environment may model the first real-world environment described above, including 3-D models of any props or scenery in the first real-world environment. The 3-D virtual environment may also model a second real-world environment, such as the first performance area 102 described above. For example, the second real-world environment may include the first stage 1901 and/or the second stage 1902. The 3-D virtual environment may also comprise the 3-D environment 502 described above. The 3-D virtual environment may include volumetric objects and/or 3-D models of objects that are found in the second real-world environment, such as physical objects, human characters, props, scenery, and/or any other physical characteristics of the second real-world environment. In some embodiments, the 3-D virtual environment may be a shared 3-D virtual environment that allows for the virtual interaction between individuals in the first real-world environment and the second real-world environment. The 3-D virtual environment may share props, objects, scenery, and so forth, between the different real-world environments.

The virtual asset may include one or more 3-D models of digital characters, digital objects, digital scenery, and other objects that can be added and/or moved in the 3-D virtual environment. The virtual asset may also include digital effects, such as flames, ice, weather effects, smoke, fog, explosions, lightning, or any other digital effect. In some embodiments, the virtual asset may include a plurality of virtual assets of different types. For example, the virtual asset may be the 3-D model of the bouquet of flowers described above in FIG. 21.

The method may further include receiving a second real-time motion or position of a second performer in a second real-world environment (2308). The second real-world environment may include the first stage 1901, the second stage 1902, or any other type of real-world environment described above in which motions and/or positions of human performers can be captured and analyzed. For example, the second performer may include the audience member called to the second stage 1902 in the example above. The method may also include identifying the second real-time motion or position as a second predefined motion or position (2310). The second predefined motion or position may be recognized in the same or similar manner as the first predefined motion or position was recognized. In some instances, the second predefined motion or position may be the same as the first predefined motion or position. In other instances, the second predefined motion or position may be different from the first predefined motion or position. The method may additionally include altering the virtual asset in the 3-D virtual environment in response to identifying the second motion or position as the second predefined motion or position (1312). In the example above, this may include the "handoff" of the bouquet of flowers between the magician and the audience member. Other examples may include throwing a ball back and forth between virtual performers, etc. In some embodiments, the virtual asset may be the same virtual asset for both performers, whereas in other embodiments the virtual assets may be different for each performer. For example, performers may generate different virtual effects that qualify as the virtual asset described above.

In some embodiments, this method may be augmented using the techniques described in detail above for creating a real time, composited view of the 3-D environment 502 for the audience members in any location that uses the immersive content presentation system. For example, composited views of the first performer, the second performer, and/or the virtual asset may be rendered and provided to mobile devices of the audience members, such as smart phones, AR glasses, VR goggles, or one or more large display screens.

Another technical problem existed prior to this disclosure that made this type of shared-reality experience very difficult to implement. Specifically, this technical problem related to the transmission and packaging of communications to maintain a real-time stream of data between all of the various devices in the immersive content presentation system. As described above in relation to FIGS. 14A-14C, there are many different configurations of servers, environments, cameras, sensors, mobile computing devices, displays, VR goggles, AR glasses, etc., that may be used in the immersive content presentation system. Because of this diversity of device types, different types of data may need to be transmitted between different devices. The type and amount of data may depend on the capabilities of each device. For example, the type and amount of data transmitted between devices may depend on where images are rendered, where images are composited, where the 3-D environment is stored in manipulated, where the game engine detects motion-capture gestures and/or positions, and so forth. Existing communication protocols were not tailored to this shared-reality experience, and thus resulted in communication packets that were bloated, unnecessary, and insufficient, and which in turn led to an increase of bandwidth usage across wireless networks used by the immersive content presentation system. This increased bandwidth can interfere with the ability to capture, render, composite, and display images in real time for live audiences.

To overcome this and other technical problems, an improvement to communication technology is described in this disclosure. Specifically, a bandwidth-efficient and data-efficient protocol has been designed that is adaptable for any shared-reality device configurations. As described in the sections above, the immersive content presentation system may transmit live video streams, rendered images, composited images, virtual asset identifiers, and 3-D transformations to be applied to virtual assets in a 3-D environment. The communication protocol described below accommodates each of these different types of data and transmits them in the most memory-efficient and bandwidth-efficient manner. This efficiency allows the immersive content presentation system to perform in real time for large audiences using large numbers of display devices. For example, this protocol can allow stadiums or large sports venues to provide real-time, rendered, composited views of a shared reality experience involving thousands of display devices simultaneously. At the same time, this protocol also works efficiently in a home theater environment or other small-venue implementations of the immersive content presentation system.

Figure 24:
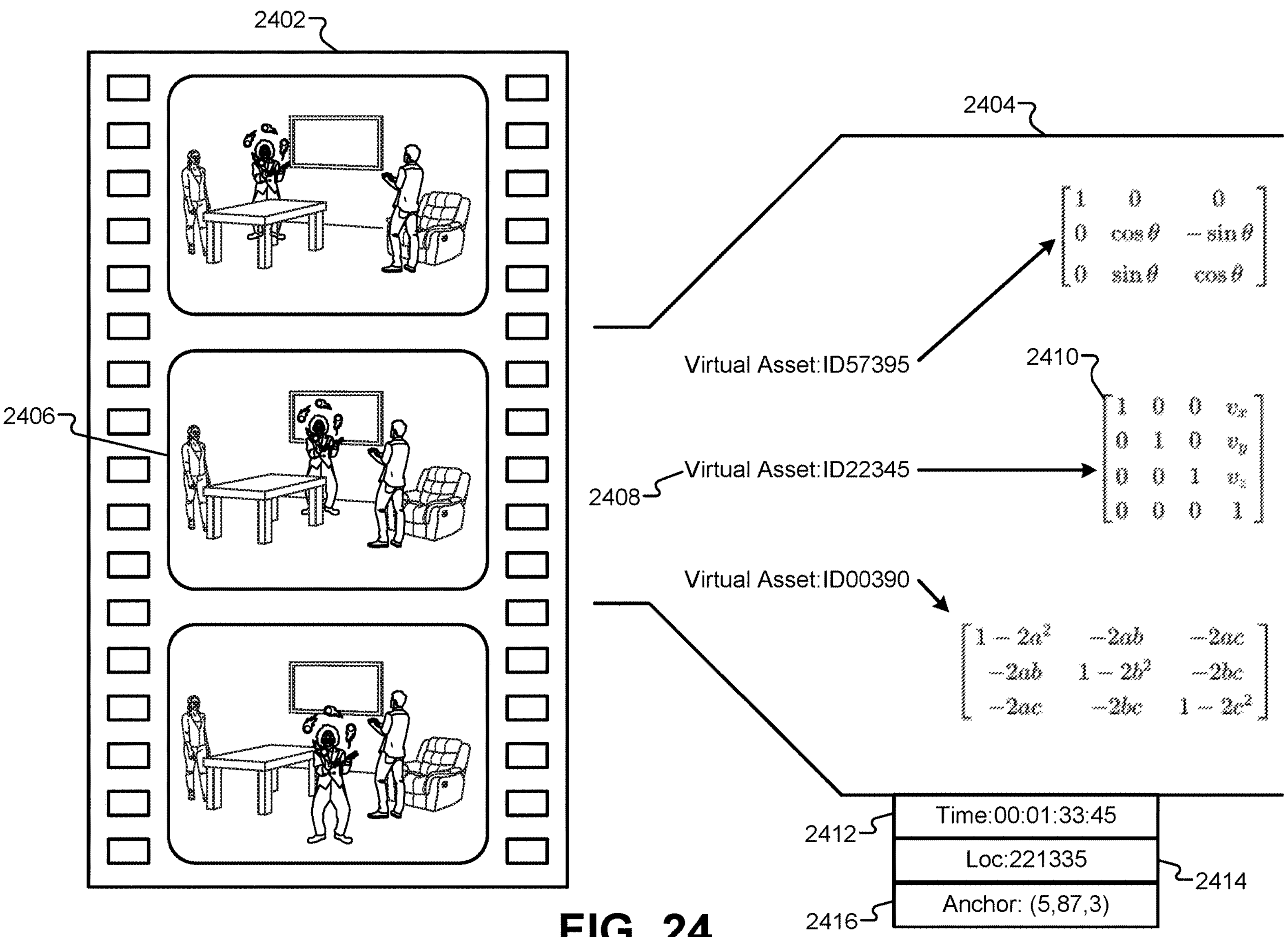
FIG. 24 illustrates a diagram of the communication protocol, according to some embodiments.

FIG. 24 illustrates a diagram of the communication protocol, according to some embodiments. A live video stream can be broken up into individual frames that are recorded and/or presented at interactive frame rates (e.g., 10 fps, 20 fps, less than 1 second delay, etc.). For each frame, the communication protocol can prepare a single communication packet. Each single communication packet can be configured to store up to a complete set of information required to provide a composited view of a single frame in the live video stream. In some embodiments, each communication packet may include at least two fields. A first field 2402 can be configured to represent a 2-D image 2406. For example, the 2-D image 2406 may depict at least part of a view of a real-world environment. Alternatively, the 2-D image 2406 may depict a rendered view of at least part of the 3-D virtual environment. The 2-D image 2406 may be derived from a live video stream from a visible-light camera, such as camera 106 in the first performance area 102. Individual frames from this video stream can be packaged in the first field 2402 of each packet in the communication protocol. Each of these frames can be used as a background for a compositing operation for generating a composite view that is displayed on the display device as illustrated in the examples above.

In some configurations, the 2-D image 2406 may include a rendered view of the 3-D environment 502 from a perspective of a virtual camera in the 3-D environment 502. When being transmitted to a display device, the rendered view of the 3-D environment 502 may be rendered from a perspective corresponding to the location of the display device relative to a performance area, such as the first performance area 102. In these configurations, multiple communication packets can be transmitted to different devices for each frame, where each frame is rendered from a different perspective. This allows for a central server to perform multiple rendering operations and transmit images to various display devices. In some embodiments, the rendered view may include cutouts that provide a 3-D perspective for virtual objects being superimposed on live images. Therefore, the rendered view may include rendered views of virtual assets that are not present in a live view of a performance area. Alternatively, the rendered view may be a complete rendering of the 3-D environment.

In some configurations, the 2-D image 2406 may include a composited image. The composited image may include a background layer comprised of a frame from a live video feed from a camera. The composited image may also include a foreground or second layer comprised of rendered portions of the 3-D environment 502. This configuration may be suitable for transmitting images that are ready for display on a large display screen or any other viewpoint-agnostic display method.

In some implementations, the first field 2402 may be left unpopulated. Therefore, a field that is configured to represent a 2-D image may also represent a blank image or null image. This may be useful for configurations where the rendering and/or compositing operations are performed at the individual display devices. This may also be useful for configurations where the display devices capture the live video feed upon which the rendered images will be composite, such as with smart phones, AR glasses, and/or the like.

In addition to the first field that is configured to represent a 2-D image, the communication protocol may also include a second field 2404 that is configured to represent one or more 3-D transforms that can be applied to virtual assets in the 3-D virtual environment. As described above, the 3-D environment 502 may include any number of virtual assets. The communication protocol accommodates this by allowing the second field 2404 to include any number of components, each of which may contain a transform for a specific virtual asset in the 3-D environment. Each transform may include a matrix or other mathematical expression 2410 that represents the transform to be applied to the virtual asset. Additionally, each transfer may be associated with a unique identifier 2408 that identifies the virtual asset in the 3-D environment to which the transform should be applied.

Any type of matrix or mathematical expression 2410 can be used to represent a transform. Common geometric transformations that are used in computer graphics may include rotation, scaling, shearing, reflection, orthogonal projection, translation, and so forth. These may generally be represented by matrices that can be multiplied with coordinate values of different points on the virtual asset to change the location of these coordinates and apply the transformation to the virtual asset. As described above, these transformations may result from the game engine identifying a motion or position of a motion-capture performer as a predefined motion or position that triggers the transform to be applied to one or more virtual assets in the 3-D environment.

By sending 3-D transforms in each communication packet, this allows the immersive content presentation system to allow different composited views to be remotely rendered in a distributed fashion rather than requiring that they all take place at the same server. Previously, a single version of the 3-D environment was stored at the server, and the server was required to render each view of the 3-D environment from the different perspectives of the display devices, such as AR glasses. When the number of display devices grows beyond the capability of the server to simultaneously render different views of the 3-D environment, real-time display of composited views for each display device was no longer possible. In these embodiments, the 3-D virtual environment can be transmitted a single time to each of the devices in the immersive content presentation system. Therefore, multiple devices may simultaneously store a representation of the 3-D environment. This may include 3-D objects representing live props, motion-capture frames, different "skins" that may be applied to motion-capture frames, virtual effects, 3-D models of CGI characters, and so forth.

To keep the different versions of the 3-D environment up to date on each of the distributed devices, the communication protocol described herein transmits transforms from the server to all of the devices in the immersive content presentation system that have copies of the 3-D environment. This allows each receiving device to individually apply the transforms to the 3-D environment. Generally, applying these transforms in real time is computationally inexpensive and can be easily performed by even lightweight processing systems. This communication protocol is very advantageous because transmitting the 3-D transforms requires only a fraction of the bandwidth that would be required to otherwise transmit the entirety of the 3-D environment with each frame, which would otherwise be required for distributed rendering.

As was the case with the first field 2402, the second field 2404 may include null or empty data. For example, in cases where the rendering operation is performed centrally and the rendered images are transmitted to the various display devices, it may not be necessary to transmit any 3-D transforms to any display devices. Therefore, the second field 2404 may be null/zero or left unpopulated for these configurations.

In some embodiments, each communication packet in the communication protocol may also include a timestamp 2412, a location code 2414, and/or a spatial anchor point that identifies a common coordinate origin for each of the distributed devices. Because people see the same virtual objects in the same real-world locations, distributed configurations may require a shared understanding of spatial anchors. In some embodiments, a visual fiducial (e.g., an image, a pattern, a printed page, or any other distinguishable visible item) can be placed at an origin location in each real-world environment. Each device when viewing their respective real-world environment can determine a position and orientation of the visual fiducial and store this anchor points as an offset. They can then be prepended as necessary to camera transforms that are sent between the device and the server.

Figure 25:
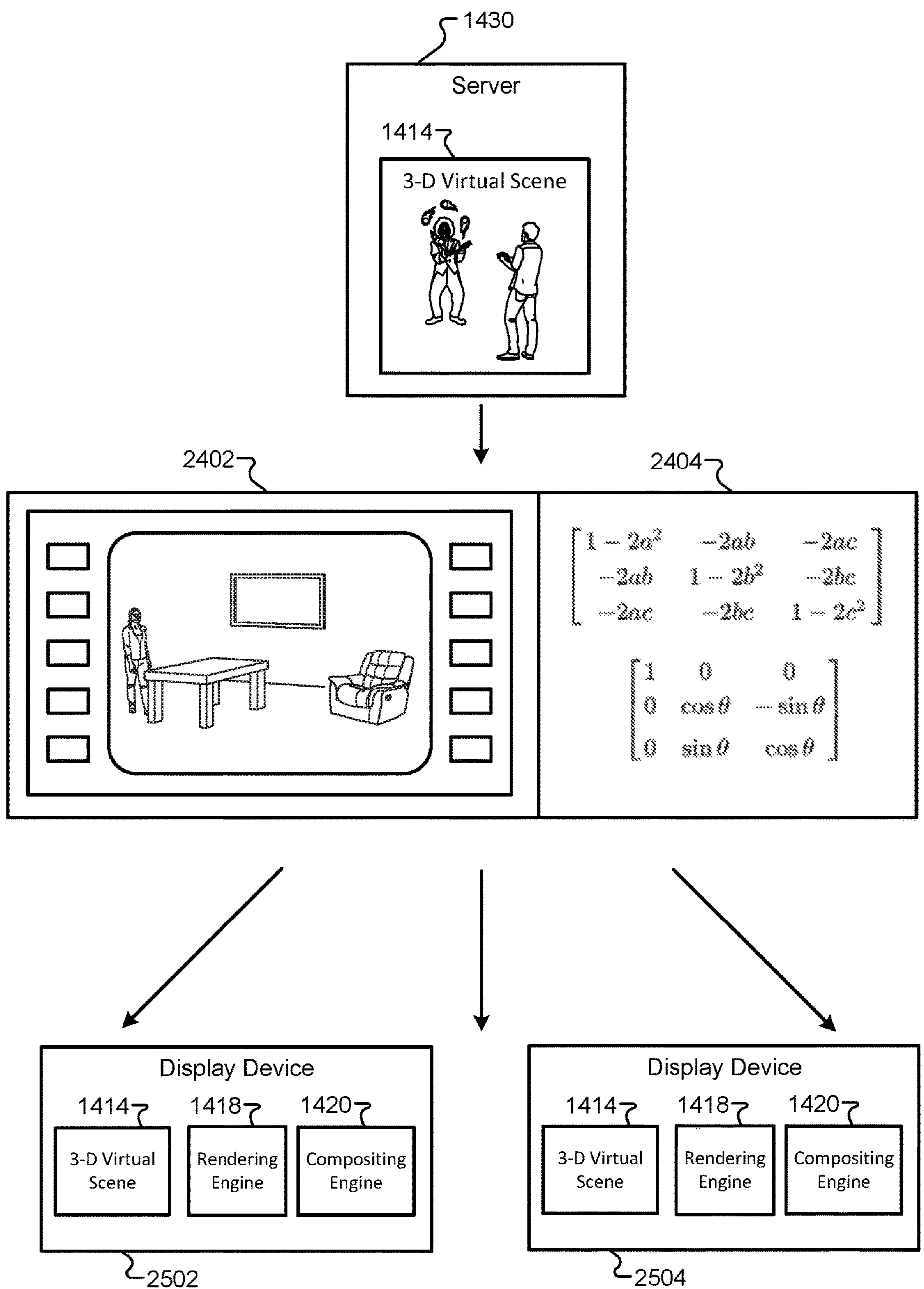
FIG. 25 illustrates a transmission using the communication protocol that supports remote rendering, according to some embodiments.

FIG. 25 illustrates a transmission using the communication protocol that supports remote rendering, according to some embodiments. In this example, a representation of the 3-D virtual scene 1414 can be distributed to the server 1430 and to a plurality of display devices 2502, 2504. Each communication packet may include a first field 2402 and a second field 2404 as described above. The first field 2402 may include image frames from a live video stream of a performance area, such as the first performance area 102. For example, this may include image frames that include the human actor 108, the table 110, the chair 112, and so forth. Individual frames from this video stream may be transmitted to each of the display devices 2502, 2504 to be used as a background layer for compositing rendered images for the final composited view.

The second field 2404 in the packets transmitted by the communication protocol may include 3-D transforms that may be applied to the 3-D virtual scene 1414 by each of the display devices 2502, 2504. For example, each of the display devices 2502, 2504 may include a rendering engine 1418 and a compositing engine 1420. The display device is 2502, 2504 can then apply the 3-D transforms to the 3-D virtual scene 1414, render individual views of the 3-D virtual scene 1414, composite views of the 3-D virtual scene 1414 on top of the image frames received in the first field 2402 of the communication protocol, and provide the composited view for display.

Figure 26:
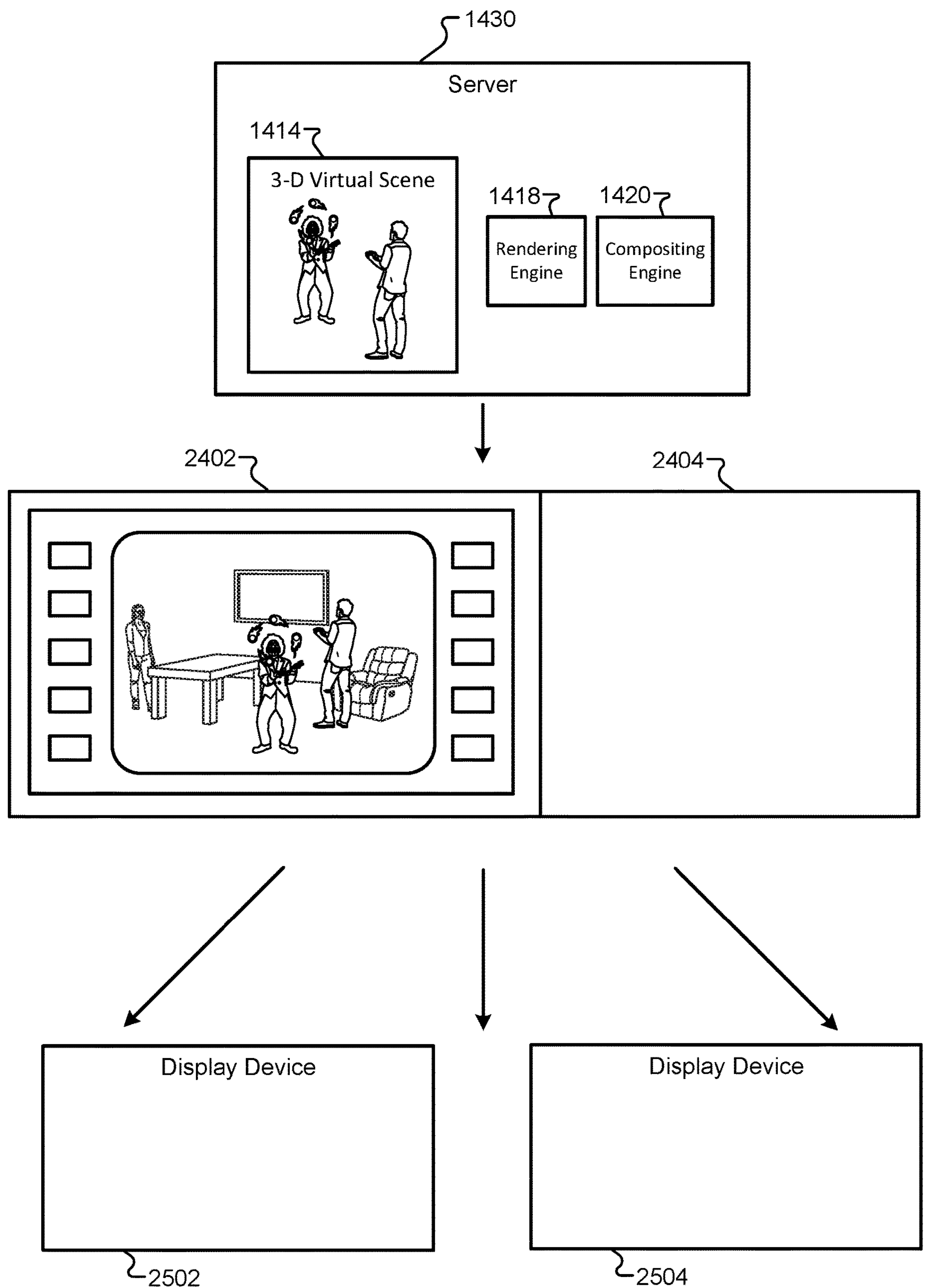
FIG. 26 illustrates a transmission using the communication protocol that supports centralized rendering, according to some embodiments.

FIG. 26 illustrates a transmission using the communication protocol that supports centralized rendering, according to some embodiments. In this configuration, the display devices 2502, 2504 need not require any rendering engine 1418 or compositing engine 1420. Instead, the server 1430 can perform all of the rendering operations centrally. Thus, the first field 2402 can include a composite view generated by rendering the 3-D virtual scene 1414 and compositing that scene on a real-time view of a performance area. Each communication packet in the communication protocol can include a 2-D image from the composited video stream. However, because the 3-D virtual scene 1414 has been fully rendered, and exists only on the server 1430, there is no need to transmit any 3-D transforms in the second field 2404 of the communication packet. This embodiment may be used for configurations where the display devices 2504 are not required or able to perform heavy compositing/rendering operations.

Figure 27:
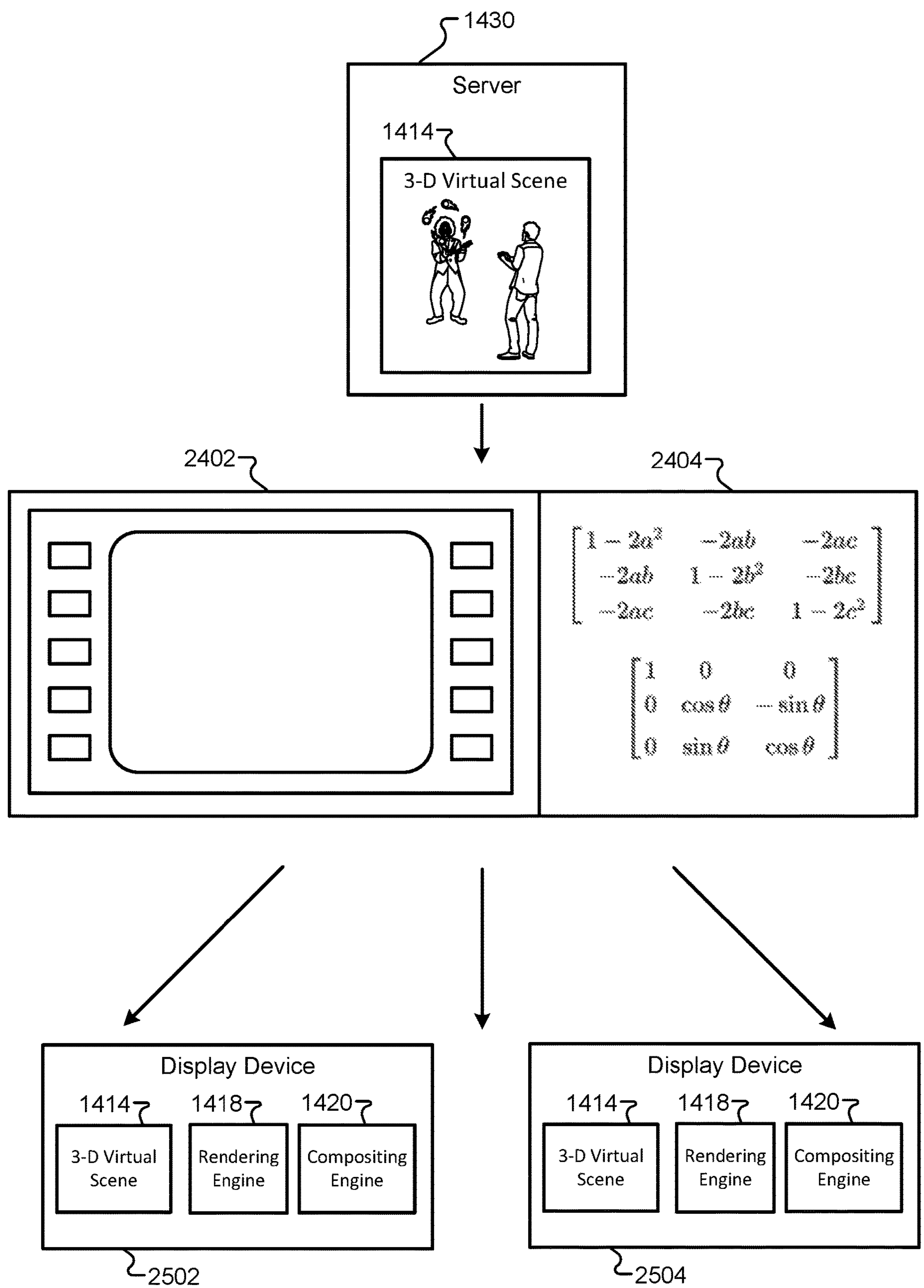
FIG. 27 illustrates a transmission using the communication protocol that supports remote rendering/compositing and image capture, according to some embodiments.

FIG. 27 illustrates a transmission using the communication protocol that supports remote rendering/compositing and image capture, according to some embodiments. In this configuration, each of the display devices 2502, 2504 may include a copy of the 3-D virtual scene 1414. No rendering needs to take place at the server 1430. Additionally, each of the display devices 2502, 2504 may include a camera or other means of seeing a live view of the performance area. For example, the display devices 2502, 2504 may include a camera that displays a real-time image on a screen, or may include AR glasses that provide a natural view of the performance area. Because each of the display devices 2502, 2504 capture or create their own 2-D images for a background compositing layer, there is no need to transmit any 2-D images in the first fields 2402 of the communication packet. Therefore, it can include a blank image or can be set to null/zero memory to preserve bandwidth. However, the second field 2404 may continue to transmit 3-D transforms such that the 3-D virtual scene 1414 can maintain consistency across all of the devices.

Figure 28:
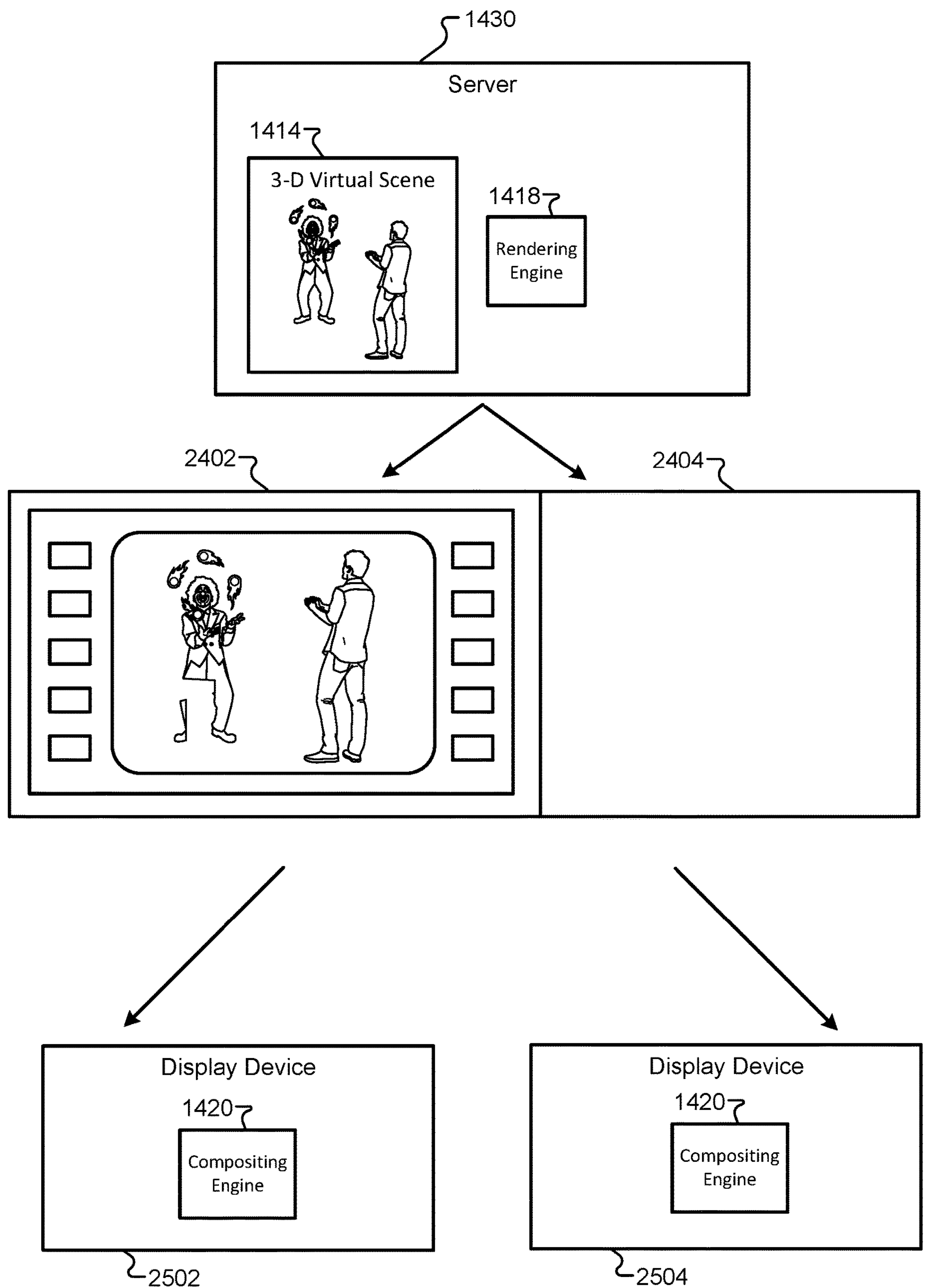
FIG. 28 illustrates a transmission using the communication protocol that supports central rendering and remote compositing, according to some embodiments.

FIG. 28 illustrates a transmission using the communication protocol that supports central rendering and remote compositing, according to some embodiments. In this implementation, the 3-D virtual scene 1414 only needs to exist at the server with the rendering engine 1418. As described above, the server 1430 can render a 2-D image for the first field 2402 of the communication packet that includes cutouts of the rendered objects such that the 2-D image is ready for compositing. The display devices 2502, 2504 can receive the rendered image and composite the image with a live image, such as an image captured by a phone camera or an image visible through AR glasses.

Figure 29:
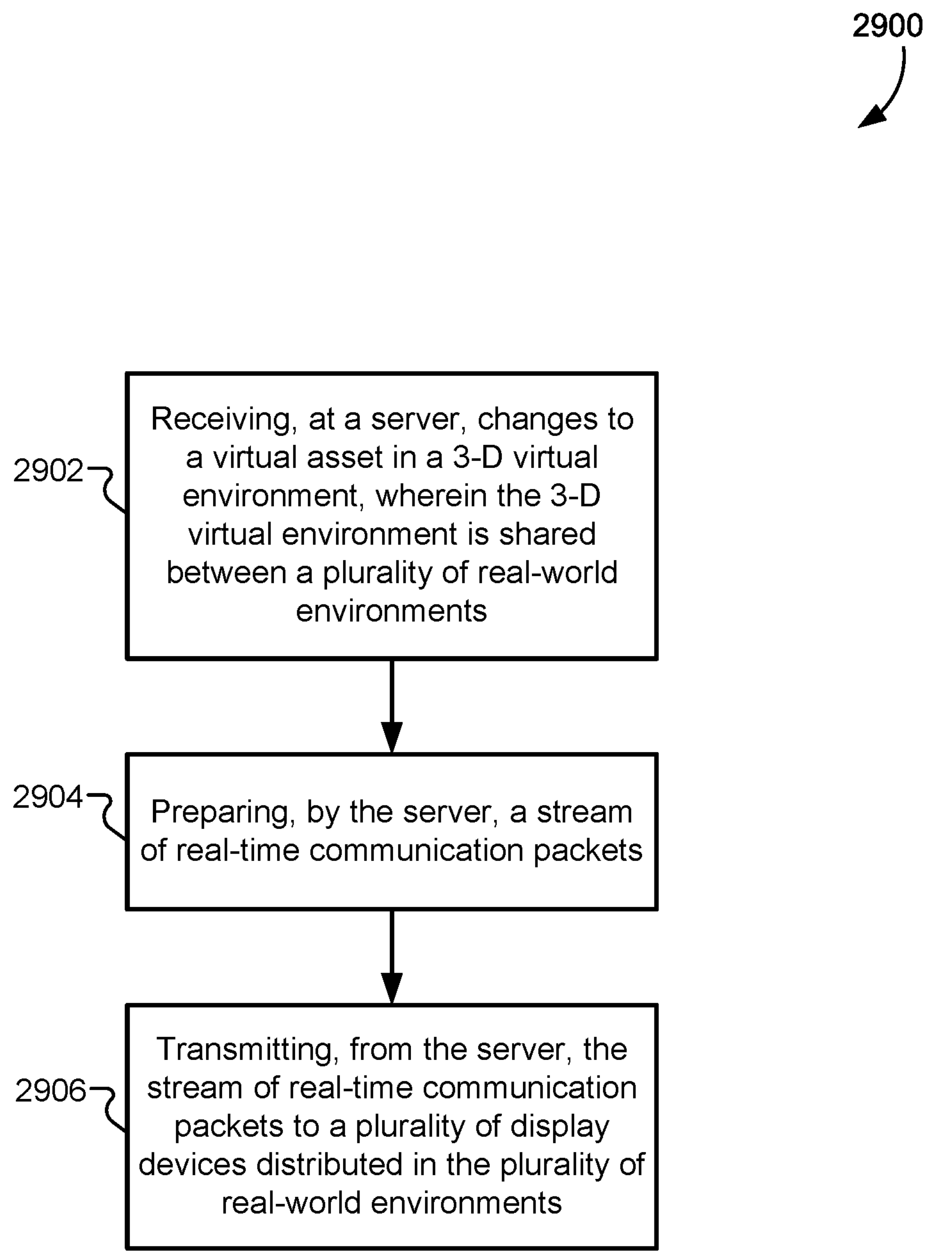
FIG. 29 illustrates a flowchart of a method for using a communication protocol that efficiently shares information in a shared-reality immersive content presentation system, according to some embodiments.

FIG. 29 illustrates a flowchart 2900 of a method for using a communication protocol that efficiently shares information in a shared-reality immersive content presentation system, according to some embodiments. The method may include receiving changes to a virtual asset in a 3-D virtual environment (2902). The 3-D virtual environment may be shared between a plurality of real-world environments, such as a motion-capture area, a performance area, an audience, and so forth. The method may also include preparing a stream of real-time communication packets (2904). The packets may include a first field that is configured to represent a 2-D image depicting at least in part a view of a first real-world environment in the plurality of real-world environments or a view of the 3-D virtual environment. The packets may also include a second field that is configured to represent one or more 3-D transforms to be applied to the virtual asset in the 3-D virtual environment. The method may also include transmitting the stream of real-time communication packets to a plurality of display devices distributed in the plurality of real-world environments (2906). The transmitted communication packets can be used to build or present composited views as described in detail above.

It should be appreciated that the specific steps illustrated in FIG. 29 provide particular methods of using a communication protocol according to various embodiments of the present invention. Other sequences of steps may also be performed according to alternative embodiments. For example, alternative embodiments of the present invention may perform the steps outlined above in a different order. Moreover, the individual steps illustrated in FIG. 29 may include multiple sub-steps that may be performed in various sequences as appropriate to the individual step. Furthermore, additional steps may be added or removed depending on the particular applications. One of ordinary skill in the art would recognize many variations, modifications, and alternatives.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 30:
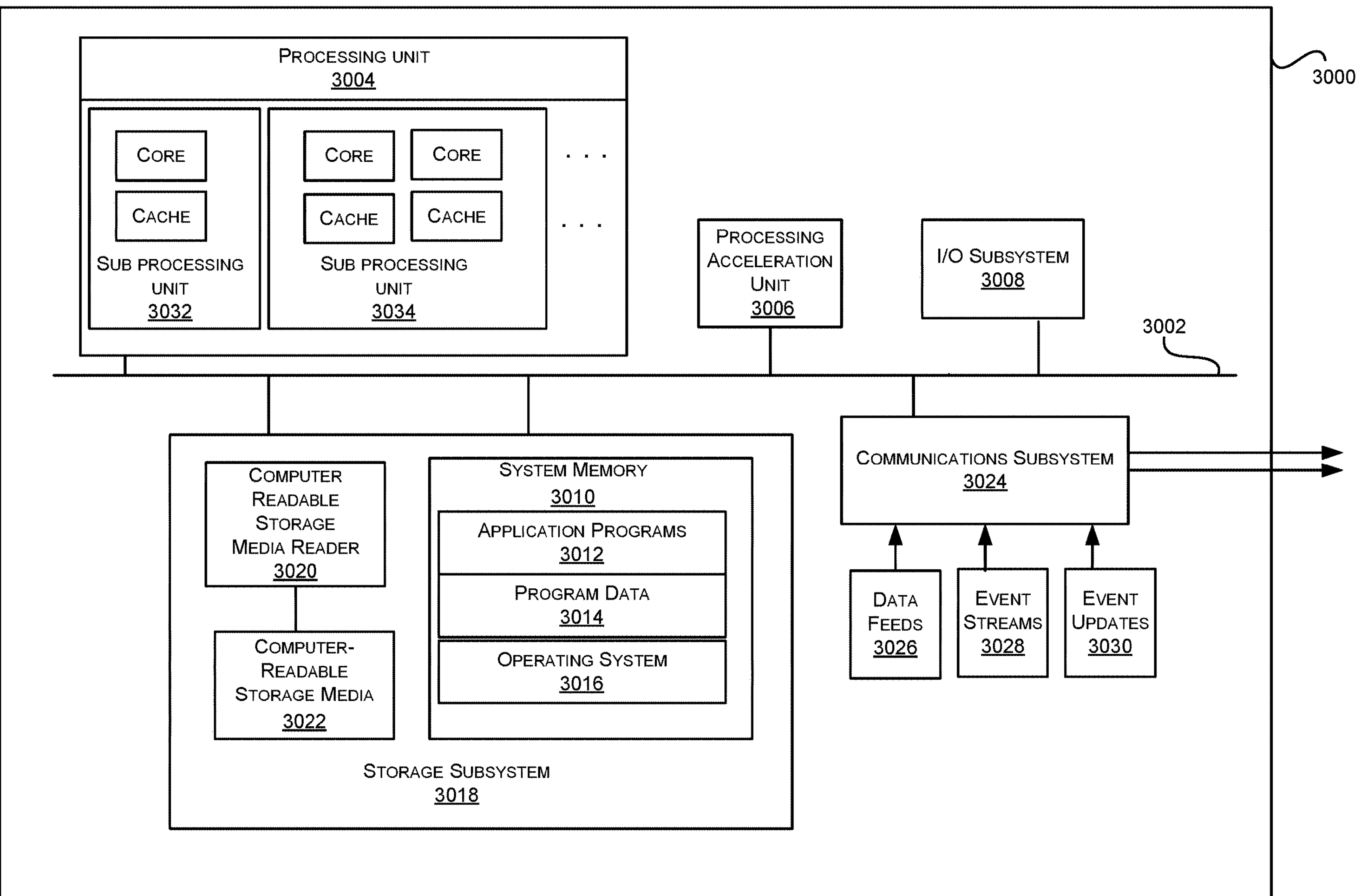
FIG. 30 illustrates a computer system, in which various embodiments described herein may be implemented.

FIG. 30 illustrates a computer system 3000, in which various embodiments described herein may be implemented. The system 3000 may be used to implement any of the computer systems described above. As shown in the figure, computer system 3000 includes a processing unit 3004 that communicates with a number of peripheral subsystems via a bus subsystem 3002. These peripheral subsystems may include a processing acceleration unit 3006, an I/O subsystem 3008, a storage subsystem 3018 and a communications subsystem 3024. Storage subsystem 3018 includes tangible computer-readable storage media 3022 and a system memory 3010.

Bus subsystem 3002 provides a mechanism for letting the various components and subsystems of computer system 3000 communicate with each other as intended. Although bus subsystem 3002 is shown schematically as a single bus, alternative embodiments of the bus subsystem may utilize multiple buses. Bus subsystem 3002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 3004, which can be implemented as one or more integrated circuits (e.g., a conventional microprocessor or microcontroller), controls the operation of computer system 3000. One or more processors may be included in processing unit 3004. These processors may include single core or multicore processors. In certain embodiments, processing unit 3004 may be implemented as one or more independent processing units 3032 and/or 3034 with single or multicore processors included in each processing unit. In other embodiments, processing unit 3004 may also be implemented as a quad-core processing unit formed by integrating two dual-core processors into a single chip.

In various embodiments, processing unit 3004 can execute a variety of programs in response to program code and can maintain multiple concurrently executing programs or processes. At any given time, some or all of the program code to be executed can be resident in processor(s) 3004 and/or in storage subsystem 3018. Through suitable programming, processor(s) 3004 can provide various functionalities described above. Computer system 3000 may additionally include a processing acceleration unit 3006, which can include a digital signal processor (DSP), a special-purpose processor, and/or the like.

I/O subsystem 3008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3-D) mice, joysticks or pointing sticks, gamepads and graphic tablets, and audio/visual devices such as speakers, digital cameras, digital camcorders, portable media players, webcams, image scanners, fingerprint scanners, barcode reader 3-D scanners, 3-D printers, laser rangefinders, and eye gaze monitoring devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 3000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 3000 may comprise a storage subsystem 3018 that comprises software elements, shown as being currently located within a system memory 3010. System memory 3010 may store program instructions that are loadable and executable on processing unit 3004, as well as data generated during the execution of these programs.

Depending on the configuration and type of computer system 3000, system memory 3010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 3004. In some implementations, system memory 3010 may include multiple different types of memory, such as static random access memory (SRAM) or dynamic random access memory (DRAM). In some implementations, a basic input/output system (BIOS), containing the basic routines that help to transfer information between elements within computer system 3000, such as during start-up, may typically be stored in the ROM. By way of example, and not limitation, system memory 3010 also illustrates application programs 3012, which may include client applications, Web browsers, mid-tier applications, relational database management systems (RDBMS), etc., program data 3014, and an operating system 3016. By way of example, operating system 3016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 3018 may also provide a tangible computer-readable storage medium for storing the basic programming and data constructs that provide the functionality of some embodiments. Software (programs, code modules, instructions) that when executed by a processor provide the functionality described above may be stored in storage subsystem 3018. These software modules or instructions may be executed by processing unit 3004. Storage subsystem 3018 may also provide a repository for storing data used in accordance with the present invention.

Storage subsystem 3000 may also include a computer-readable storage media reader 3020 that can further be connected to computer-readable storage media 3022. Together and, optionally, in combination with system memory 3010, computer-readable storage media 3022 may comprehensively represent remote, local, fixed, and/or removable storage devices plus storage media for temporarily and/or more permanently containing, storing, transmitting, and retrieving computer-readable information.

Computer-readable storage media 3022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 3000.

By way of example, computer-readable storage media 3022 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 3022 may include, but is not limited to, Zip® drives, flash memory cards, universal serial bus (USB) flash drives, secure digital (SD) cards, DVD disks, digital video tape, and the like. Computer-readable storage media 3022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 3000.

Communications subsystem 3024 provides an interface to other computer systems and networks. Communications subsystem 3024 serves as an interface for receiving data from and transmitting data to other systems from computer system 3000. For example, communications subsystem 3024 may enable computer system 3000 to connect to one or more devices via the Internet. In some embodiments communications subsystem 3024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 3024 can provide wired network connectivity (e.g., Ethernet) in addition to or instead of a wireless interface.

In some embodiments, communications subsystem 3024 may also receive input communication in the form of structured and/or unstructured data feeds 3026, event streams 3028, event updates 3030, and the like on behalf of one or more users who may use computer system 3000.

By way of example, communications subsystem 3024 may be configured to receive data feeds 3026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 3024 may also be configured to receive data in the form of continuous data streams, which may include event streams 3028 of real-time events and/or event updates 3030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 3024 may also be configured to output the structured and/or unstructured data feeds 3026, event streams 3028, event updates 3030, and the like to one or more databases that may be in communication with one or more streaming data source computers coupled to computer system 3000.

Computer system 3000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 3000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method comprising:

receiving a first motion or position of a first performer in a first real-world environment;

identifying the first motion or position as a first predefined motion or position;

altering a virtual representation of the first performer in a 3-D virtual environment based on the first motion or position of the first performer in the first real-world environment;

altering a virtual asset in the 3-D virtual environment in response to identifying the first motion or position as the first predefined motion or position;

receiving a second real-time motion or position of a second performer in a second real-world environment;

identifying the second real-time motion or position as a second predefined motion or position;

altering the virtual asset in the 3-D virtual environment in response to identifying the second real-time motion or position as the second predefined motion or position;

rendering a first 2-D video stream of the virtual representation of the first performer and the virtual asset in the 3-D virtual environment; and compositing the first 2-D video stream with a live view of the second performer in the second real-world environment on an augmented reality device such that the virtual representation of the first performer exchanges possession of the virtual asset with the second performer such that they all appear to be live in the second real-world environment when the second real-world environment is viewed through the augmented reality device.

2. The method of claim 1, further comprising:

rendering a 2-D video stream of the virtual asset in the 3-D virtual environment wherein:

the 2-D video stream of the virtual asset includes the altering of the virtual asset in response to identifying the first motion or position; and the 2-D video stream of the virtual asset includes the altering of the virtual asset in response to identifying the second motion or position.

3. The method of claim 2, further comprising:

causing a real-time video stream to be displayed on a display device, wherein:

the real-time video stream comprises the 2-D video stream of the virtual asset; and the 2-D video stream is composited with a real-time view of the second real-world environment.

4. The method of claim 1, wherein the first real-world environment is physically separated from the second real-world environment.

5. The method of claim 1, wherein the first performer is not visible to the second performer in the first real-world environment.

6. The method of claim 5, wherein the first performer is visible to the second performer through the 3-D virtual environment.

7. The method of claim 1, wherein the first performer is equipped with a pair of AR glasses.

8. An immersive content presentation system comprising:

one or more processors; and one or more memory devices comprising instructions that, when executed by the one or more processors, cause the one or more processors to perform operations comprising:

receiving a first motion or position of a first performer in a first real-world environment;

identifying the first motion or position as a first predefined motion or position;

altering a virtual representation of the first performer in a 3-D virtual environment based on the first motion or position of the first performer in the first real-world environment;

altering a virtual asset in the 3-D virtual environment in response to identifying the first motion or position as the first predefined motion or position;

receiving a second real-time motion or position of a second performer in a second real-world environment;

identifying the second real-time motion or position as a second predefined motion or position;

altering the virtual asset in the 3-D virtual environment in response to identifying the real-time second motion or position as the second predefined motion or position;

rendering a first 2-D video stream of the virtual representation of the first performer and the virtual asset in the 3-D virtual environment; and compositing the first 2-D video stream with a live view of the second performer in the second real-world environment on an augmented reality device such that the virtual representation of the first performer exchanges possession of the virtual asset with the second performer such that they all appear to be live in the second real-world environment when the second real-world environment is viewed through the augmented reality device.

9. The immersive content presentation system of claim 8, wherein altering the virtual asset in the 3-D virtual environment in response to identifying the first motion or position as the first predefined motion or position comprises:

causing the virtual asset to be held by virtual representation of the first performer in the 3-D virtual environment.

10. The immersive content presentation system of claim 9, wherein altering the virtual asset in the 3-D virtual environment in response to identifying the second motion or position as the second predefined motion or position comprises:

causing the virtual asset to be passed from the virtual representation of the first performer in the 3-D virtual environment to a virtual representation of the second performer in the 3-D virtual environment.

11. The immersive content presentation system of claim 8, wherein the first predefined motion or position comprises the first performer closing their hand.

12. The immersive content presentation system of claim 8, wherein the first predefined motion or position comprises the first performer pointing their arm or hand at a virtual representation of an object.

13. The immersive content presentation system of claim 8, wherein the first predefined motion or position comprises the first performer executing a throwing motion.

14. The immersive content presentation system of claim 13, wherein the first predefined motion or position comprises the second performer executing a catching motion.

15. A non-transitory, computer-readable medium comprising instructions that, when executed by one or more processors, cause the one or more processors to perform operations comprising:

receiving a first motion or position of a first performer in a first real-world environment;

identifying the first motion or position as a first predefined motion or position;

altering a virtual representation of the first performer in a 3-D virtual environment based on the first motion or position of the first performer in the first real-world environment;

altering a virtual asset in the 3-D virtual environment in response to identifying the first motion or position as the first predefined motion or position;

receiving a second real-time motion or position of a second performer in a second real-world environment;

identifying the second real-time motion or position as a second predefined motion or position;

altering the virtual asset in the 3-D virtual environment in response to identifying the second real-time motion or position as the second predefined motion or position;

rendering a first 2-D video stream of the virtual representation of the first performer and the virtual asset in the 3-D virtual environment; and compositing the first 2-D video stream with a live view of the second performer in the second real-world environment on an augmented reality device such that the virtual representation of the first performer exchanges possession of the virtual asset with the second performer such that they all appear to be live in the second real-world environment when the second real-world environment is viewed through the augmented reality device.

16. The non-transitory, computer-readable medium of claim 15, wherein the virtual asset comprises a digital effect.

17. The non-transitory, computer-readable medium of claim 15, wherein the virtual asset comprises a CGI character.

18. The non-transitory, computer-readable medium of claim 15, wherein the first performer in the first real-world environment comprises a motion-capture suit that is recorded with a plurality of motion-capture cameras in a motion-capture system.

19. The non-transitory, computer-readable medium of claim 15, wherein identifying the first motion or position as the first predefined motion or position comprises:

receiving a motion-capture frame at a game engine; and comparing the first motion or position to a plurality of motions or positions in a predefined library of motions or positions.

20. The non-transitory, computer-readable medium of claim 19, wherein identifying the first motion or position as the first predefined motion or position comprises:

comparing calculated motion vectors of vertices on the motion-capture frame with the predefined library of motions or positions.

* * * * *